(12) United States Patent
Fernandez et al.

(10) Patent No.: US 6,377,261 B1
(45) Date of Patent: Apr. 23, 2002

(54) COMPILING GLYPHS INTO INSTRUCTIONS FOR IMAGING FOR EXECUTION ON A GENERAL PURPOSE COMPUTER

(75) Inventors: Gustavo Arturo Fernandez, Santa Clara; David Raymond Fuchs, Palo Alto, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 08/621,367

(22) Filed: Mar. 25, 1996

Related U.S. Application Data

(63) Continuation of application No. 07/662,788, filed on Feb. 28, 1991, now abandoned.

(51) Int. Cl.[7] .............................................. G06T 11/00
(52) U.S. Cl. ....................................................... 345/467
(58) Field of Search ................................. 395/133, 139, 395/141–143, 150–151, 145, 147, 167–172, 763, 788–791, 947–948, 110, 112, 116–117, 580–588; 345/26, 127–130, 141–144, 192–195, 150–155, 467, 660, 667, 472

(56) References Cited

U.S. PATENT DOCUMENTS

| | | | | |
|---|---|---|---|---|
| 3,809,868 A | * | 5/1974 | Villalobos et al. | 395/143 |
| 4,573,199 A | * | 2/1986 | Chen et al. | 382/47 |
| 4,987,550 A | * | 1/1991 | Leonard et al. | 364/521 |
| 5,021,974 A | * | 6/1991 | Pisculli et al. | 395/167 |
| 5,083,262 A | * | 1/1992 | Haff, Jr. | 703/27 |
| 5,146,548 A | * | 9/1992 | Bijnagte | 395/117 |
| 5,159,668 A | * | 10/1992 | Kaaila | 395/151 |
| 5,241,653 A | * | 8/1993 | Collins et al. | 345/668 |
| 5,502,804 A | * | 3/1996 | Butterfield et al. | 395/147 |
| 6,043,826 A | * | 3/2000 | Manning | 345/467 |
| 6,249,908 B1 | * | 6/2001 | Stamm | 717/5 |

* cited by examiner

Primary Examiner—Joseph H. Feild
(74) Attorney, Agent, or Firm—Fish & Richardson P.C.

(57) ABSTRACT

A method and apparatus for receiving glyph data, specifying glyphs according to a pixel map, and for automatically compiling the glyph data to form compiled glyph code for imaging the specified glyphs in an imaging system. The compiled glyph code uses instructions from the instruction set of the imaging system and hence the compiled glyph code directly interfaces with display devices in the imaging system to image the glyphs.

39 Claims, 10 Drawing Sheets

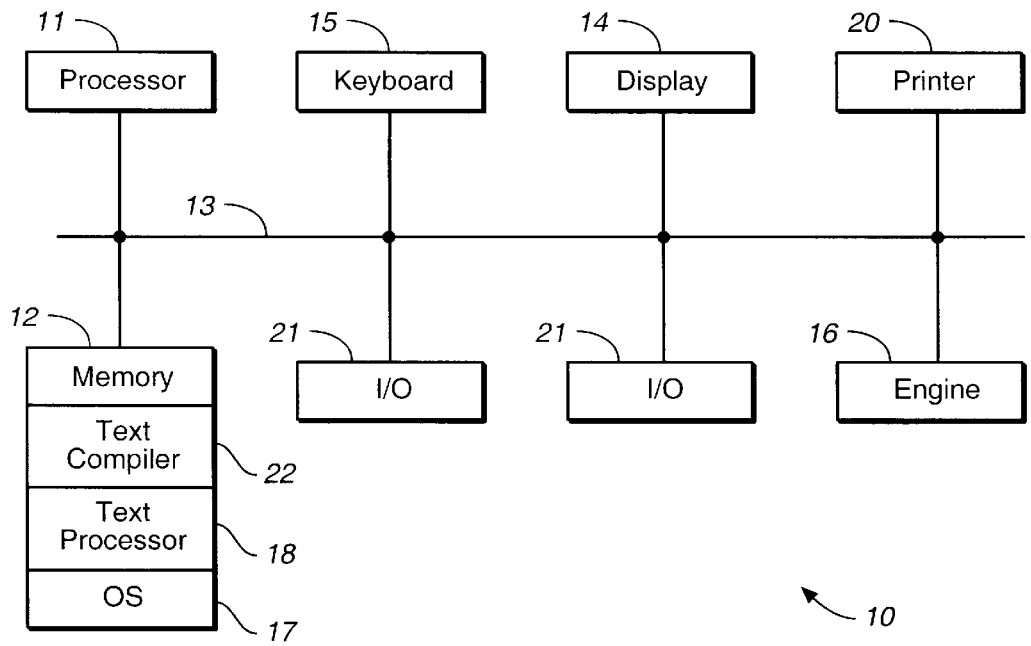
FIG._1
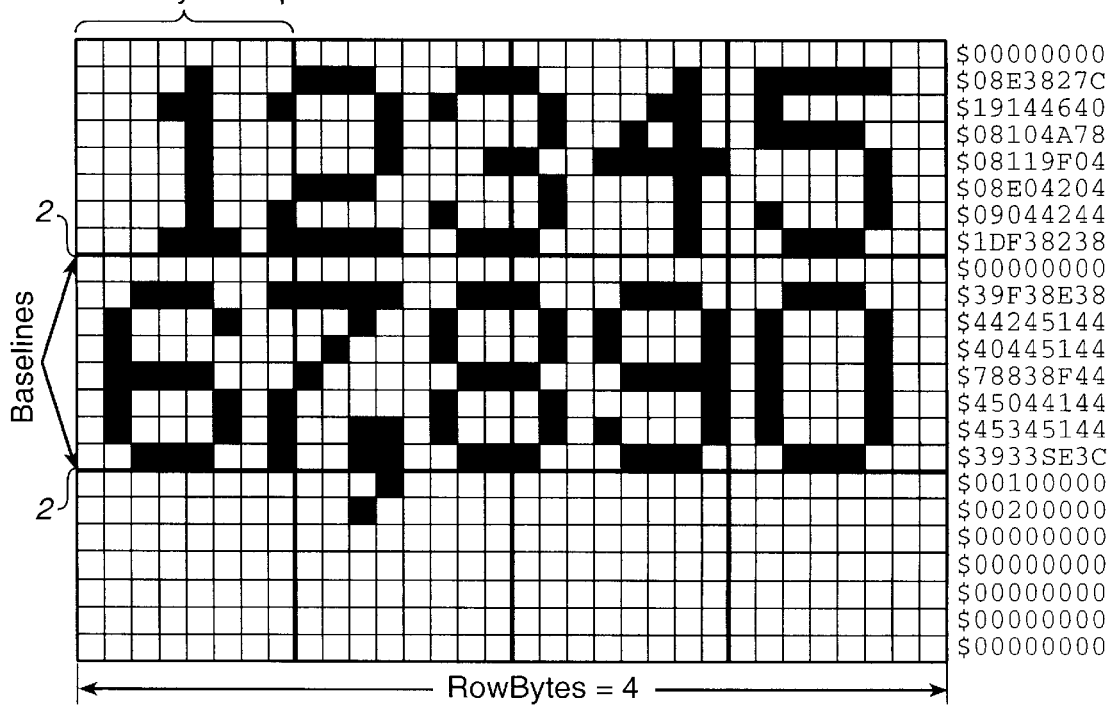
FIG._2

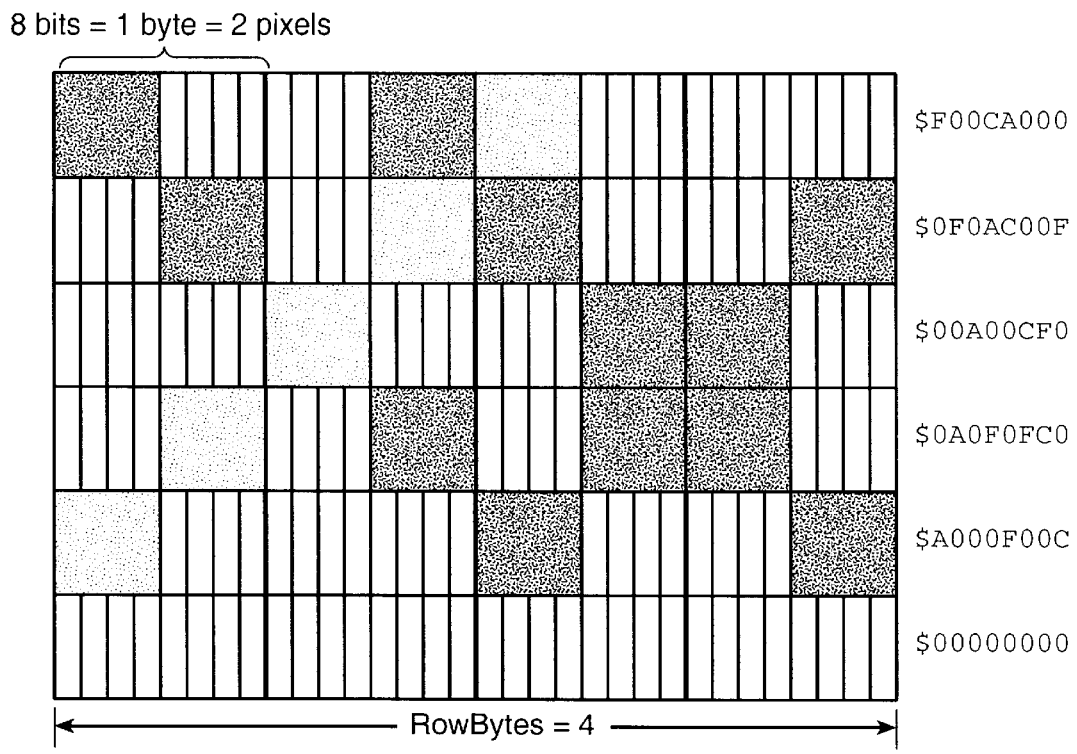
FIG._3
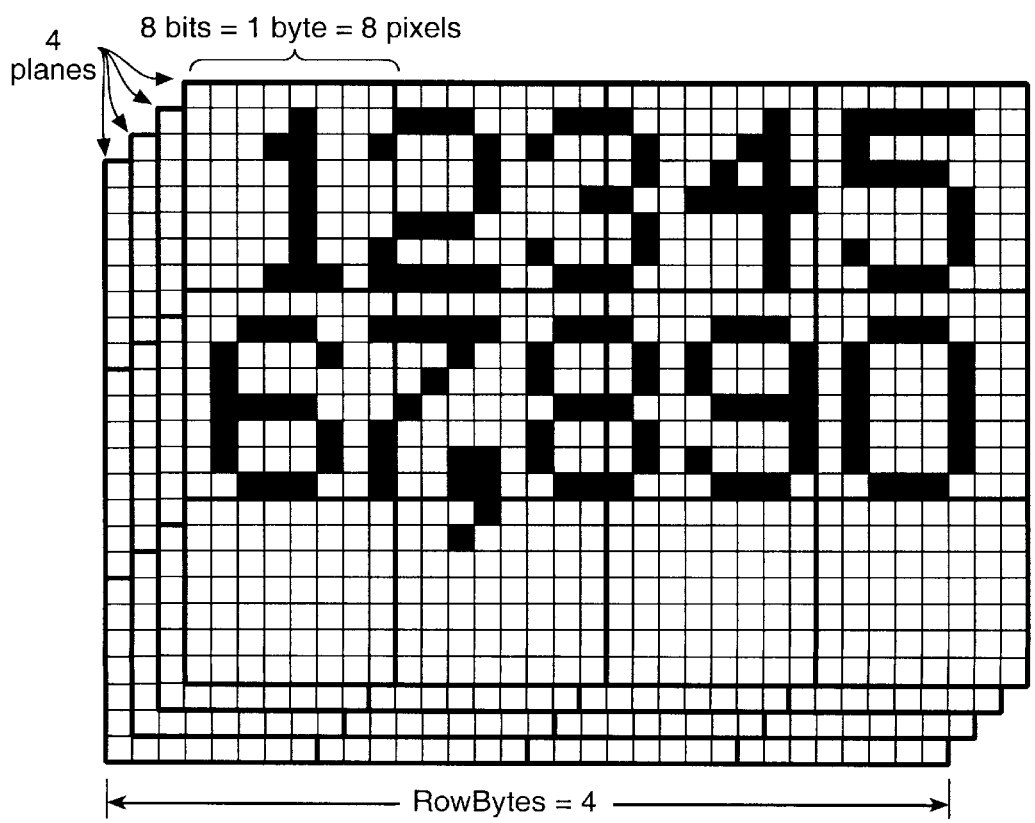
FIG._4

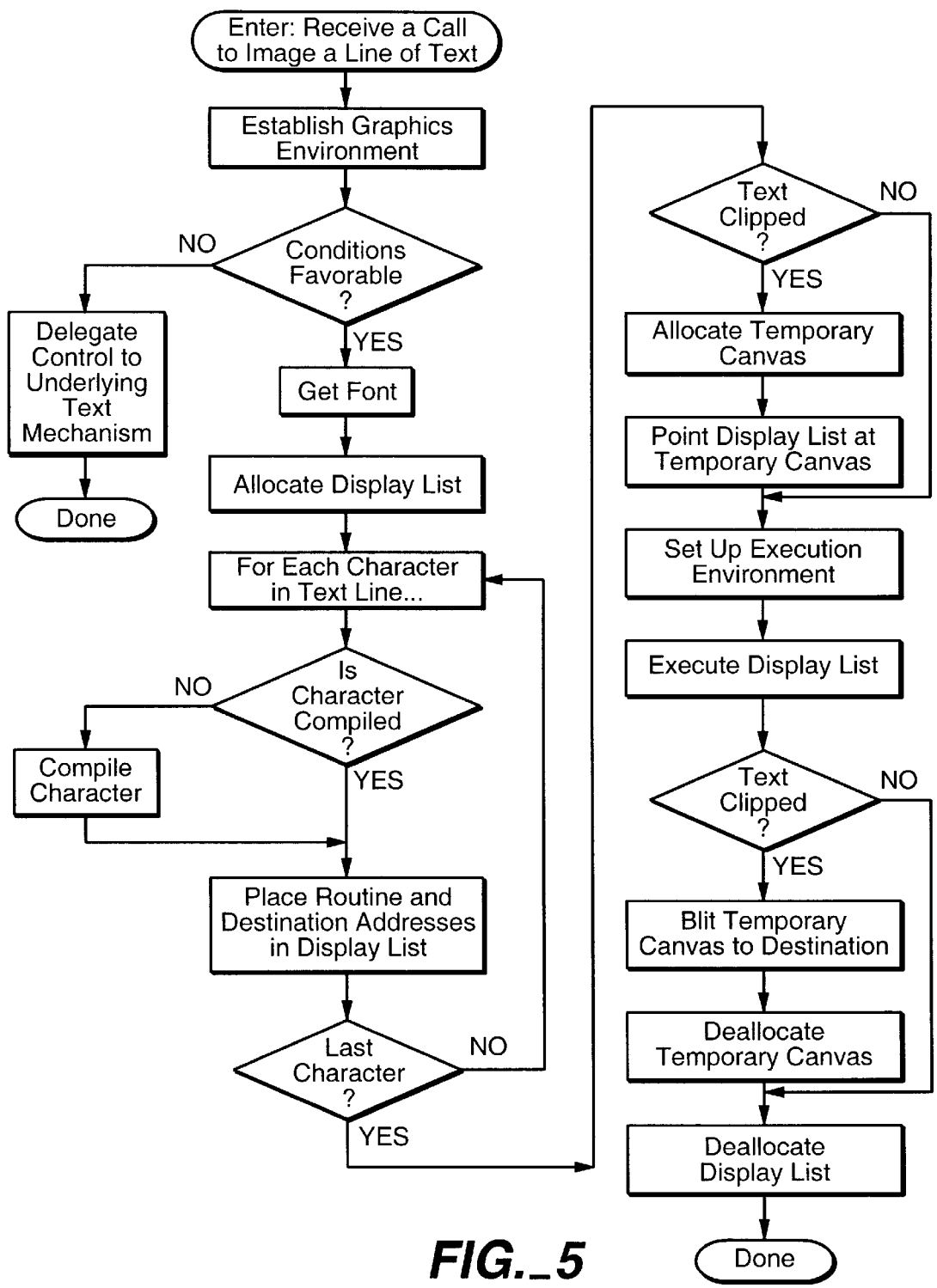
FIG._5

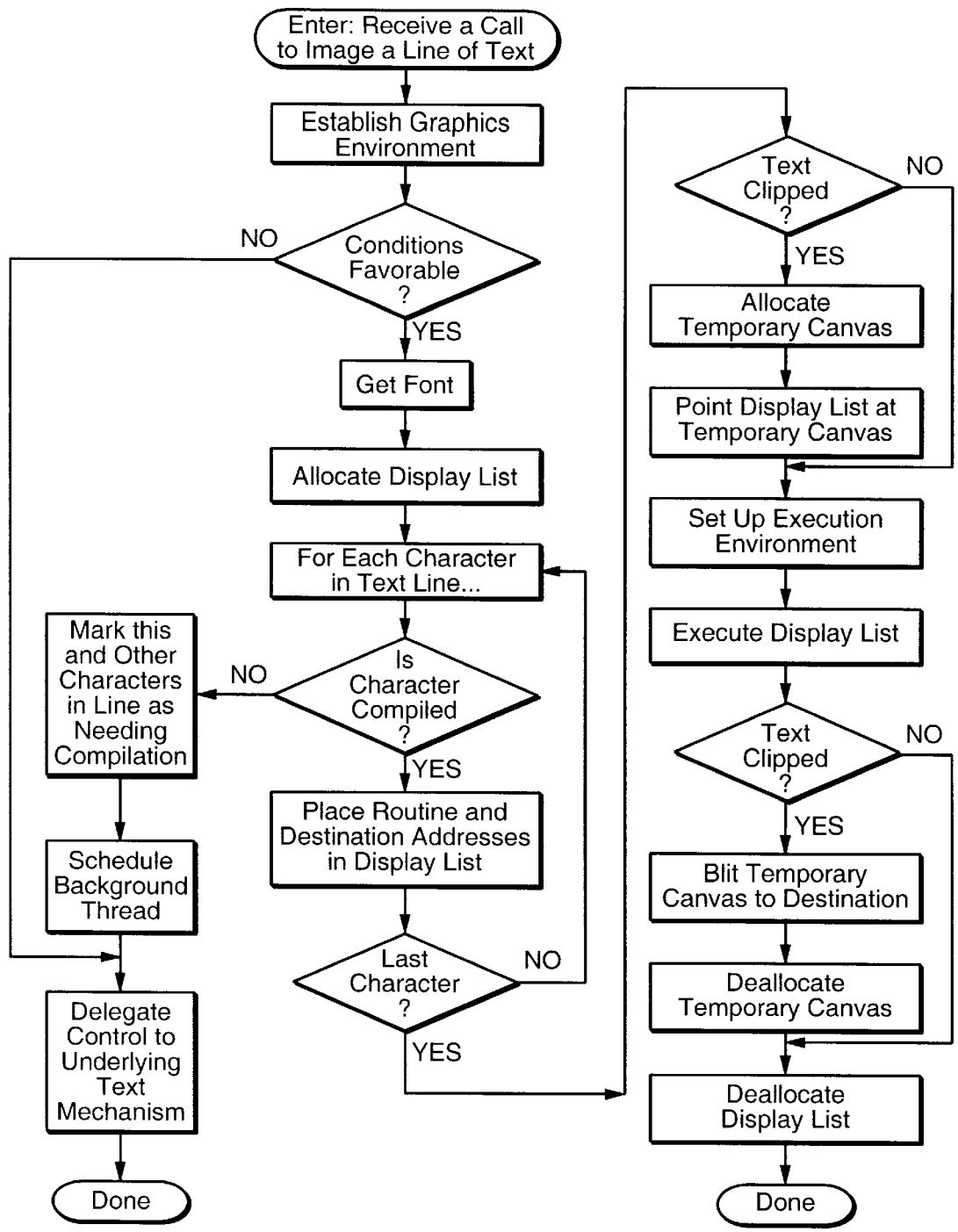
FIG._6

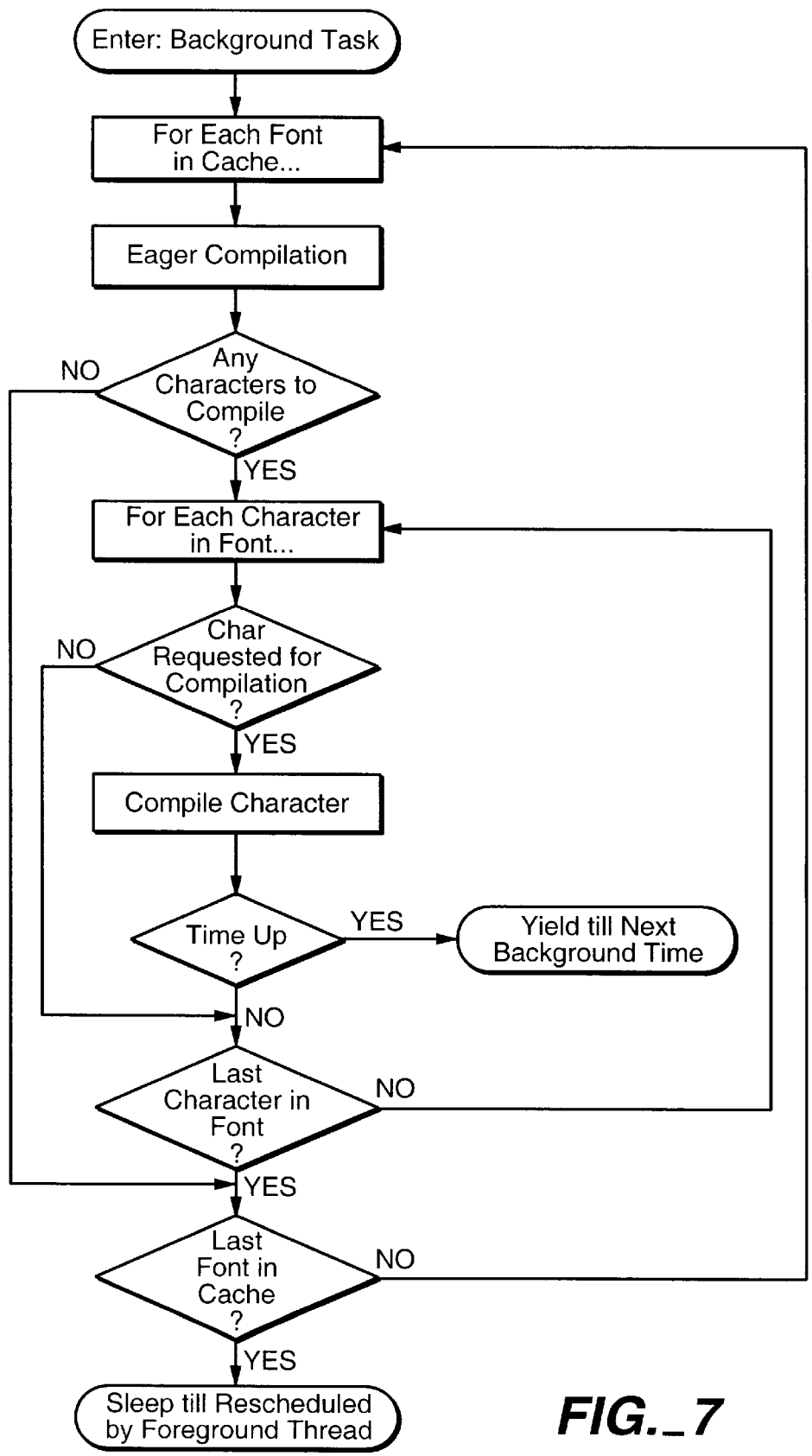
FIG._7

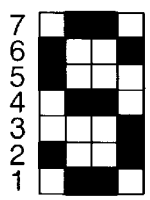
FIG._8
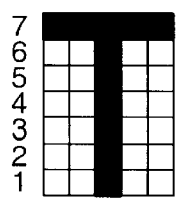
FIG._9
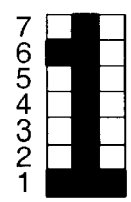
FIG._10
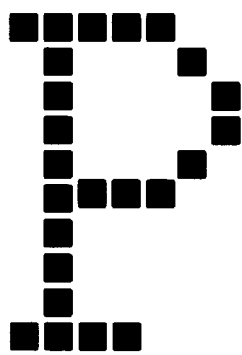
FIG._11
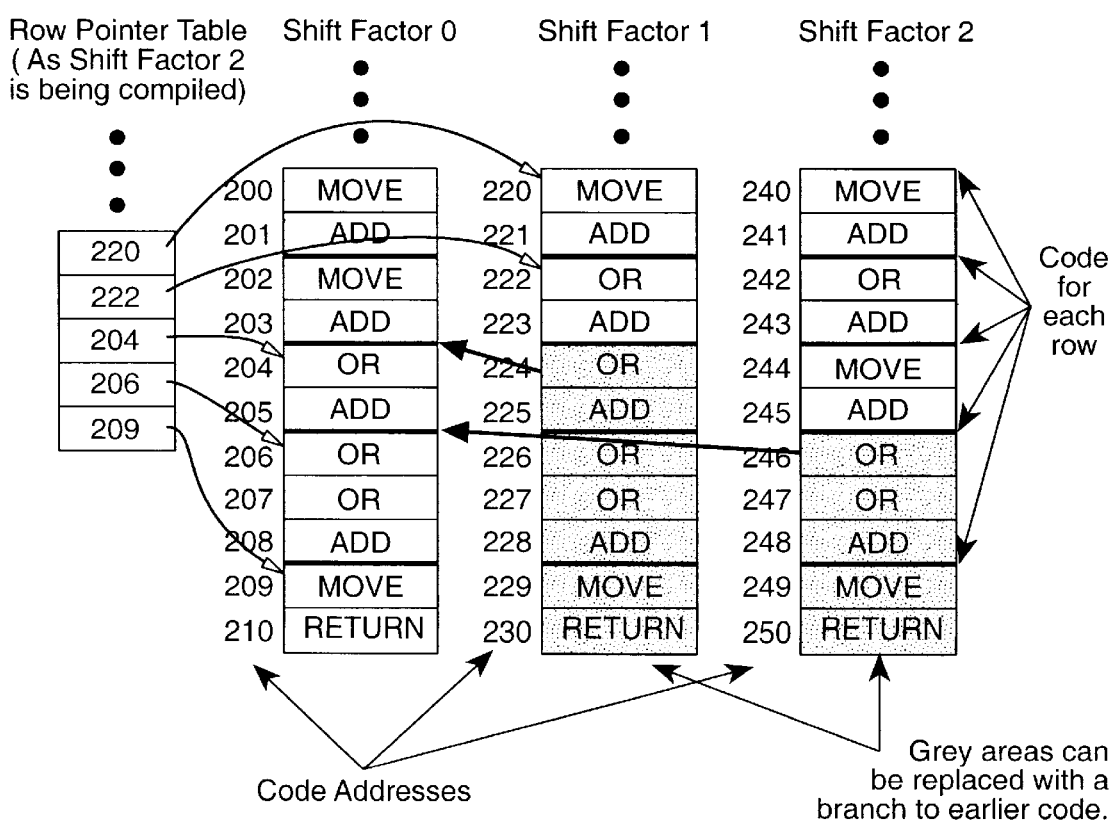
FIG._12

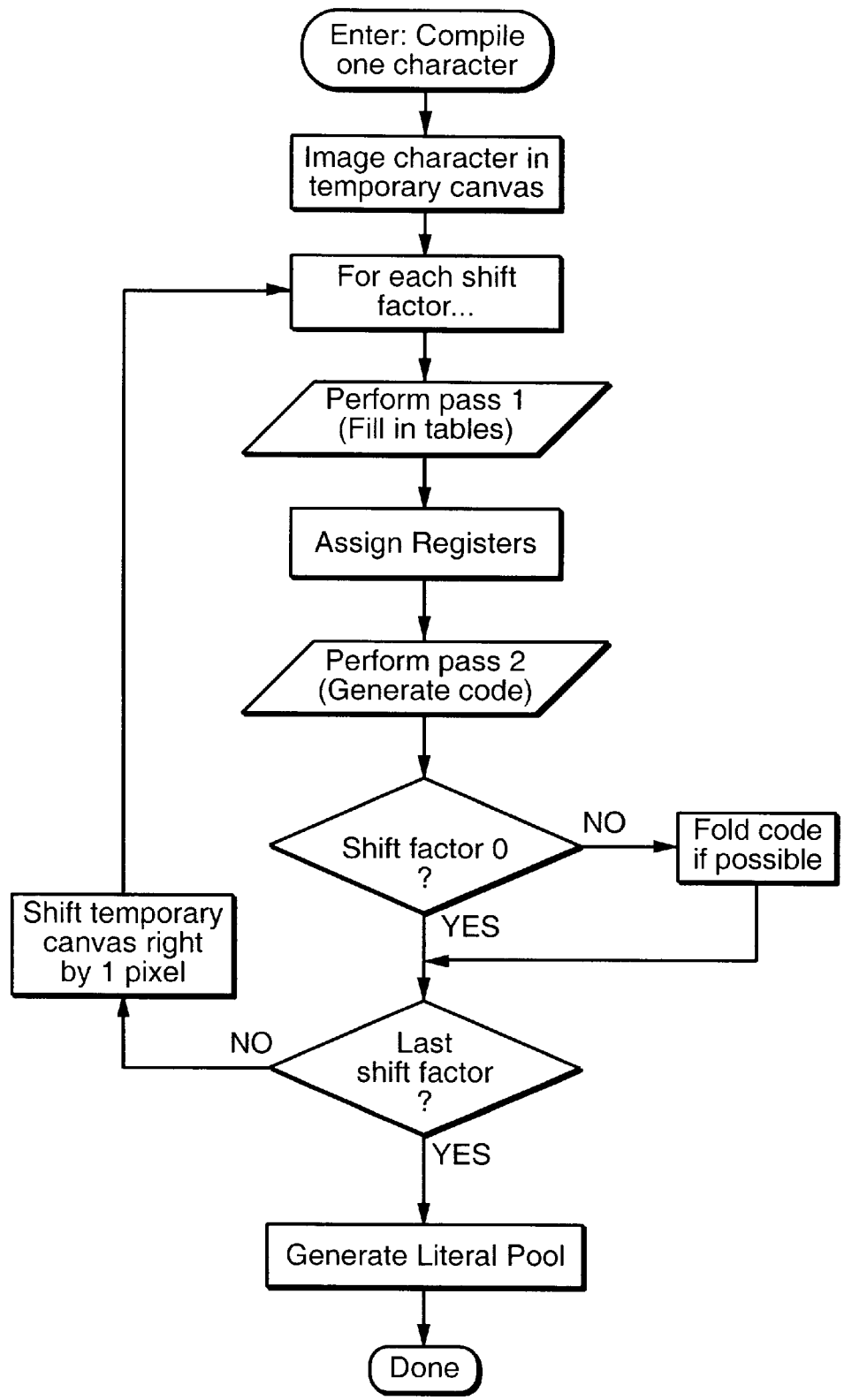
FIG._13

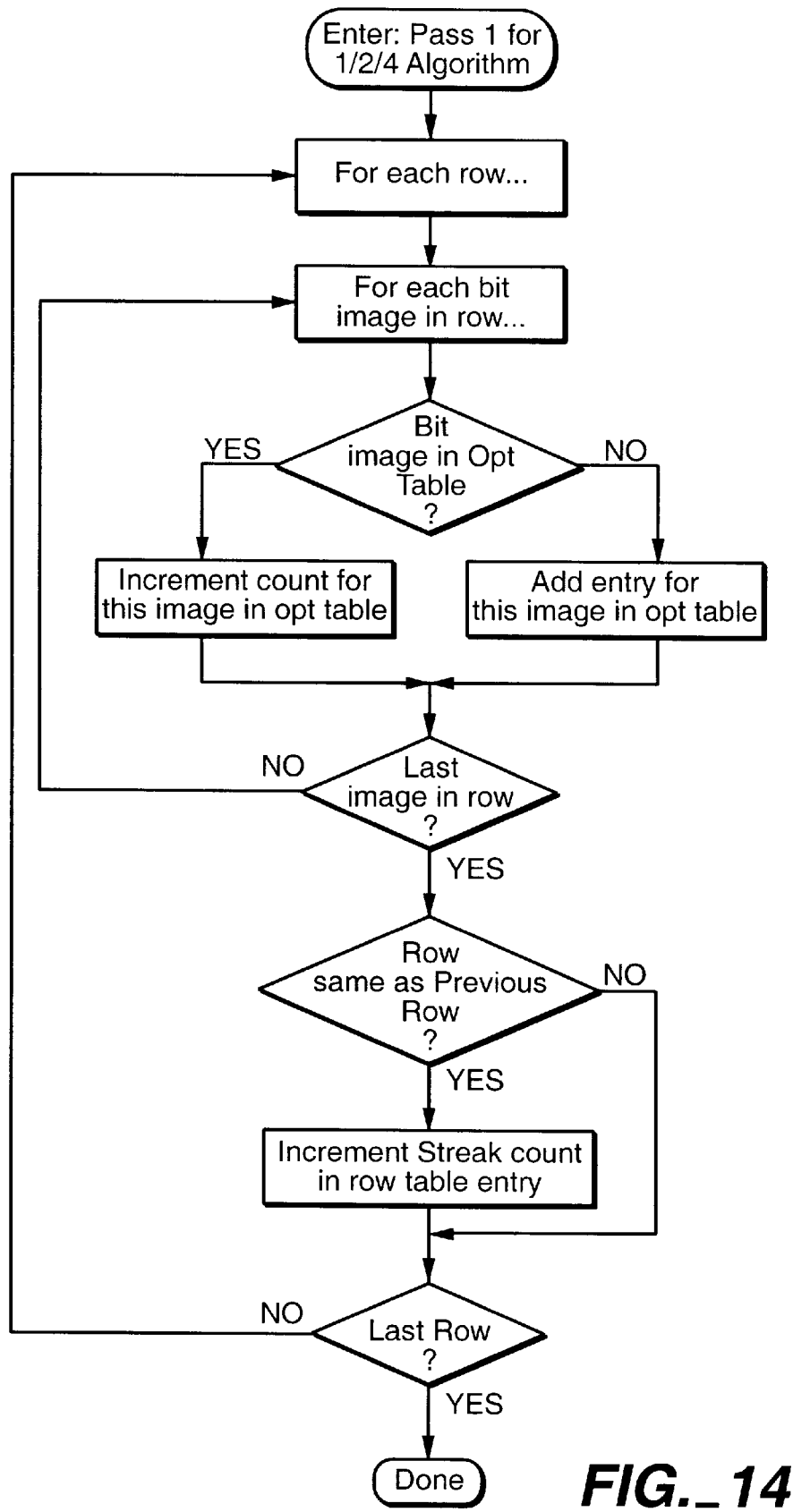
FIG._14

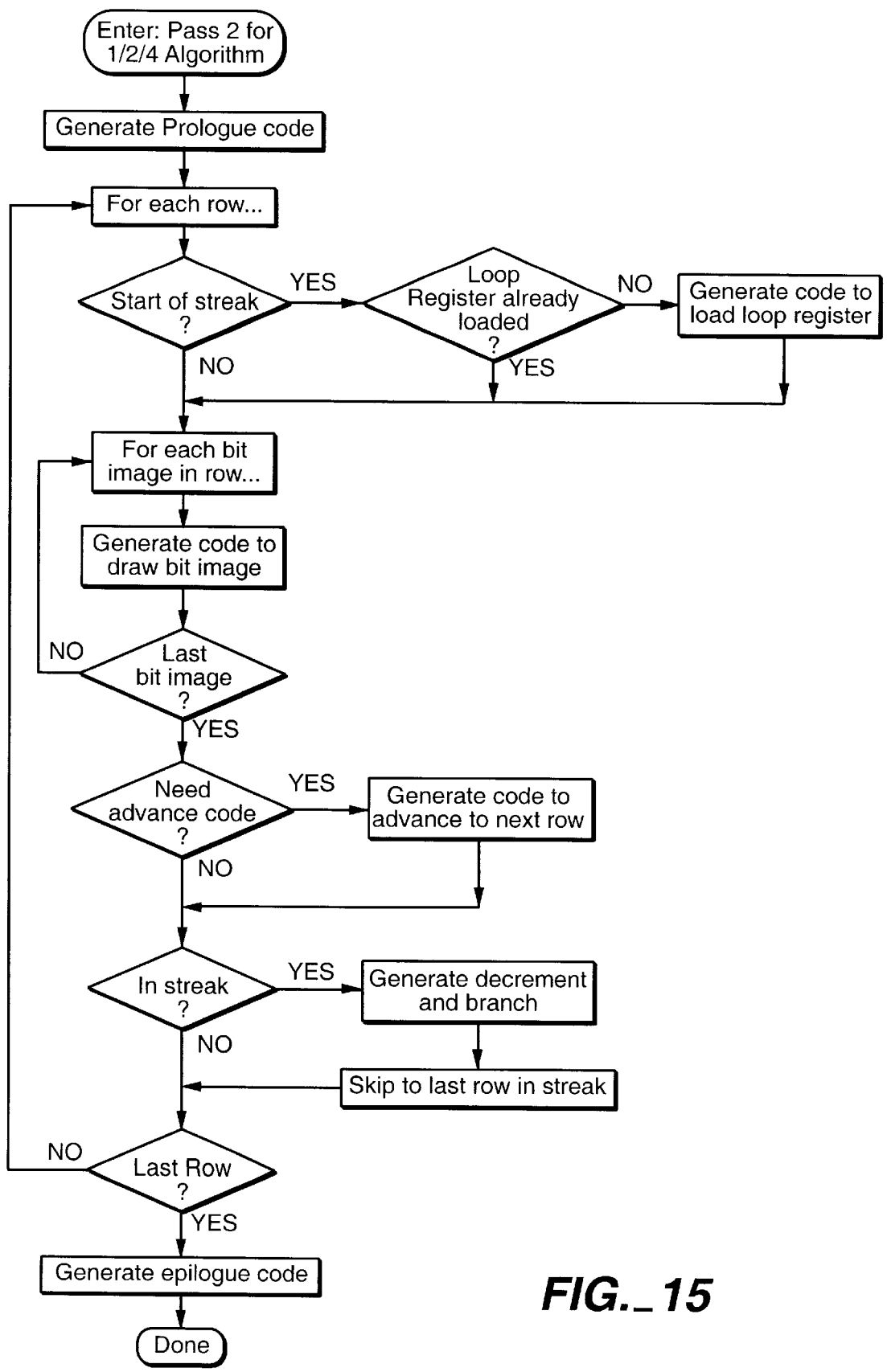
FIG._15

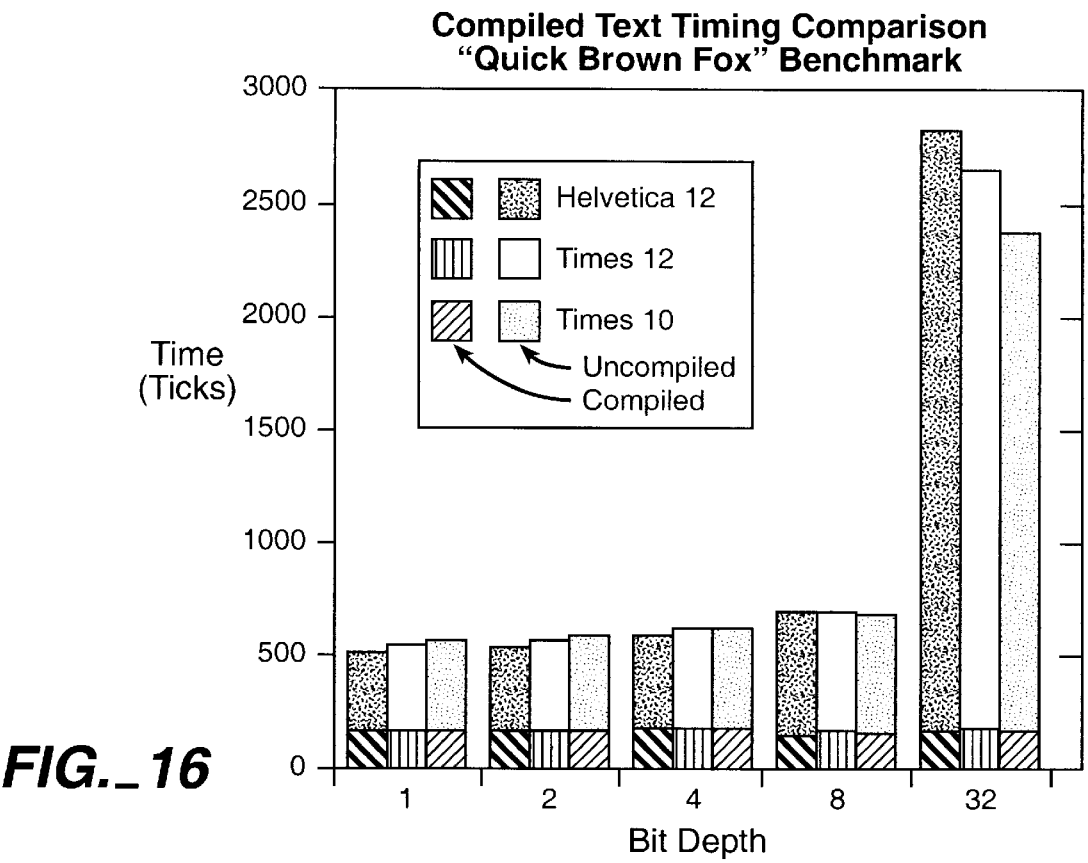
FIG._16
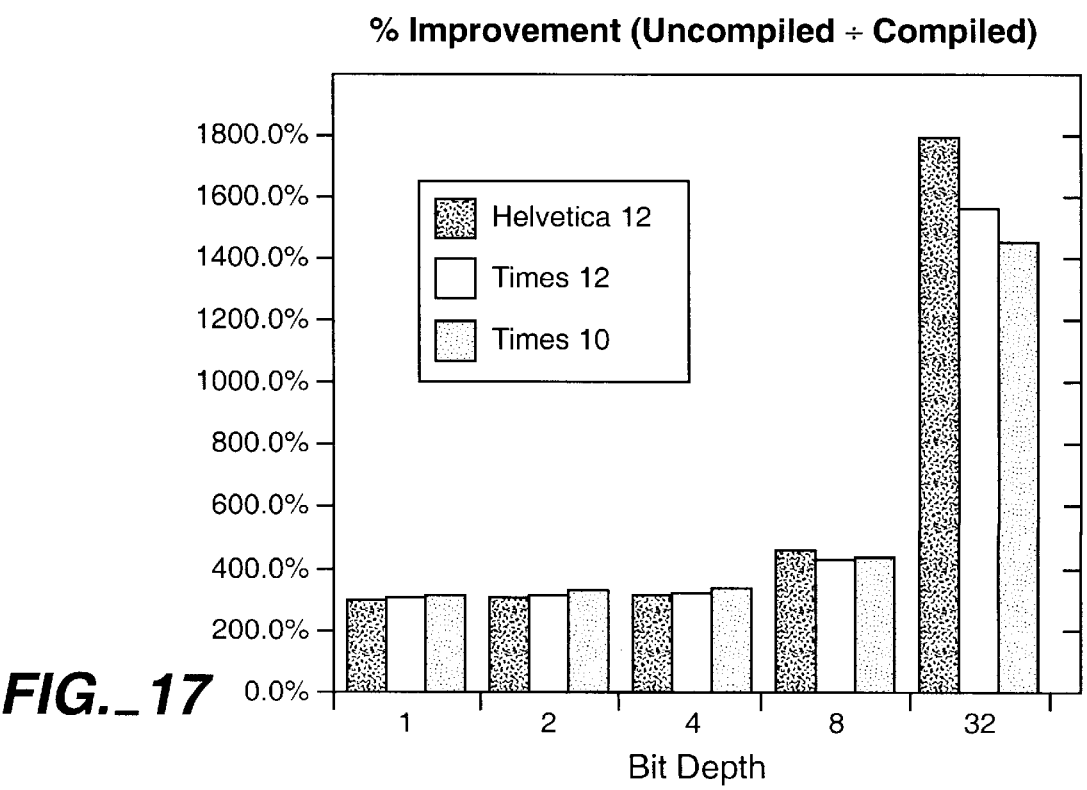
FIG._17

COMPILING GLYPHS INTO INSTRUCTIONS FOR IMAGING FOR EXECUTION ON A GENERAL PURPOSE COMPUTER

This is a continuation of application of Ser. No. 07/662,788 filed Feb. 28, 1991, now abandoned.

BACKGROUND OF THE INVENTION

This invention relates to text processing methods and text processor apparatus forming an imaging system for generating, storing, displaying, drawing, printing and otherwise imaging text, symbols, icons, and other patterns, all generically known as "glyphs".

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Text processors are well-known in the field of computers and data processors for imaging characters in fonts of different typefaces and sizes. Text processors typically define text characters with a generic definition in a character table, for example, an ASCII table, which is independent of typeface or size. The term "typeface" refers to the general appearance and design of characters and the term "font" refers to a complete set of characters having the same typeface, that is, the same general appearance and design.

Computers and data processors that use text processors are image systems that output the processed text in human readable form. The image systems typically include computer display screens for electronic output or printers for paper output. In such image systems, each character is drawn by a number of pixels (dots) that are located and addressed by an X-axis coordinate and a Y-axis coordinate defined relative to an XY-axes system where an X-axis and an orthogonal Y-axis form a matrix of addressable pixels. Each pixel is drawn by determining the X-axis and Y-axis coordinates for the pixel and each character is drawn by determining the X-axis and Y-axis coordinates for all the pixels that are used to draw the character. The XY-axes system can have any arbitrary rotation. Typically for printers, the X-axis is across the page so that the Y-axis is down the page as read by a human viewer.

For text processors, characters are typically defined along the X-axis by a character line where many character lines for text define a page of text. Each character typically is formed with pixels from many pixel lines so that depending upon the font parameters, characters can have different shapes and sizes depending upon the pixels selected for a character both in the X-axis and Y-axis directions. For convenience, some X-axis pixel line near the bottom of a line of characters is defined as the baseline of a character line. Text processors operate to define characters along character lines and use font parameters to actually determine the pixels to be drawn for each character appearing in the character line.

A pixel map is a two-dimensional array of pixels. A pixel is a data structure which can be changed in value (black or white, shades of color, size, brightness and so on) that have physical significance. A pixel is represented by one or more data bits or bytes. A rectangular array pixel map defines each pixel in the array by a set of orthogonal X-axis and Y-axis addresses. Similarly, run-length encoding and other coding methods also define pixels relative to a pixel map.

While the term "character" is often used to identify unique shapes representable by a pixel map, the term "character" is sometimes limited in meaning to a family of shapes such as an alphabet or a font. In the present specification, however, the term "character" refers to any shape (generically referred to as a "glyph") identifiable by a pixel map. A glyph may or may not be associated with a set of similar shapes, such as an alphabet or a font. In the present specification, the term "character" is used interchangeably with the term "glyph" and term "glyph" means any pattern (including symbols, icons or other shapes) representable by a pixel map.

Text processing methods for imaging characters (glyphs) fall into a number of different categories as follows.

A first text processing category performs block transfers (BLTs or blits) of arbitrary data where all code is pre-compiled. This category is the most common method of drawing text via block transfer. Examples of this category are Macintosh QuickDraw DrawText and other general purpose text display systems. Other examples which also fall into this category includes methods that image characters from other representations, such as outlines.

A second text processing category draws characters which, prior to run time, have been compiled manually by humans without use of computational aids specific to text. One example of this category is the Apple II computer executing programs which display large block text on the screen using low-resolution (40×48) graphics. Each character in the alphabet is described by a character subroutine typically written in BASIC. Words, formed as a combination of characters, are displayed on a screen by executing a combination of character subroutines, one subroutine for each character in the word. Each character subroutine is manually written, by a human programmer, using high level drawing primitives (such as plot points, display vertical lines, and display horizontal lines). Such character subroutines, being manually written for each character, do not permit automatic creation of characters. Furthermore, such manual character subroutines do not translate into code within the instruction set acceptable by the display device and hence directly interfacing with the display device.

A third text processing category compiles a segment of code to perform a data-independent BLT operation for arbitrary pixels in an array without reference to the character content of the data in the array. This method is known as a "compiled BLT". One example of this category is an AT&T terminal in which block-transfers (BLT or blit) of arbitrary bits or pixels are achieved by first compiling the code for doing a specific instance of a blit (moving, shifting, advancing, clipping, boolean transfer mode, etc.) and then executing the code. This method, however, moves an arbitrary rectangular array of pixels from one place to another place and does not compile text characters into executable code.

A fourth text processing category compiles a segment of code to perform a data-independent BLT of some constant, such as a solid color. This fourth text processing category is a species of the compiled BLT third category and is known as "compiled fill". The code for a compiled fill can be readily optimized since only a simple, constant pattern is imaged.

In accordance with the above background, many techniques for processing pixels are known, but a need exists for improved methods and apparatus for compiling characters into machine code for display in practical imaging systems.

SUMMARY OF THE INVENTION

The present invention is a method and apparatus for receiving glyph data, specifying glyphs according to a pixel map, and for automatically compiling the glyph data to form compiled glyph code for imaging the specified glyphs in an imaging system. The compiled glyph code uses instructions from the instruction set of the imaging system and hence the compiled glyph code directly interfaces with display devices in the imaging system to image the glyphs.

The method of the present invention compiles a segment of code to perform a data-dependent imaging of the glyph data. The compiled code varies as function of the glyph data.

In the method of the present invention, glyph data includes one or more input data bits and the instruction set includes imaging instructions. To compile the input glyph data, the input data bits are compiled to one or more imaging instructions.

In one embodiment of the invention, compiled glyph code functions to speed-up imaging by text processors in an imaging system. In that embodiment, processing control is typically resident with the text processor. The text processor calls the imaging code in which two imaging threads are employed, namely, a foreground thread and a background thread. The foreground thread receives display requests and images the glyphs and the background thread compiles glyphs as needed. If particular glyphs to be imaged have not been compiled, the foreground thread marks the uncompiled glyphs needing to be compiled and schedules time for the background thread to compile the uncompiled glyphs. In this double-threaded embodiment, no significant speed loss is encountered since glyph compiling is a background task.

In another embodiment of the invention, a single-thread imaging sequence is employed. The single-thread imaging sequence receives a display request to image glyphs and compiles any uncompiled glyphs as needed. If particular glyphs to be imaged have not been compiled, the single-thread sequence compiles the uncompiled glyphs. In the single-thread embodiment, glyph compiling delays are experienced whenever an uncompiled glyph is encountered.

In the present invention, the compiled code generation is data-dependent since the compiled glyph code is a function of the input glyph data. Specifically, the compiled glyph code varies as function of variations in the input glyph data, that is, different glyphs defined by the glyph data are compiled to correspondingly different compiled glyph code such that the compiled glyph code can be executed to image the glyphs.

In accordance with the above summary, an improved text processor is provided in which compiled glyph data accelerates the imaging of glyphs.

Other objects, features, and advantages of the present invention will become more apparent in the light of the following detailed description thereof, as illustrated in the drawings.

BRIEF DESCRIPTION OF THE DRAWINGS

FIG. 1 depicts a block diagram representation of an image system having a text processor using compiled glyphs in accordance with the present invention.

FIG. 2 depicts an XY-axes coordinate display for lines of characters for pages where the pixels for characters are represented by a bitmap.

FIG. 3 depicts an XY-axes coordinate display for lines of characters for pages where the pixels for characters are represented by a block array.

FIG. 4 depicts an XY-axes coordinate display for lines of characters for pages where the pixels for characters are represented by a planar array.

FIG. 5 depicts a block-diagram representation of a single-thread method for drawing compiled glyphs.

FIG. 6 and FIG. 7 depict a block-diagram representation of a double-thread method for drawing compiled glyph.

FIG. 8 depicts a pixel map for a letter "S".

FIG. 9 depict a pixel map for a letter "T".

FIG. 10 depicts a pixel map for a character "1".

FIG. 11 depict a pixel map for a character "P".

FIG. 12 depicts a schematic representation of a code folding example.

FIG. 13 depicts a flow diagram of the 1/2/4 algorithm.

FIG. 14 depicts a flow diagram of a first pass of the 1/2/4 algorithm.

FIG. 15 depicts a flow diagram of a second pass of the 1/2/4 algorithm.

FIG. 16 depicts a graph of a timing comparison depicting the uncompiled versus compiled execution times.

FIG. 17 depicts a graph representing a percent improvement of compiled text processing.

DESCRIPTION OF THE PREFERRED EMBODIMENTS

Overall Image System-FIG. 1

FIG. 1 depicts a block diagram representation of a image system 10 in accordance with the present invention. Typically, the system 10 is a conventional computer system having a processor (CPU) 11, a memory 12, a keyboard 15, a display 14, and a printer 20 and I/O devices 21. The display 14 and printer 20 display images of glyphs in human readable form. The I/O devices 21 can include plotters or other devices which output images of glyphs in human-readable form.

In the FIG. 1 system, application computer programs 18 are stored in the memory 12 and are executed in the processor 11 under control of a software operating system 17 also stored in memory 12. The general operation of such computer systems is well known.

Application programs 18 executable by the system 10 image glyphs Application programs together with the operating system and apparatus of FIG. 1 form an image system in accordance with the present invention. Text processor programs are examples of the application program 18 of FIG. 1.

A text processor program performs a text processor method in the apparatus of FIG. 1 to image glyphs in the memory 12. From the memory 12, the imaged glyphs are displayed by display 14 or printed by printer 20. The system of FIG. 1 operates by addressing pixels in an XY-axes coordinate system where, each pixel (dot) is located and addressed by an X-axis coordinate and a Y-axis coordinate defined relative to orthogonal X and Y axes which form an array of addressable pixels. A pixel is drawn by determining the X-axis and Y-axis coordinates for the pixel and a line of characters is drawn by determining the X-axis and Y-axis coordinates for all the pixels on the line that are used to define the characters.

A preferred embodiment of the invention employs a computer program, as provided hereinafter as TABLE 1 for example, executing in a general purpose computer of FIG. 1. While a preferred embodiment of the invention employs a computer program, a special putting engine 16 is also within the scope of the present invention.

Coordinate System—FIG. 2

In FIG. 2, an XY-axes coordinate system for drawing lines of text-processor characters 3 is shown. For convenience, the X-axis is aligned horizontally across the short length of a page 4 and the Y-axis is aligned vertically along the long length of the page 4. The XY-axes coordinate system of FIG. 2 is typical of the coordinate system used for output images from text processors employed in image systems of the FIG. 1 type.

The output images from the FIG. 1 image systems are processed text in human readable form. In FIG. 2, as an example, two lines of text characters "1 2 3 4 5" and "6 7 8 9 0" are drawn along character lines 2 parallel to the X-axis.

Each character associated with character line 2 in the output image is drawn by a number of pixels (dots) where each pixel is located and addressed by an X-axis pixel row coordinate and a Y-axis pixel column coordinate defined relative to the XY-axes system.

Each pixel is drawn by determining the X-axis pixel row and Y-axis pixel column coordinates for the pixel and each character is drawn by determining the X-axis and Y-axis coordinates for all the pixels that are used to draw the character. In FIG. 2, for example, the character "1" drawn with many pixels that occur in horizontal pixel rows and vertical pixel columns.

A pixel map is formed of rectangular arrays of pixels where each pixel can be set independently to one of two or more colors. The number of available colors is generally a power of two and is expressed as a series of data bits. In an embodiment having one bit per pixel and two colors (black and white), then each data bit for a pixel is, for example, a logical 0 (white) or 1 (black). In an embodiment having more than one bit per pixel and more than two colors, then each pixel is represented by a group of data bits.

Data bits arranged in groups form data bytes where a byte is typically eight bits, but any number of bits per byte is possible. In the embodiments described, eight bits per byte is assumed. In embodiments having one bit per pixel, then the array that represents how data bytes, usually in computer memory, are mapped to pixels on a display device is called a bitmap as represented in FIG. 2.

If more than one bit per pixel are present, then there are two common arrays, block arrays and planar arrays as represented in FIG. 3 and FIG. 4, respectively, that represent how data bytes are mapped to pixels on a display device. In the block array of FIG. 3, all bits for one particular pixel occupy the same byte, or occupy consecutive bytes if there are more than eight bits per pixel. In the planar array of FIG. 4, each 8-bit byte, for example, in one plane always represents exactly eight pixels, and additional bytes in additional planes each contributes one bit for a given pixel.

A hybrid array, called a block-planar array, is used when there are more than eight bits per pixel. In this embodiment, one byte is used per pixel, as in the block array, but several planes (usually three for red, green and blue) are used to describe one pixel.

Each byte has memory location defined by an address so that the byte can be accessed for reading or writing, like other memory locations in the data memory of the system. Some systems are able to access bytes at consecutive addresses in groups, typically two or four bytes at a time. There may or may not be bit or byte or other alignment restrictions imposed by the system architecture. Typically, groups of two or more bytes must be accessed with the lower-ordered address bits being even. Since each pixel typically corresponds to a byte in memory at an address location, it is common practice to refer to those corresponding addresses as the addresses of pixels. With such a practice, in order to completely specify the location, both memory byte addresses and memory bit addresses (or the addresses for groups of bits) must be specified.

For rectangular pixel-maps, some systems provide a fixed number of bytes per row of pixels, known as RowBytes. Adding RowBytes to the address of any pixel points to the pixel directly below it, if it exists. Likewise, subtracting RowBytes from the address of a pixel will point to the pixel above. For systems that do not have a fixed number of bytes per row of pixels, an alternative formula (other than simple addition or subtraction) is provided. Alternatively, row addresses can be computed by using a lookup table. Such complications require more complicated code.

In planar arrays, each plane has the same number of bits and occupies the same amount of memory. Like RowBytes, there is a similar constant, a PlaneByt, which is added to the address of a pixel to obtain the address of the same pixel on the adjacent plane in one direction. If a PlaneByte is subtracted, the address of pixel on the adjacent plane in the opposite direction is obtained.

For purposes of the present explanation, the exact color, or shade of monochrome color produced by a given numeric value for a pixel, is not considered although for convenience a foreground color is represented by all 0's or all 1's. This foreground color is usually either the darkest or the lightest color possible on the given display device. The background color usually, but not necessarily, has the opposite bit pattern and color as the foreground color. For the purposes of the present explanation, irrespective of the number of bits per pixel, the foreground color is black, represented by all 1's, and the background color is white, represented by all 0's.

For purposes of the present explanation, the ordering of bits in bytes in the system, big endian or little endia, is not important, that is, whether the left-most bit has the highest or lowest numeric value is not important. In general, the numeric significance of most of the bits in patterns are not of interest. For ease of illustration, however, bits are assumed to be specified in the order in which they are displayed.

Numeric constants are specified in hexadecimal if they are preceded by a "$", thus, by the conventions specified above, a one bit per pixel device, which holds a constant $C6 (binary 11000110) will display (from left to right) two black pixels, followed by three white pixels, followed by two black pixels, followed by a single white pixel.

Flowcharts FIG. 5 through FIG. 7

In FIG. 5, the flowchart for a text processor using a Single-thread glyph compiler is shown.

Entry

The algorithm, as specified, is designed to image text, in a homogeneous font, one line at a time. The exact parameters for entry are not specified and will vary from implementation to implementation depending on the requirements of the system within which it is running. It is possible to think of a text primitive which deals with more than one line, or with text which is not necessarily arranged on a line. These are system-specific details which have little bearing on the basic algorithm. For the sake of clarity in the description, the list of characters to be imaged in one execution of this algorithm is referred to as a character line.

Establish Graphics Environment

This is the initial entry into the text imaging code. This routine looks at the input parameters and the current graphics context and determines basic information about where and how the text is to be drawn. Important information which is needed includes:

The device(s) to which the text be imaged.

The bit depth (number of colors or number of bits per pixel) of each device.

the color in which the text will be imaged.

Other implementation-specific details.

Conditions Favorable

If the text imaging system is the only available implementation, then the answer here is always "Yes", since the text must be imaged. If the imaging system is a supplement to an existing imaging system, then depending on information determined above, the compiled text imaging system may delegate drawing of an image to another text imaging system. For example, one embodiment only deals with text of a particular point size or smaller. If the font is larger, the implementation delegates imaging to another system.

Delegate Control to Underlying Text Mechanism

This routine is where control is given to a slower, but more general, text display mechanism if, for any reason, the compiled glyph system is unable to image the text. This routine is required for the two-threaded sequence, although the single-threaded sequence can be implemented as the sole text imaging sequence where delegation is impossible.

Get Font

Given the parameters of the current graphics context, return a data structure representing the desired text font. This structure will be determined by the following factors:

Text font

Text size, including any magnification or other geometric transformations

Text style—algorithmically applied style such as bolding which affects the appearance of the character glyphs Depth (number of available colors or shades) of the output device Any other system-specific factors.

The returned structure (hereafter referred to simply as the "font") contains an array of font entries, one for each character in the font. Each entry may or may not be completely filled in. It is the job of the compilation routine to fill in each font entry, a character at a time.

"Get Font" also introduces the concept of a font cache. It is assumed that there will be many "Get Font" requests, and that many requests will be for the same font. If such is the case, then the same font structure should be returned each time. Several such fonts are generally kept in primary memory storage (RAM) at a time. The exact policies on how, and for how long, fonts are stored in the cache is system-specific. It should be noted that the current implementation maintains both a RAM font cache and a disk cache. As the RAM cache is filled up, excess fonts are written to disk if not already there. If a new font is requested, the disk cache is consulted before a new, empty font structure is created.

Allocate Display List

The display list is an array with as many fixed size entries as there are characters to be imaged in the current character line width perhaps a fixed number of extra entries for prologue and/or epilogue code. (The current implementation adds one entry for epilogue code, but requires no prologue.) The display list describes the program to be executed when text is drawn as a series of subroutine calls into the individual routines which will image the text. This is interspersed with the addresses of where the text will be drawn. (The current implementation uses the stack at the display list. Each entry is eight bytes long; four bytes for the routine address and four for the destination address. Each routine pops the destination address of the stack, images the character, and then execute a a "Return From Subroutine" instruction which automatically branches to either the next character routine, or the epilogue code once all characters have been imaged.)

For Each Character In Text Line . . .

This is the loop which fills in the display list, and the only place where the original characters are actually scanned.

Is Character Compiled?

The loop checks whether the entry for each individual character has been filled in for the font. If not, this is where the one and two threaded algorithms diverge. The single threaded algorithm will actually compile the character. The two threaded algorithm will only schedule the character to be compiled.

Compile Character

This is the main compilation routine. It will be described in much more detail later.

Mark this and Other Characters as Needing Compilation (Two Threaded algorithm Only.)

Once the first character in a line is found which needs compilation, the main display list building loop is exited and the compiled display process is essentially aborted. A secondary loop is entered which marks this and any remaining characters on the line who's entries have not been filled in as being requested for compilation. It is up to the background thread to fulfill these requests.

Schedule Background Thread (Two Threaded Algorithm Only.)

If not already done so, the operating system is informed that the background thread is to be executed as a low priority (background) process.

Delegate Control to Underlying Text Mechanism (Two Threaded Algorithm Only)

In the two threaded algorithm, the foreground thread never compiles characters, but rather delegates to the underlying text renderer only after scheduling background time so that the same characters will already be compiled in a future request.

Place Routine and Destination Addresses in Display List

This step in the main scanning loop is in charge of converting the exact character position into a destination address and determining the routine to be used to render the character. Depending on the implementation, other steps within the same loop may also have to determine the character's advance width so as to update the current pen position. Other implementations may already provide a list of explicit character positions in which to place the characters. In either case, this loop must also determine a bounding rectangle for all characters to be imaged. This will be used later in the clipping section.

Last Character?

The scanning loop is executed for each character. This loop should be the most highly optimized part of the algorithm in terms of execution speed, and should preferable be written in the assembly language of the implementation architecture, as this is usually the most often executed part of the code, with the exception of the compiled text routines themselves (as a group) and perhaps the clipped blit code.

Text Clipped?

At this point, a decision is made as to whether the text can be imaged directly or must be imaged first to a temporary canvas which is then partially copied to the destination device. All clipping calculations are done here, with the bounding box of the text to be imaged as an essential ingredient. This step may also wish to split up the line into sections with characters which can be imaged directly, those which are partially clipped and must use a temporary canvas, and those which are completely obscured and will not be imaged at all. Compiled routines may also image only in one preferred transfer mode even though the text drawing primitive can display in several transfer modes. If the usual transfer mode is not used, then the temporary canvas may still be needed even if the text is not clipped. The blit step below is thus used for transfer mode conversion, clipping, or both.

Allocate Temporary Canvas

The size of the temporary canvas will vary from execution to execution, and may be rather large so it should be implemented as a dynamically sized buffer which can be reclaimed when not in use.

Point Display List at Temporary Canvas

The display list, as created above, is set up to image the text directly to the output device. This step modifies the display list to point to the temporary canvas instead. (In the current implementation, this is done by adding an offset to each destination entry in the display list, leaving the routine entries unchanged.)

Set Up Execution Environment

The processor state is set up to conform to assumptions made by the compiler about the environment in which compiled code will be executing. This may include, but is not limited to, filling in prologue and/or epilogue routines in the display list, setting up processor registers with certain constants, ensuring that the output device is accessible, and temporarily erasing the mouse cursor if it would interfere with the text being drawn.

Execute Display List

This is where the text is actually drawn, either to the output device or to the temporary canvas.

Text Clipped?

A second branch is made depending on whether the direct or temporary canvas cases are being used. This step should also restore any special processor states changed in the "Set up execution environment" step above to the way they are needed for regular program execution.

Blit Temporary Canvas To Destination

Here, a general purpose blit algorithm is used to image text which, because of either clipping or transfer modes, cannot be imaged directly.

Deallocate Temporary Canvas

The temporary canvas should be reclaimed to the free store or perhaps kept for later use depending on operating system overhead.

Deallocate Display List

Like the temporary canvas, the variable length display list should also be deallocated. (Since the current implementation places the display list on the execution stack, it literally dislocates it as the code is being executed, so the step is automatic.)

Done

Clean up and return to the caller. The job is finished.

Background Thread FIG. 5

In FIG. 5 and FIG. 6, the flowchart for a text processor using a double-thread glyph compiler is shown. In FIG. 5, the foreground thread steps are like those of FIG. 4 except as noted in connection with the FIG. 4 description. In FIG. 5, the background thread steps are as follows.

Enter: Background Task

The background thread is executed only when it is scheduled by the foreground thread.

For Each Font in Cache . . .

The font cache is scanned for all fonts within it. (The current implementation only searches the primary (RAM) cache and does not scan the secondary (disk) cache.

Any Characters to Compile?

If there are no compilation requests for this font, then it is quickly skipped.

For Each Character in Font . . .

The font is scanned for characters which have not been compiled but which have been requested for compilation.

Character Requested for Compilation?

If not, the character is skipped. It is an error for a character to be both already compiled and requested for compilation.

Compile Character

This is the main compilation routine, the same which would have been called directly in the single threaded algorithm.

Time Up?

The flowchart describes an algorithm for a non-preemptive multitasking system. If the operating system is fully preemptive. With processes of varying priorities, then this and the next step are not necessary although control of concurrency would be required.

Yield Till Next Background Time

The background thread gives up control after a given amount of time, but is scheduled to regain control (at the start of the thread) when foreground processes have had time to execute. Note that more character compilation requests may have come in during the yield time, so the font cache must be scanned from the beginning.

Last Character in Font?

The next character is checked and perhaps compiled if there is still time remaining.

Last Font In Cache?

The next font in the cache is processed.

Sleep Till Rescheduled by Foreground Thread

If there are no more pending compilation requests, the background thread unschedules itself until it is again called by the foreground thread.

Variations on the High-level Algorithms

In addition to the single-thread and double-thread algorithms described above, there are many variations and simplifications of the algorithm which might be employed. Below is a list of typical variations.

Off-line compiler—In this case, all compilation is done beforehand and the compiler is only used as a separate tool for generating pre-compiled fonts. This may be quite practical if the number of required fonts is limited and known ahead of time. Indeed, the compiler need not be present in the delivered system. The end result, though, is still the same. The only difference is when the code is compiled.

No Display List—The code to position each character on the line, and the execution of the character can be done in the same loop without first creating a display list and then executing the characters within it. This is an architecture-dependent design decision and does not fundamentally affect the workings of either the compiler nor the executed code.

Clipping decisions—The depicted algorithms assume that the text bounding box is not known until the display list is created. If the bounding box it known ahead of time, or if clipping is not necessary, then the algorithm may be simplified in various ways. For example, if known ahead of time that the text will need to be imaged to a temporary canvas, there is no need for a "fix-up" phase before execution. This variation is quite dependent on the imaging system in which the compiled text routines are being put to use and, again, does not affect the compiler nor the generated code.

Font Cache changes—The internal workings of the font cache, if any, have not been described for purposes of clarity and conciseness. The requirements for a font cache, either in primary or secondary memory need to be considered on an implementation-by-implementation basis, and are quite removed from the workings of the compiler, although the size of the generated code may come into play in certain caching decisions.

Compilation Methods

The key part of the compiled text system is the compiler, which translates a source character into the code which is directly executable by the target machine. Several algorithms will be described, each of which handles a different type of display as described above. An algorithm for imaging on block devices with fewer than eight bits per pixel, and algorithm for block devices with eight or more bits per pixel, and an algorithm for planar devices, as well as an algorithm for block-planar devices will be described. (The current implementation only supports block devices with 1, 2, 4, 8, 16, and 32 bits per pixel, but the planar and block-planar algorithms are simple modifications on the schemes that will be presented.)

* * * *Basic Algorithm* * * *

All compilation algorithms have one thing in common. They take input in a common form. First of all, the text character, glyph, which is to be compiled must be made available. This can take one of several common forms, such as a pixel map, or a run-length encoded description. This may have been obtained directly from secondary memory (a bitmap, or run-length font file) or by a scaled font rendering engine which, in turn, gets its input from a font representation described in terms of straight lines and curves (an outline font)). In any case, the image of the compiled character is obtained in a suitable form on a temporary canvas. The compiler then scans this canvas and emits code which will image that character at any location on a given output device.

The preferred form of the image to be compiled is system specific. For example, the current implementation always obtains a bitmap, but for compilation at eight or more bits per pixel, this bitmap in converted into a run-length encoded form. Both forms have advantages depending on the nature of the generated code. In any case, it is assumed that the code will produce its output on some sort of pixel map. Although there are devices which can display data in vector or run-length form, only pixel map or raster output devices are of interest.

To describe the simplest case of compiled text, consider a block output device with eight bits (1 byte) per pixel. A small letter S as shown in FIG. 8.

The s character of FIG. 8 typically has glyph code and generates as indicated in the following TABLE 1:

TABLE 1

| 1 MOVE | ImageAddress,R0 | R0 contains image address at baseline |
|---|---|---|
| 2 MOVE | #Black,1(R0) | Set left pixel in bottom row1 |
| 3 MOVE | #Black,2(R0) | Set right pixel in bottom row 1 |
| 4 SUBTRACT | RowBytes,R0 | Move to second row |
| 5 MOVE | #Black,0(R0) | Set left pixel in second row |
| 6 MOVE | #Black,3(R0) | Set right pixel in second row |
| 7 SUBTRACT | RowBytes,R0 | Move to third row |
| 8 MOVE | #Black,3(R0) | Set single pixel in third row |
| 9 SUBTRACT | RowBytes,R0 | Move to fourth row |
| 10 MOVE | #Black,1(R0) | Set left pixel in fourth row |
| 11 MOVE | #Black,1(R0) | Set right pixel in fourth row |
| 12 SUBTRACT | RowBytes,R0 | Move to fifth row |
| 13 MOVE | #Black,0(R0) | Set single pixel in fifth row |
| 14 SUBTRACT | RowBytes,R0 | Move to sixth row |
| 15 MOVE | #Black,0(R0) | Set left pixel in sixth row |
| 16 MOVE | #Black,3(R0) | Set right pixel in sixth row |

TABLE 1-continued

| 17 SUBTRACT | RowBytes,R0 | Move to top row |
|---|---|---|
| 18 MOVE | #Black,1(R0) | Set left pixel in top row 7 |
| 19 MOVE | #Black,2(R0) | Set right pixel in top row 7 |
| 20 RETURN | | End of routine |

The general form of the TABLE 1 code scans the character from bottom to top, and for each row, from left to right. There is an instruction for each pixel which is to be turned black. There is also an instruction to move up to the next row by subtracting RowBytes from address register R0 to obtain the address of the next higher row. Finally, the routine ends with a RETURN statement.

Specific Optimization

The general style of the compiled code to be generated has been described. The following features for optimization for compiled code are particularly useful:

Register data values

Loops

Index register control values

Literal data

Code folding

Peephole optimization

These optimizations have specific and unique application to compiled glyphs because they are used for various patterns which occur regularly in text.

Register Data Values

The code generated to image the "s" in FIG. 8 can be improved in several ways. The constant #Black may limit the routine's usefulness to only display text in one color. If the value for the desired color is loaded into a register ahead of time, then text in any desired color can be drawn using the same routine. If the processor includes a MOVE MULTIPLE instruction, then neighboring pixels on rows 1, 4 and 7 can be drawn with a single instruction. Lines 2–3, 10–11, and 18–19 can be combined into three instances of a single instruction. This assumes that registers R1 and R2 have been preloaded with the desired color constant, such as BLACK.

21 Move Multiple R1–R2, 1(R0) Draw both pixels in row

The first use of data values in data registers stores constants which are transferred to the output device. Horizontal runs of consecutive pixels can be operated upon by a MOVE MULTIPLE instruction, if all bits in the bytes which are addressed are to be affected. This makes the MOVE MULTIPLE technique most effective when working at eight bits per pixel or greater. As described, below, data registers can be used effectively with the AND and OR instructions at lower bit depths.

Loops

Consider a new example, a "T" as shown in FIG. 9.

A compiler can generate the following code of TABLE 2 using the data register optimization described above:

TABLE 2

| 22 MOVE | ImageAddress,R0 | R0 contains image address at baseline |
|---|---|---|
| 23 | | Assume R1–R5 contain desired color |
| 24 MOVE | R1,3(R0) | Set pixel in bottom row 1 |
| 25 SUBTRACT | RowBytes,R0 | Move to second row |
| 26 MOVE | R1,3(R0) | Set pixel in second row |
| 27 SUBTRACT | RowBytes,R0 | Move to third row |
| 28 MOVE | R1,3(R0) | Set pixel in third row |
| 29 SUBTRACT | RowBytes,R0 | Move to fourth row |

TABLE 2-continued

| | | |
|---|---|---|
| 30 MOVE | R1,3(R0) | Set pixel in fourth row |
| 31 SUBTRACT | RowBytes,R0 | Move to fifth row |
| 32 MOVE | R1,3(R0) | Set pixel in fifth row |
| 33 SUBTRACT | RowBytes,R0 | Move to sixth row |
| 34 MOVE | R1,3(R0) | Set pixel in sixth row |
| 35 SUBTRACT | RowBytes,R0 | Move to top row 7 |
| 36 MOVE MULTIPLE | R1–R5,0(R0) | Set pixels in top row 7 |
| 37 RETURN | | End of routine |

Notice that the block of code in lines 24–35 of TABLE 2 is repetitive. Each pair of instructions is the same because the T has a long vertical stroke. This code of TABLE 2 can be optimized into a loop as shown in TABLE 3 as follows:

TABLE 3

| | | |
|---|---|---|
| 38 MOVE | ImageAddress,R0 | R0 contains image address at baseline |
| 39 | | Assume R1–R5 contain desired color |
| 40 MOVE | #6,R6 | R6 is a loop counter for six rows. |
| 41 MOVE | R1,3(R0) | Set pixel in bottom row 1 |
| 42 SUBTRACT | RowBytes,R0 | Move to second row |
| 43 DECREMENT AND BRANCH | R6,Line24 | loop six times |
| 44 MOVE MULTIPLE | R1–R5,0(R0) | Set pixles in top row 7 |
| 45 RETURN | | End of routine |

Note that the TABLE 3 generated code is much shorter than the TABLE 1 code. As an added bonus, many processors employ an instruction cache which allows the second and later execution of the loop to occur faster. Obviously, loop optimization can be done when long vertical strokes or parallel vertical lines are encountered. For example, a letter "H" might have two such loops for the lower and upper parts of the body, making the center crossbar the only code not in a loop.

In general, loops can be useful in the case of repeated consecutive rows. This is not limited, however, to long vertical strokes, for example, diagonal strokes for obliqued text can be created by using a value slightly different from RowBytes, perhaps RowBytes+1 in order to move from row to row. At medium to low resolutions, many characters will have repeated rows of rasters where one would think that curved lines would belong. As long as the minimum number of iterations allowable in the loop is kept low enough (perhaps as few as two), there are a surprising number of loops that can be found in most text characters.

Index Register Usage

The examples, so far, have used a memory location, RowBytes to move to the next row. This addressing is used so often that it merits its own register, thus lines like

| | | |
|---|---|---|
| 46 SUBTRACT | RowBytes,R0 | Move to next row |
| are replaced by lines like | | |
| 47 SUBTRACT | R6,R0 | Move to next row, R6-RowBytes |

Many processors allow an addressing mode which includes a pair of registers (an address register and an index register) plus an offset. If several registers are loaded with multiples of RowBytes, then many of the SUBTRACT instructions can be avoided. Furthermore, if the index register can be scaled, as is often the case, this can be used to extend the reach of a small number of registers dedicated to this purpose.

To optimize the "S" code example of TABLE 1, the index registers R6, R7 and R8 are loaded with the negative or RowBytes, RowBytes*3 and RowBytes*5 respectively, and are scaled by 2 or 4 when calculating an effective address as indicated in TABLE 4. (Note the negative of RowBytes gives additive addressing when moving up from the baseline.)

TABLE 4

| | | |
|---|---|---|
| 48 MOVE | ImageAddress,R0 | R0 contains image address at baseline |
| 49 | | Assume R1–R2 contain desired color |
| 50 | | Assume R6 contains -RowBytes |
| 51 | | Assume R7 contains -RowBytes*3 |
| 52 | | Assume R8 contains -RowBytes*5 |
| 53 MOVE MULTIPLE | R1–R2,1(R0) | Set both pixels in bottom row 1 |
| 54 MOVE | R1,0(R0,R6) | Set left pixel in second row |
| 55 MOVE | R1,3(R0,R6) | Set right pixel in second row |
| 56 MOVE | R1,3(R0,R6*2) | Set single pixel in third row |
| 57 MOVE MULTIPLE | R1–R2,1(R0,R7) | Set both pixels in fourth row |
| 58 MOVE | R1,0(R0,R6*4) | Set single pixel in fifth row |
| 59 ADD | R8,R0 | Move to sixth row from first |
| 60 MOVE | R1,0(R0) | Set left pixel in sixth row |
| 61 MOVE | R1,3(R0) | Set right pixel in sixth row |
| 62 MOVE MULTIPLE | R1–R2,1(R0,R6) | Set both pixels in top row 7 |
| 63 RETURN | | End of routine |

Notice that the code of TABLE 4 is somewhat smaller than the code in TABLE 1 since all but three instructions are involved in actually drawing part of the character in TABLE 4. Notice also the choice of values for index registers depending on the chosen architecture. R6, **R6*2, R7, R6*4, and R8 cover the cases of 1, 2, 3, 4, or five rows above the one pointed by R0. R8, however, cannot be used as an index register itself, because no index with a reach of 6 is present in order to move up to the upper half of the character. Actually, R8** could have been used as an index register had it been needed for the top row, since no further upward movement is necessary.

Operations at Small Bit Depths

Up till now, only examples of code for block (Chunky) output devices at eight bits per pixel has been discussed. This has the natural advantage that each pixel is represented by exactly one byte. Compiled code for higher depths follows logically from the eight bit case. Compiled code for lower depths, however, requires new techniques. The one bit per pixel case, in particular, is quite important, since it occurs quite often and it is also the basis for planar output devices at higher depths.

For one bit per pixel, data can no longer be simply stored to various addresses, since several horizontal pixels are represented by one byte. Two or more characters can share parts of the same byte, so simply storing a constant in a location in the output device as part of the routine for a single character would obliterate part of the image for a character previously drawn. It is assumed that the processor manipulates at least one byte of data at a time. Some processors have so called bit field instructions which can operate on consecutive runs of bits which might span bytes. These are not universally available, however, and are often no faster than performing similar operations with ordinary shifting and boolean instructions, since the microcode still implements the bit field instructions in terms of byte-wide loads and stores. For this reason, the availability of bit field instructions has not been assumed, and it is assumed that only the traditional shift and boolean operators are available.

Furthermore, the generated code will only one of either the AND or OR instruction.

The code that will be generated for lower bit depths will be less general than that discussed so far in that it will only be able to draw characters in a single foreground color. Drawing in other colors will generally require different code to be generated, or can be done in a two-step process by first drawing the compiled text in the primary color to a temporary canvas, and then using a special BLT to copy the text to the output device while simultaneously changing its color. For a two-color, one bit per pixel device) assume that the two colors are black and white, although the actual colors may vary depending on the device being used. The device has a usual background and foreground color. Text is drawn in the foreground color. This can either be black text on a white background, or white text on a black background. Furthermore, "white" can either be represented by all one's or all zero's. Either AND or OR operators are used depending on these two factors. This creates a two by two truth table as follows.

TABLE 5

|  |  | Bit value for "White" | |
| --- | --- | --- | --- |
|  |  | 0 | 1 |
| Foreground Color | Black | OR | AND |
|  | White | AND | OR |

Since the AND and OR operations are exact duals of one another, there is no loss in generality in only considering one of these cases for the remaining discussion. For this reason, it is assumed that the OR operator will be used to draw text by setting 1 bits on a background of 0 bits.

Most processors can deal with data which is more than one byte wide in a single operation. Typically, a processor can handle 16 bit 32 bit, or 64 bit data paths. In the discussions above this issue was avoided and it is assumed that each instruction was operating on one byte, except the MOVE MULTIPLE instruction which operated on as many bytes as the number of registers specified. Working with more than one byte at a time can often lead to improved performance. Many processors, however, impose alignment restrictions on how multi-byte quantities can be addressed.

A typical restriction is that a 16 bit (two byte) quantity can only be accessed if the lower addressed byte is eve. This is known as a 16 bit word alignment restriction. Other processors present no such restrictions, but may impose some speed penalty if the access is not correctly aligned. The addressing resolution of a given processor is defined to be the minimum bit alignment required for addressing memory by any of the instructions used by the compiled code. Typical addressing resolutions are eight, 16, and 32 bits. Clearly, the lower the addressing resolution, the easier it will be to generate code for that processor. Addressing resolution can sometimes be made smaller by avoiding the use of instructions that require stricter alignment restrictions. It might also be artificially raised to better take advantage of alignment optimization inherent in the processor's architecture. These decisions, however, are processor dependent.

We also define a shift factor to be the distance between the nearest addressing resolution boundary and the left-most pixel of a character drawn on the output device, that is, the number of background pixels between the nearest addressing resolution boundary to the left of the character and the left-most foreground pixel in any horizontal row of that character. Shift factors are measured in pixels and are numbered from 0 to (addressing resolution/bits per pixel) −1.

Code is generated not just for each character, but for each shift factor of each character. This is known as pre-shifting, in that all constants needed for drawing a character are pre-computed for each shift factor. The concept of pre-shifting is combined with the optimization discussed so far and create new ways of storing text partially in code, and partially in data specific to that code.

An example of a number 1 at one bit per pixel is shown in FIG. 10, using only optimization discussed as indicated in TABLE 6 so far. It is assumed that the processor has an addressing resolution of 8 bits, but it can handle at least 16 bit quantities. A convention of adding a suffix, such as "0.8" or "0.16" to the assembly language instructions is used to describe the sized quantity it is dealing with. As was mentioned earlier, it was assumed for the sake of illustration, without loss of generality, that a big endian processor is being used, so the left-most bits (and pixels) have the highest numeric significance.

TABLE 6

Copyright 1991 Frame Technoiogy Corporation

| | | | |
| --- | --- | --- | --- |
| 64 | | | Code for Shift Factor 0 |
| 65 | MOVE | ImageAdress,R0 | R0 contains image address at baseline |
| 66 | | | Assume R6 is -RowBytes |
| 67 | OR.8 | #$E0,0(R0) | 11100000 for bottom row |
| 68 | ADD | R6,R0 | move to next row |
| 69 | MOVE | #4,R5 | set up loop counter |
| 70 | OR.8 | #$40,0(R0) | 01000000 for main stem |
| 71 | ADD | R6,R0 | move to next row |
| 72 | DECREMENT AND BRANCH | R5,Line82 | loop 4 times |
| 73 | OR.8 | #$C0,0(R0) | 11000000 for flag |
| 74 | OR.8 | #$40,0(R0,R6) | 01000000 for top row |
| 75 | RETURN | | End of code for shift factor 0 |
| 76 | | | Code for Shift Factor 1 |
| 77 | MOVE | ImageAddress,R0 | R0 contains image address at baseline |
| 78 | | | Assume R6 is -RowBytes |
| 79 | OR.8 | #$70,0(R0) | 01110000 for bottom row |
| 80 | ADD | R6,R0 | move to next row |
| 81 | MOVE | #4,R5 | set up loop counter |
| 82 | OR.8 | #$20,0(R0) | 00100000 for main row |
| 83 | ADD | R6,R0 | move to next row |
| 84 | DECREMENT AND BRANCH | R5,Line82 | loop 4 times |
| 85 | OR.8 | #$60,6(R0) | 01100000 for flag |

TABLE 6-continued

Copyright 1991 Frame Technoiogy Corporation

| | | | |
|---|---|---|---|
| 86 | OR.8 | #$20,0(R0,R6) | 00100000 for top row |
| 87 | RETURN | | End of code for shift factor 1 |
| 88 | | | Code for Shift Factor 2 |
| 89 | MOVE | ImageAddress,R0 | R0 contains image address at baseline |
| 90 | | | Assume R6 is -RowBytes |
| 91 | OR.8 | #$38,0(R0) | 00111000 for bottom row |
| 92 | ADD | R6,R0 | move to next row |
| 93 | MOVE | #4,R5 | set up loop counter |
| 94 | OR.8 | #$10,0(R0) | 00010000 for main stem |
| 95 | ADD | R6,R0 | move to next row |
| 96 | DECREMENT AND BRANCH | R5,Line82 | loop 4 times |
| 97 | OR.8 | #$30,0(R0) | 00110000 for flag |
| 98 | OR.8 | #$10,0(R0,R6) | 00010000 for top row |
| 99 | RETURN | | End of code for shift factor 2 |
| 100 | | | Code for Shift Factor 3 |
| 101 | MOVE | ImageAddress,R0 | R0 contains image address at baseline |
| 102 | | | Assume R6 is -RowBytes |
| 103 | OR.8 | #$1C,0(R0) | 00011100 for bottom row |
| 104 | ADD | R6,R0 | move to next row |
| 105 | MOVE | #4,R5 | set up loop counter |
| 106 | OR.8 | #$08,0(R0) | 00001000 for main stem |
| 107 | ADD | R6,R0 | move to next row |
| 108 | DECREMENT AND BRANCH | R5,Line82 | loop 4 times |
| 109 | OR.8 | #$18,0(R0) | 00011000 for flag |
| 110 | OR.8 | #$08,0(R0,R6) | 00001000 for top row |
| 111 | RETURN | | End of code for shift factor 3 |
| 112 | | | Code for Shift Factor 4 |
| 113 | MOVE | ImageAddress,R0 | R0 contains image address at baseline |
| 114 | | | Assume R6 is -RowBytes |
| 115 | OR.9 | #$0E,0(R0) | 00001110 for bottom row |
| 116 | ADD | R6,R0 | move to next row |
| 117 | MOVE | #4,R5 | set up loop counter |
| 118 | OR.8 | #$04,0(R0) | 00000100 for main stem |
| 119 | ADD | R6,R0 | move to next row |
| 120 | DECREMENT AND BRANCH | R5,Line82 | loop 4 times |
| 121 | OR.8 | #$0,0(R0) | 00001100 for flag |
| 122 | OR.8 | #$04,0(R0,R6) | 00000100 for top row |
| 123 | RETURN | | End of code for shift factor 4 |
| 124 | | | Code for Shift Factor 5 |
| 125 | MOVE | ImageAddress,R0 | R0 contains image address at baseline |
| 126 | | | Assume R6 is -RowBytes |
| 127 | OR.8 | #$07,0(R0) | 00000111 for bottom row |
| 128 | ADD | R6,R0 | move to next row |
| 129 | MOVE | #4,R5 | set up loop counter |
| 130 | OR.8 | #$02,0(R0) | 00000010 for main stem |
| 131 | ADD | R6,R0 | move to next row |
| 132 | DECREMENT AND BRANCH | R5,Line82 | loop 4 times |
| 133 | OR.8 | #$06,0(R0) | 00000110 for flag |
| 134 | OR.8 | #$02,0(R0,R6) | 00000010 for top row |
| 135 | RETURN | | End of code for shift factor 5 |
| 136 | | | Code for Shift Factor 6 |
| 137 | MOVE | ImageAddress,R0 | R0 contains image address at baseline |
| 138 | | | Assume R6 is -RowBytes |
| 139 | OR.16 | #$0380,0(R0) | 0000001110000000 for bottom row |
| 140 | ADD | R6,R0 | move to next row |
| 141 | MOVE | #4,R5 | set up loop counter |
| 142 | OR.8 | #$01,0(R0) | 00000001 for main stem |
| 143 | ADD | R6,R0 | move to next row |
| 144 | DECREMENT AND BRANCH | R5,Line82 | loop 4 times |
| 145 | OR.8 | #$03,0(R0) | 00000011 for flag |
| 146 | OR.8 | #$01,0(R),R6) | 00000001 for top row |
| 147 | RETURN | | End of code for shift factor 6 |
| 148 | | | Code for Shift Factor 7 |
| 149 | MOVE | ImageAddress,R0 | R0 contains image address at baseline |
| 150 | | | Assume R6 is -RowBytes |
| 151 | OR.16 | #$01C0,0(R0) | 0000000111000000 for bottom row |
| 152 | ADD | R6,R0 | move to next row |
| 153 | MOVE | #4,R5 | set up loop counter |
| 154 | OR.8 | #$80,1(R0) | 10000000 on second byte for main stem |
| 155 | ADD | R6,R0 | move to next row |
| 156 | DECREMENT AND BRANCH | R5,Line82 | loop 4 times |
| 157 | OR.16 | #$0180,0(R0) | 0000000110000000 for flag |
| 158 | OR.8 | #$80,1(R0,R6) | 10000000 on second byte for top row |
| 159 | RETURN | | End of code for shift factor 7 |
| 160 | | | |

Literal Pools and Code Folding

Note that the code in TABLE 6 is rather long-winded, because code for not one but eight shift factors must be generated. Note, however, the striking similarity of the code for the first six shift factors. It essentially involves the same instructions, just with different constant operands. The last two shift factors, however, use slightly different code. It would be nice if the code for at least the first six could somehow be merged.

This is possible by first loading the constants needed by each routine into registers, and then branching into common code. Indeed, this is what is done with the literal pool and code folding optimization.

The literal pool optimization sets registers up, not by explicitly loading them with constants, but rather, obtaining those constants from a literal pool, an area containing data which is to be loaded into registers. The operation is not limited to bit constants, instructions using loop counts or any other constants may be placed into the literal pool as well.

Once loaded, the code folding optimization merges common code since the salient differences between the various shift factors has been eliminated. Below in TABLE 7 is the optimized code for the number 1 of FIG. 10.

TABLE 7

Copyright 1991 Frame Technology Corporation

| | | | |
|---|---|---|---|
| 161 | | | Code for Shift Factor 0 |
| 162 | MOVE MULTIPLE.8 | Line 206,R2–R5 | get constants from literal pool |
| 163 | MOVE | ImageAddress,R0 | R0 contains image address at baseline |
| 164 | | | Assume R6 is -RowBytes |
| 165 | OR.8 | R2,0(R0) | bottom row |
| 166 | ADD | R6,R0 | move to next row |
| 167 | OR.8 | R3,0(R0) | 01000000 for main stem |
| 168 | ADD | R6,R0 | move to next row |
| 169 | DECREMENT AND BRANCH | R5,Line82 | loop 4 times |
| 170 | OR.8 | R4,0(R0) | 11000000 for flag |
| 171 | OR.8 | R3,0(R0,R6) | 01000000 for top row |
| 172 | RETURN | | End of code for shift factor 0 |
| 173 | | | Code for Shift Factor 1 |
| 174 | MOVE MULTIPLE.8 | Line207,R2–R5 | Get constants from literal pool |
| 175 | BRANCH | Line163 | Merge with shift Factor 0 code |
| 176 | | | Code for Shift Factor 2 |
| 177 | MOVE MULTIPLE.8 | Line208,R2–R5 | Get constants from literal pool |
| 178 | BRANCH | Line163 | Merge with Shift Factor 0 code |
| 179 | | | Code for Shift Factor 4 |
| 180 | MOVE MULTIPLE.8 | Line209,R2–R5 | Get Constants from literal pool |
| 181 | BRANCH | Line163 | Merge with Shift Factor 0 code |
| 182 | | | Code for Shift Factor 4 |
| 183 | MOVE MULTIPLE.8 | Line210,R2–R5 | Get constants from literal pool |
| 184 | BRANCH | Line163 | Merge with Shift Factor 0 code |
| 185 | | | Code for Shift Factor 5 |
| 186 | MOVE MULTIPLE.8 | Line211,R2–R5 | Get constants from literal pool |
| 187 | BRANCH | Line163 | Merge with Shift Factor 0 code |
| 188 | | | Code for Shift Factor 6 |
| 189 | MOVE MULTIPLE.16 | Line212,R2–R5 | Get constants from literal pool |
| 190 | MOVE | ImageAddress,R0 | R0 contains image address at baseline |
| 191 | | | Assume R6 is -RowBytes |
| 192 | OR.16 | R2,0(R0) | 0000001110000000 for bottom row |
| 193 | BRANCH | Line166 | Merge with Shift Factor 0 code |
| 194 | | | Code for Shift Factor 7 |
| 195 | MOVE MULTIPLE.16 | Line213,R2–R5 | get constants from literal pool |
| 196 | MOVE | ImageAddress,R0 | R0 contains image address at baseline |
| 197 | | | Assume R6 is -RowBytes |
| 198 | OR.16 | R2,0(R0) | 0000000111000000 for bottom row |
| 199 | ADD | R6,R0 | move to next row |
| 200 | OR.8 | R3,1(R0) | 10000000 on second byte for main stem |
| 201 | ADD | R6,R0 | move to next row |
| 202 | DECREMENT AND BRANCH | R5,Line82 | loop 4 times |
| 203 | OR.16 | R4,0(R0) | 0000000110000000 for flag |
| 204 | OR.8 | R3,1(R0,R6) | 10000000 on second byte for top row |
| 205 | RETURN | | End of code for shift factor 7 |
| 206 | Pool.8 | $E0,$40,$80,$04 | Literal pool for Shift Factor 0 |
| 207 | Pool.8 | $70,$20,$40,$04 | Literal pool for Shift Factor 1 |
| 208 | Pool.8 | $38,$10,$20,$04 | Literal pool for Shift Factor 2 |
| 209 | Pool.8 | $1C,$08,$10,$04 | Literal pool for Shift Factor 3 |
| 210 | Pool.8 | $0E,$04,$08,$04 | Literal pool for Shift Factor 4 |
| 211 | Pool.8 | $07,$02,$04,$04 | Literal pool for Shift Factor 5 |
| 212 | Pool.16 | $0380,$0001, $0002,$0004 | Literal pool for Shift Factor |
| 213 | Pool.16 | $01C0,$0080, $0001,$0004 | Literal pool for Shift Factor |

Notice that the optimized, folded code of TABLE 7 is much smaller than the unoptimized code of TABLE 6. The code for shift factors 1 through 5 is little more than a MOVE MULTIPLE followed by a branch into the code for shift factor 0. The code for shift factor 6 can also branch into the shift factor 0 code, but at a later point, since the first row requires a 16 bit instruction, rather than an 8 bit, as do all the other shift factors. Finally, the optimization fails for shift factor seven where no code can be merged, but the literal pool still allows the automatic loading of the loop counter for the stem. Also, the fact that the bit constants are in registers may improve performance depending on the specific characteristics of the processor.

Note that the literal pool contains all of the bit constants to be used for the text, as would be used for a category 1 text display system, but the actual ordering and structure of the pool, i.e., what elements are used for what purposes, depends on the generated code. In other words, the layout of the literal pool is completely at the discretion of the compiler. Also, note that while code can be readily merged for different shift factors of the same character, it is unlikely that two different characters, even within the same font, will share the same code structure. It is thus probably not very beneficial to look for code folding across characters.

peephole optimizations more effective. For example, the literal pool in TABLE 7 above was placed after all the code, rather than interspersed with the code so as to possibly make it more likely that the branch made to merge with a previous shift factor can be a short branch. The architecture of the target processor will guide these sorts of decisions.

Planar Output Devices

So far the block output devices have been considered as well as those which have only one bit per pixel. The algorithms for planar devices are derived from the one bit per pixel algorithm. The simplest approach is to simply re-execute the one bit per pixel code on each plane. A more interesting approach is to use a technique similar to the index register optimization described above but to index by PlaneBytes instead of RowBytes. For example, TABLE 8 is the code for a shift factor 0 of the "1" example for a four plane output device.

TABLE 8

| 214 | | | Code for Shift Factor 0 |
|---|---|---|---|
| 215 | MOVE MULTIPLE.8 | Line 240,R2-R5 | get constants from literal pool |
| 216 | MOVE | ImageAddress,R0 | R0 contains image address at baseline |
| 217 | | | Assume R6 is -RowBytes |
| 218 | | | Assume R7 is PlaneBytes |
| 219 | | | Assume R8 is 3*PlaneBytes |
| 220 | OR.8 | R2,0(R0) | bottom row, plane 0 |
| 221 | OR.8 | R2,0(R0,R7) | -plane 1 |
| 222 | OR.8 | R2,0(R0,R7*2) | -plane 2 |
| 223 | OR.8 | R2,0(R0,R8) | -plane 3 |
| 224 | ADD | R6,R0 | move to next row |
| 225 | OR.8 | R3,0(R0) | 01000000 for main stem, plane 0 |
| 226 | OR.8 | R3,0(R0,R7) | -plane 1 |
| 227 | OR.8 | R3,0(R0,R7*2) | -plane 2 |
| 228 | OR.8 | R3,0(R0,R8) | -piane 3 |
| 229 | ADD | R6,R0 | move to next row |
| 230 | DECREMENT AND BRANCH | R5,Line225 | loop 4 times |
| 231 | OR.8 | R4,0(R0) | 11000000 for flag, plane 0 |
| 232 | OR.8 | R4,0(R0,R7) | -plane 1 |
| 233 | OR.8 | R4,0(R0,R7*2) | -plane 2 |
| 234 | OR.8 | R4,0(R0,R8) | -plane 3 |
| 235 | OR.8 | R3,0(R0,R6) | -1000000 for top row, plane 0 |
| 236 | OR.8 | R3,0(R0,R7) | -plane 1 |
| 237 | OR.8 | R3,0(R0,R7*2) | -plane 2 |
| 238 | OR.8 | R3,0(R0,R8) | -plane 3 |
| 239 | RETURN | | End of code for shift factor 0 |
| 240 | pool.8 | $E0,$40,$80,$04 | Literal pool fbr Shift Factor 0 |

As a character becomes more complex, there may be more bit constants needed to compile the character than there are available registers. In this case, the compiler may have to revert to placing the bit constants as immediate operands in-line with the code, thus foregoing the possibility of code folding. Alternatively, the literal pool might be accessed more than once in the execution of the compiled character. Sometimes, it may be more efficient to deal with an immediate value, than first loading a constant into a register and using it. This is especially true if the constant is used but once. Should these be placed in the literal pool, or in-line? This is a speed/space trade-off which is processor dependent.

Peephole Optimizations

Last, any good compiler should have a peephole optimizer. This is a collective set of very processor-dependent optimizations which ensure that the local code to perform any operation is optima. This usually takes the form of using the simplest form of an instruction needed, or using a short form of a branch when possible. These sorts of optimizations are very common and processor-specific and will thus not be expanded upon. Sometimes, however, the higher level structure of generated code might be modified to make some If an index register is devoted to each plane (including plane 0, whose index would normally be zero) then different colors can be imaged by setting up the index registers in such a way that only certain planes will be affected, (perhaps several times) and others are not touched. This can be done by simply setting certain index registers to the same values so that the code which normally writes to a particular plane instead writes to the same plane as other code. This works because both AND and OR are independent operators; i.e., ((A OR B) or B)–(A OR B). In other words, it never hurts to draw the same exact image over a given plane. Since color is achieved by writing on some planes but not others, any color which images on at least one plane can be displayed. (The case of imaging on no planes is a no-op, and can be detected and skipped.)

Block-planar devices are generally used for Red Green Blue displays, and have a "chunk" factor of eight bits per pixel, Again, the simplest approach is to use the appropriate block algorithm multiple times, once for each plane. Alternatively, an approach similar to the planar example in FIG. 14 above can be used. The latter approach may be quite practical since the eight bit block code is generally quite small compared to similar code at smaller and larger depths, and the number of planes is generally only three. Note, however, that since at least three registers will need to be devoted to store the values that will be placed in each plane, there will generally be less room for using MOVE MULTIPLE instructions to fill long horizontal strokes.

A Detailed Example

All of the above discussion applies to a wide class of general purpose processors. The example code given wag in a hypothetical pseudo-machine. The following example of TABLE 9 is for a Motorola 68000 processor. The character is a Times Roman 12 point upper-case "P" at 72 dots per inch as shown in FIG. 11. The code is for 1 bit per pixel, and the addressing resolution, and thus the number of shift factors is 16. If the code were to be run only on 68020 and later processors, the addressing resolution could be reduced to 8 with a significant decrease in code size.

The generated code illustrates all of the optimizations described here, although not all may be used wherever possible because of process-dependent timing and code size considerations.

TABLE 1

Copyright 1991 Frame Technology Corporation

```
;-Shift 0------------------------------
MOVEM.W         *+$0134,D0-D6
MOVEA.L         (A7) +, A4
OR.W            D6, (A4)
ADDA.W          A5, A4
OR.W            D2, (A4)
ADDA.W          A5, A4
DBF             D3, *-$0004
OR.W            D5, (A4)
ADDA.W          A5, A4
OR.W            D1, (A4)
ADDA.W          A5, A4
OR.W            D0, (A4)
ADDA.W          A5, A4
OR.W            D1, (A4)
ADDA.W          A5, A4
OR.W            D4, (A4)
RTS             D4, (A4)
;-Shift 1------------------------------
MOVEM.W         *+$0116, D0-D6
BRA.S           *-$002C
;-Shift 2------------------------------
MOVEM.W         *+$011C, D0-D6
BRA.S           *-$0034
;-Shift 3------------------------------
MOVEM.W         *+$0122, D0-D6
BRA.S           *-$003C
;-Shift 4------------------------------
MOVEM.W         *+$0128, D0-D6
BRA.S           *-$0044
;-Shift 5------------------------------
MOVEM.W         *+$012E, D0-D6
BRA.S           *-$004C
;-Shift 6------------------------------
MOVEM.W         *+$0134, D0-D6
BRA.S           *-$0054
;-Shift 7------------------------------
MOVEM.W         *+$013A, D0-D6
BRA.S           *-$005C
;-Shift 8------------------------------
MOVEM.W         *+$0140, D0-D6
BRA.S           *-0064
;-Shift 9------------------------------
MOVEM.W         *+$0146, D0-D6
BRA.S           *-$006C
;-Shift 10-----------------------------
MOVEM.L         *+$014C, D0-D6
MOVEA.L         (A7) +, A4
OR.W            D6, (A4)
ADDA.W          A5, A4
OR.W            D2, (A4)
ADDA.W          A5, A4
DBF             D3, *-$0004
OR.W            D5, (A4)
ADDA.W          A5, A4
OR.W            D1, (A4)
ADDA.W          A5, A4
OR.L            D0, (A4)
ADDA.W          A5, A4
OR.L            D0, (A4)
BRA.S           *-$0074
```

TABLE 1-continued

Copyright 1991 Frame Technology Corporation

```
;-Shift 11----------------------------
       MOVEM.L            *+$0144, D0–D6
       MOVEA.L            (A7) +, A4
       OR.W               D6, (A4)
       ADDA.W             A5, A4
       OR.W               D2, (A4)
       ADDA.W             A5, A4
       DBF                D3, *-$0004
       OR.W               D5, (A4)
       ADDA.W             A5, A4
       OR.L               D1, (A4)
       ADDA.W             A5, A4
       OR.L               D0, (A4)
       ADDA.W             A5, A4
       OR.L               D0, (A4)
       ADDA.W             A5, A4
       OR.L               D1, (A4)
       BRA                *-$0098
;-Shift 12----------------------------
       MOVEM.L            *+$0134, D0–D6
       MOVEA.L            (A7) +, A4
       OR.W               D6, (A4)
       ADDA.W             A5, A4
       OR.W               D2, (A4)
       ADDA.W             A5, A4
       DBF                D3, *-$0004
       OR.L               D5, (A4)
       ADDA.W             A5, A4
       OR.L               D1, (A4)
       ADDA.W             A5, A4
       OR.L               D0, (A4)
       ADDA.W             A5, A4
       OR.L               D0, (A4)
       ADDA.W             A5, A4
       OR.L               D1, (A4)
       ADDA.W             A5, A4
       OR.L               D4, (A4)
       RTS
;-Shift 12----------------------------
       MOVEM.L            *+$0124, D0–D6
       MOVEA.L            (A7) +, A4
       OR.L               D6, (A4)
       BRA.S              *-$002C
;-Shift 14----------------------------
       MOVEM.L            *+$0134, D0–D6
       BRA.S              *-$000C
;-Shift 15----------------------------
       MOVEM.L            *+$0148, D0–D6
       MOVEA.L            (A7) +, A4
       OR.L               D6, (A4)
       ADDA.W             A5, A4
       OR.W               D2, $0002 (A4)
       ADDA.W             A5, A4
       DBF                D3, *-$0006
       OR.W               D5, $0002 (A4)
       OR.W               D1, $02 (A4, A5.W)
       OR.W               D0, $02 (A4, A3.W)
       OR.W               D0, $02 (A4, A2.W)
       OR.W               D1, $02 (A4, A1.W)
       ADDA.W             A0, A4
       OR.L               D4, (A4)
       RTS
```

FIG. 15 Generated Code for Times Roman 14 "P"

| | | | | | | | |
|---|---|---|---|---|---|---|---|
| Shift 0  | 4200     | 4400     | 4000     | 0002     | F800     | 7800     | F000     |
| Shift 1  | 2100     | 2200     | 2000     | 0002     | 7C00     | 3C00     | 7800     |
| Shift 2  | 1080     | 1100     | 1000     | 0002     | 3E00     | 1E00     | 3C00     |
| Shift 3  | 0840     | 0880     | 0800     | 0002     | 1F00     | 0F00     | 1E00     |
| Shift 4  | 0420     | 0440     | 0400     | 0002     | 0F80     | 0780     | 0F00     |
| Shift 5  | 0210     | 0220     | 0200     | 0002     | 07C0     | 03C0     | 0780     |
| Shift 6  | 0108     | 0110     | 0100     | 0002     | 03E0     | 01E0     | 03C0     |
| Shift 7  | 0084     | 0088     | 0080     | 0002     | 01F0     | 00F0     | 01E0     |
| Shift 8  | 0042     | 0044     | 0040     | 0002     | 00F8     | 0078     | 00F0     |
| Shift 9  | 0021     | 0022     | 0020     | 0002     | 007C     | 003C     | 0078     |
| Shift 10 | 00108000 | 00000011 | 00000010 | 00000002 | 0000003E | 0000001E | 0000003C |
| Shift 11 | 00084000 | 00088000 | 00000008 | 00000002 | 0000001F | 0000000F | 0000001E |

TABLE 1-continued

Copyright 1991 Frame Technology Corporation

| | | | | | | | |
|---|---|---|---|---|---|---|---|
| Shift 12 | 00042000 | 00044000 | 00000004 | 00000002 | 000F8000 | 00078000 | 0000000F |
| Shift 13 | 00021000 | 00022000 | 00000002 | 00000002 | 0007C000 | 0003C000 | 00078000 |
| Shift 14 | 00010800 | 00011000 | 00000001 | 00000002 | 0003E000 | 0001E000 | 0003C000 |
| Shift 15 | 00008400 | 00008800 | 00008000 | 00000002 | 0001F000 | 0000F000 | 0001E000 |

FIG. 17 Literal Pool for Times Roman 12 "P"

Processor Assumptions
Basic Algorithm
One Bit Per Pixel Algorithm
Two, Four Bits Per Pixel Block Algorithm
Eight and Greater Bits Per Pixel Block Algorithm
Planar Algorithm
Block/Planar Algorithm
Processor Description The type of processor which is to be used to execute the compiled text is any general purpose Von Neuman processor like that used in most common computers in every-day use. The processor is assumed to be able to read and write primary memory at least one byte at a time, and perhaps in groups of two or more (typically two, four, or eight) bytes in one operation. The processor can also execute data that it has previously written in a particular area as code. No assumptions are made as to the exact mapping of data to machine instructions, as this is very processor dependent. It is assumed, however, that the processor has one or more registers which it can manipulate internally. Each register can hold information. Different registers may be designed to hold different types of information, but the following types of information will be considered as particularly important for the types of operations which will be described:

Data—This is arbitrary numeric data. For the purposes, this will usually refer to the data that will actually be stored in the output device.

Address—This is a numbered location in primary memory. This will usually point to the area in the output device where data is to be stored. There are usually some special purpose address registers, such as the stack Pointer and Program Counter. The use of the former is system specific as far as these algorithms are concerned and will not be discussed. The latter controls the next instruction to be executed and is usually only manipulatable by specific branching instructions which can be used in compiled code.

Index—This is an offset from a given address to a different address. The new address is computed by adding or subtracting the value of the index to an address, perhaps after scaling the index by some constant (typically but not necessarily a power of two) to obtain an effective address which is to be read or written. As an example, the RowBytes and PlaneBytes variables described in the Output Device section can be considered index information.

Some processors will have separate data, address, and index registers whereas others will have general purpose registers which can be used for any of the tasks above. Exactly which registers can be used for what purpose is not important, but it is assumed that the processor has some method of operating on data which is at an address offset by some index.

The processor is assumed to have the following types of operations available as instructions:

MOVE—Information is moved from a register to a different register, a location in primary memory to a register, from a register to a location in primary memory, or perhaps from one location in primary memory to a different location.

OR—data from two source is placed in a destination (possibly one of the two sources) such that the result has bits set to 1 where either source has bits set to 1 and bits set to 0 otherwise. Sources may be registers, perhaps primary memory, or perhaps constants. The destination is a register, or perhaps primary memory.

AND—data from two sources is placed in a destination (possibly one of the two sources) such that the result has bits set to 1 where either source has bits set to 1 and bits set to 0 otherwise. Sources and destination are as in the OR operation above.

ADD—Like AND and OR except that the numeric values of the two sources are added to form the destination value.

SUBTRACT—Like AND and OR except that the numeric values of the one source is subtracted from the other to form the destination value.

BRANCH—Start executing code at a different location other than the next instruction.

CONDITIONAL BRANCH—Branch only if a certain conditions is met, such as the last operation resulting in a value of zero (BRANCH IF ZERO) or non-zero (BRANCH IF NON-ZERO).

RETURN—Exit the current routine and return to execute the next compiled routine or the rest of the main outer algorithm.

Although the compiled code can be described in terms of these basic instructions which are common to all modern processor, the two more "macro" instructions which can be simulated by the instructions above, but which are often machine instructions themselves and serve to clarify the algorithms are described.

DECREMENT AND BRANCH—This instruction subtracts 1 from a register and branches if the register has not reached a particular value, general 0 or −1. This is used for simple loops where a particular body of code is to be executed a given number of times. This can be simulated by a SUBTRACT instruction followed by a CONDITIONAL BRANCH instruction. For purposes of illustration, it is assumed that the branch is taken when the register reaches zero. In that way, if a register is loaded with a numeric constant before the loop, the code within the loop is executed that number of times.

MOVE MULTIPLE—This instruction moves a series of consecutive bytes of memory into a series of registers or vice versa. This will be used to quickly get a get of registers to certain predefined constants or to store the values of such registers in memory. This can be simulated with multiple MOVE instructions.

The notation used in this "pseudo assembly language" is not intended to describe actual assembly language code used by any particular processor, but to illustrate code that might be generated by a hypothetical, but typical, processor containing instructions listed above. The left-root column is a line number. The next column contains instructions as listed above, the third column contains any operands to those instructions, and the right column contains comments describing the operation being performed. The operand field lists the source and then the destination separated by a comma. A symbolic value such as RowBytes is assumed to be some location in memory containing that value. The notation "Rx" indicates register number x. The notation "M(Rx)" is meant to mean "Use RX as an address, add the constant, m, and use the result as the effective address to operate upon." The notation "#n" moans immediate constant value n. Numeric constants will be preceded by a "$" if hexadecimal and not if decimal.

The following is a list and short description of routines not included in the source code provided.

| | |
|---|---|
| bzero | Clears an area of memory to all zero. |
| cacheSize | Variable counting the total size in bytes of all cached fonts. |
| DeleteLastCache | Bumps old fonts out of the cache. |
| dprintf | A printf-like debugging routine. |
| ExpandBitmap | Expands a bitmap at 1 bit per pixel to a higher depth. |
| GetRealStdText | Gets the address of the underlying text display function. |
| MakeRun | A routine to convert a bitmap into a run-length array. |
| numFonts | Variable counting the number of fonts in the cache. |
| Shift1 | A routine to shift a pixel map to the right by 1 bit. |
| ShiftLeft | A routine to shift a pixel map to the left by n bits. |
| ShiftRight | A routine to shift a pixel map to the right by n bits. |

| | | |
|---|---|---|
| typedef | int | IntT; |
| typedef | unsigned init | UIntT; |
| typedef | short | ShortT; |
| typedef | unsigned short | UShortT; |
| typedef | char | CharT; |
| typedef | unsigned char | UCharT; |
| typedef | int | BoolT; |
| typedef | void | VoidT; |
| typedef | short | ErrorT; |
| typedef | int | MetricT; |
| #define | loop | while(1) |
| #define | public | |
| #define | private | |
| #define | local | static |
| #define | True | 1 |
| #define | False | 0 |
| #define assert(x) if (!(x)) {DebugStr(*\pAssertion Failure in TurboText: "#x);} | | |

Compilation Algorithm

The following description describes the compilation algorithms more explicitly. Hereinafter, TABLE 10 (cfont.h), TABLE 11 (cmp124.c), TABLE 12 (cmp81632.c), TABLE 13 (cmpcommn.c), and TABLE 14 (compile.h) represent the same code.

In the embodiment described, two separate compiler modules are employed, TABLE 11 and TABLE 12. One module handles block (chunky) output devices at 1, 2, and 4 bits per pixel (<one byte per pixel) and the other handles block (chunky) output devices at 8, 16, and 32 bits per pixel (≧one byte per pixel). There is also code which is common to both compilers.

Both compiler modules first start by imaging the character to be compiled to a temporary canvas using the underlying text display mechanism. The both then use a two-pass approach. The first pass scans the pixels in the canvas, looking for various repeated patterns. The second pass uses the information gathered from the first pass to generate code. The 1/2/4 algorithm is more complex in that it actually applies the two passes for each shift factor needed. It actually images the character to the temporary canvas only once, before processing shift-factor 0. On subsequent shift factors, it simply shifts the pixels on the temporary canvas to the right by one pixel. The 8/16/32 algorithm is simpler in that it only deals with a single shift factor.

1/2/4 Algorithm—TABLE 11

As code is being generated for shift factor 1 and above, the code is compared to that generated for previous shift factors to look for possible code folding opportunities. Code folding can only occur if the last n instructions for one shift factor are identical to the last n instructions for what would be generated if the previous shift factor were not folded. Indeed, code which is folded, and thus branches into a previous shift factor, may be branching into code which itself branches, as long as some useful work is actually being done. (A branch will not simply lead to another branch.) In order to keep this all straight, the compiler takes the approach that it will only consider a branch once a row has been completely drawn. It keeps a list of the code locations for the beginning of each row, or group of rows, if they are rolled into a loop. If the generated code and the comparison code with which it is to be merged diverge for any reason, the comparison is canceled up to the end of the current row, and the row pointer table is consulted to re-synchronize with the next row. This will mark the earliest point at which the code can be folded. Resynchronization is performed in any case, at the end of each row, even though the code is identical, because this might mark a point, where a previous branch has occurred and the comparison pointers must be updated. The actual branch instruction, if any, is not inserted until the code has been completely generated for one shift factor. If code folding is possible, the branch instruction replaces the code which is being eliminated and the cede stream is shortened. FIG. 12 illustrates this process.

FIGS. 12, 13, 14 and 15 are a set of flowcharts which describe the 1/2/4 algorithm in detail.

Discussion of Top Level for 1/2/4 Algorithm

Image character in temporary canvas—This is where we use the underlying text display system to image the character. The glyph is processed and set up in its most desirable form. A tight bounding box is computed and various state variables are computed which give general information about this character.

For each shift factor.—A loop is entered which will have execute the compiler passes 1 and 2 for each shift factor.

Perform pass 1—This is covered in more detail in FIG. 20. In general, pass 1 is concerned with gathering information and detecting patterns in the character. Several tables are created which will be used by the register allocation step and the code generation (pass 2) steps.

Assign Registers—The details of this step are highly system dependent. This step uses the information gathered in pass 1 to decide how registers are to be used. Factors that can affect this decision are.

The number of times that various bit image constants are encountered

The number of loop counters needed

The number and types of registers available

Trade-offs between execution speed and code folding ability.

(Often, it is desirable to put a constant in a register, rather than in-line in the code, even if it is used only once. This makes it more likely that the code can be folded, because bit constants which vary from shift factor to shift factor are relegated to the literal pool.

Any Other System-specific Issues

Perform pass 2—This is the main code generation step, and is described in more detail in FIG. 21.

Shift factor 0?—Code for the first shift factor is always generated in full and never folded, since it is the first shift factor. Code folding always results in backward branching.

Fold code if possible—Here we use the row pointer table and code comparison techniques illustrated in FIG. 18 to attempt to shorten the generated code.

Last shift factor?—The shift factor loop is iterated for each shift factor

Shift temporary canvas right by 1 pixel—The temporary canvas is shifted to the right in order to process the next shift factor.

Generate literal pool—The current implementation places the literal pools for all shift factors in one area after the last segment of code. This is to increase the possibility of being able to use a short branch instruction when doing code folding because there aren't any literal pool constants between the code segments. If this is not an issue for a given implementation, then it may be simpler to place the literal pools directly after the code which uses it. The current algorithm also back-patches the generated code in order to insert the exact offset to the literal pool, which is not known at the time the code is generated.

Discussion for Pass 1 of 1/2/4 Algorithm

For each row.—The outermost loop in this pass executes one iteration for each row in the glyph.

For each bit image in row.—An inner loop looks at the bit images for the current row. This may be in groups of one byte or wider. (typically two or four bytes.) Note that at this point, we are less interested in pixels as in the actual physical representation on the output device.

Bitmap in opt. table?—There is an optimization table which includes one entry for each bit image encountered while executing pass 1 for a given shift factor. Here, we search this table to see if this particular bit image has already been encountered. This table will later be used by the register allocation algorithm to intelligently decide how various registers should be used.

Increment count for this image in opt. table—If we had already found the bit image earlier, update the count of the number of times we see it for this shift factor.

Add entry for this image in opt. table—If we didn't find the image, then create an entry for it and set its occurrence count initially to 1.

Last image in row?—Loop for each bit image in the current row.

Row same as previous row? On all rows except the first, the bit image for the current row is compared against the previous. A group of x or more repeated rows (x is a system-dependent constant, 3 in the current implementation) is known as a streak and will be handled by a loop.

Increment streak count in row table entry—At this point, all that is known is that the two rows are identical. We may not have actually reached the critical number of rows to form a streak.

Last row?—Loop for each row in the glyph.

Discussion for Pass 2 of 1/2/4 Algorithm

Generate prologue code—This step generates the code which is concerned primarily with loading registers which will be used by the compiled rode. This may include loading up the destination address register, values from the literal pool, or other system-specific information needed throughout the compiled routine. This step may also update the destination pointer to point to the first row, if it is anything other than the baseline. This can occur in the case of descending characters (p,q, etc.) as well as characters which never reach the baseline, such as the apostrophe.

For each row.—A loop, similar to the one in pass 1 is executed for each row.

Start of streak?—If it was determined in pass 1 that this row forms the first row in a streak (a large enough group of repeated rows) then we may need to generate some special loop entry code.

Loop register already loaded?—If the register allocator decided to load a loop register from the literal pool, no extra code need be generated here. Otherwise.

Generate code to load, loop register—Code is generated which loads a register with the constant which will be used in a decrement and branch later to form the streak loop.

For each bit image in row.—This is a similar loop as the inner loop in pass 1.

Generate code to draw bit image—This is where the actual drawing code is generated. Details are system-specific. Bit images may be inserted in-line, or may be taken from registers. This is where most of the peephole optimizations are applied.

Last bit image?—This terminates the inner bit image loop as it does in pass 1.

Need advance code?—This is where the decision as to whether index register optimizations will be used or whether specific code to advance to the next row will be generated. Advance code is always generated if the current row is in a streak. Otherwise, it is not generated if it is the last row. If neither of these two conditions are met, the final decision may be system-specific. For example, the current implementation only uses index register optimization if the instructions that would be needed for the next row would use both a non-zero constant offset and an index register. Otherwise, the extra time and space needed to use the index register instructions is not worth the small overhead for the advance code.

Generate code to advance to next row.—This might actually generate code to advance by more than one row if index register optimizations were being used for previous rows.

In streak?—Here we check to see if the row we have just generated is part of a group of rows which will be generated in a loop.

Generate decrement and branch code—We generate the code at the end of the streak loop.

Skip to last row in streak—Since all of the rows in the streak are handled by the loop, we update the outer row loop pointers and counters to point to the next row beyond the streak so as to not generate extra code which is already handled by the streak loop.

Last row?—This terminates the outer row loop.

Generate epilogue code—Here we generate the code to exit from the compiled routine.

The 8/16/32 Algorithm

Rather than provide detailed flowcharts describing the 8/16/32 algorithm, we describe the salient differences between it and the 1/2/4 algorithm.

As mentioned earlier, the 8/16/32 algorithm is quite a bit simpler than the 1/2/4 algorithm for several reasons. First of all, code for only one shift factor need be generated. (This may not always be true if the addressing resolution is greater than 8 bits.) Also, there is really only one bit image which is applied selectively in different parts of the glyph, so registers can be loaded with this constant by the compiled text system, rather than by individual routines. In this way, the same code tan be used to generate text in any color which can be displayed on the output device. This obviates the need for any literal pools. This doe mean, however, that loop registers must be explicitly loaded, but this is a small price to pay.

One interesting difference between the 1/2/4 algorithm and the 8/16/32 algorithm is that the former uses mostly OR or AND instructions to do its drawing but the latter uses MOVE instructions. (The 1/2/4 algorithm might also use MOVE instructions for long horizontal rows such as dashes (-) but this is a relatively rare case and is considered a peephole optimization.) This means that other special purpose move instructions in the processor's instruction set can be used. The MOVE MULTIPLE instruction is of particular significance. Any horizontal row of consecutive pixels of reasonable length can be drawn by a single MOVE MULTIPLE instruction. This is performed so frequently that the current implementation internally converts each row from a bitmap into a runlength encoding. Short runs are handled by individual MOVE instructions. Longer runs are handled by MOVE MULTIPLE instructions.

TABLE 15

Copyright 1991 Frame Technology Corporation

| | |
|---|---|
| Code folding example | |
| ;-Shift 0-------------------- | |
| MOVEM.W | *+$0134,D0–D6 |
| MOVEA.L | (A7)+,A4 |
| OR.W | D6,(A4) |
| ADDA.W | A5,A4 |
| OR.W | D2,(A4) |
| ADDA.W | A5,A4 |
| DBF | D3,*–$0004 |
| OR.W | D5,(A4) |
| ADDA.W | A5,A4 |
| OR.W | D1,(A4) |
| ADDA.W | A5,A4 |
| OR.W | D0,(A4) |
| ADDA.W | A5,A4 |
| OR.W | D0,(A4) |
| ADDA.W | A5,A4 |
| OR;W | D1,(A4) |
| ADDA.W | A5,A4 |
| OR.W | D4,(A4) |
| RTS | |
| ;-Shift 1-------------------- | |
| MOVEM.W | *+$0116,D0–D6 |
| BRA.S | *–$002C |
| ;-Shift 2-------------------- | |
| MOVEM.W | *+$011C,D0–D6 |
| BRA.S | *–$0034 |
| ;-Shift 3-------------------- | |
| MOVEM.W | *+$0122,D0–D6 |
| BRA.S | *–$003C |
| ;-Shift 4-------------------- | |
| MOVEM.W | *+$0128,D0–D6 |
| BRA.S | *–$0044 |
| ;-Shift 5-------------------- | |
| MOVEM.W | *+$012E,D0–D6 |
| BRA.S | *–$004C |
| ;-Shift 6-------------------- | |
| MOVEM.W | *+$0134,D0–D6 |
| BRA.S | *–$0054 |
| ;-Shift 7-------------------- | |
| MOVEM.W | *+$013A,D0–D6 |
| BRA.S | *–$005C |
| ;-Shift 8-------------------- | |
| MOVEM.W | *+$0140,D0–D6 |
| BRA.S | *–$0064 |

TABLE 15-continued

Copyright 1991 Frame Technology Corporation

| | |
|---|---|
| ;-Shift 9-------------------- | |
| MOVEM.W | *+$0146,D0–D6 |
| BRA.S | *–$006C |
| ;-Shift 10-------------------- | |
| MOVEM.L | *+$014C,D0–D6 |
| MOVEA.L | (A7)+,A4 |
| OR.W | D6,(A4) |
| ADDA.W | A5,A4 |
| OR.W | D2,(A4) |
| ADDA.W | A5,A4 |
| DBF | D3,*–$0004 |
| OR.W | D5,(A4) |
| ADDA.W | A5,A4 |
| OR.W | D1,(A4) |
| ADDA.W | A5,A4 |
| OR.L | D0,(A4) |
| ADDA.W | A5,A4 |
| OR.L | D0,(A4) |
| BRA.S | *–$0074 |
| ;-Shift 11-------------------- | |
| MOVEM.L | *+$0144,D0–D6 |
| MOVEA.L | (A7)+,A4 |
| OR.W | D6,(A4) |
| ADDA.W | A5,A4 |
| OR.W | D2,(A4) |
| ADDA.W | A5,A4 |
| DBF | D3,*–$0004 |
| OR.W | D5,(A4) |
| ADDA.W | A5,A4 |
| OR.L | D1,(A4) |
| ADDA.W | A5,A4 |
| OR.L | D0,(A4) |
| ADDA.W | A5,A4 |
| OR.L | D0,(A4) |
| ADDA.W | A5,A4 |
| OR.L | D1,(A4) |
| BRA | *–$0098 |
| ;-Shift 12-------------------- | |
| MOVEM.L | *+$0134,D0–D6 |
| MOVEA.L | (A7)+,A4 |
| OR.W | D6,(A4) |
| ADDA.W | A5,A4 |
| OR.W | D2,(A4) |
| ADDA.W | A5,A4 |
| DBF | D3,*–$0004 |
| OR.L | D5,(A4) |
| ADDA.W | A5,A4 |
| OR.L | D1,(A4) |
| ADDA.W | A5,A4 |
| OR.L | D0,(A4) |
| ADDA.W | A5,A4 |
| OR.L | D0,(A4) |
| ADDA.W | A5,A4 |
| OR.L | D1,(A4) |
| ADDA.W | A5,A4 |
| OR.L | D4,(A4) |
| RTS | |
| ;-Shift 13-------------------- | |
| MOVEM.L | *+$0124,D0–D6 |
| MOVEA.L | (A7)+,A4 |
| OR.L | D6,(A4) |
| BRA.S | *–$002C |
| ;-Shift 14-------------------- | |
| MOVEM.L | *+$0134,D0–D6 |
| BRA.S | *–$000C |
| ;-Shift 15-------------------- | |
| MOVEM.L | *+$0148,D0–D6 |
| MOVEA.L | (A7)+,A4 |
| OR.L | D6,(A4) |
| ADDA.W | A5,A4 |
| OR.W | D2,$0002(A4) |
| ADDA.W | A5,A4 |
| DBF | D3,*–$0006 |
| OR.W | D5,$0002(A4) |
| OR.W | D1,$02(A4,A5.W) |
| OR.W | D0,$02(A4,A3.W) |
| OR.W | D0,$02(A4,A2.W) |

TABLE 15-continued

Copyright 1991 Frame Technology Corporation

| | |
|---|---|
| OR.W | D1,$02(A4,A1.W) |
| ADDA.W | A0,A4 |
| OR.L | D4,(A4) |
| RTS | |

While the invention has been particularly shown and described with reference to preferred embodiments thereof, it will be understood by those skilled in the art that the foregoing and other changes in form and details may be made therein without departing from the spirit and scope of the invention.

TABLE 10

Cfont.h
Copyright 1991 Frame Technology Corporation

```
/* Compile.h - Header definition for compiled font structure.
 * This is the handle to the compiled font information.
 */
typedef struct __CFont {
    /* Note that the following fields have exactly the same
     * structure as an FMInput record
     */
    UShortT   txFont;          /* text font number */
    ShortT    unscaledSize;
              /* same as txSize but valid even if non-integral */
    Style     txFace;          /* text face */
    Boolean   needBits;
              /* True if we need bits from FmSwapFont */
    ShortT    device;          /* device-specific information */
    IntT      numer;           /* scale numerator */
    IntT      denom;           /* scale denominator */
              /* End of FmInput */
    struct __CFont  **next;    /* next element in cache */
    struct __CFont  **prev;.   /* previous element in cache */
```

TABLE 10-continued

Cfont.h
Copyright 1991 Frame Technology Corporation

```
    UShortT   depth;           /* screen deptyh */
    UShortT   txSize;          /* text size (0 if not integral) */
    MetricT   scaledWidth;          /* size*numerh/denomh */
    MetricT   scaledHeight;         /* size*numerv/denomv */
    UShortT   xAscent;   /* ascent (pixels)-Conservative estimate */
    UShortT   xDescent;  /* descent (pixels)-Conservative estimate */
    UShortT   xWidMax;   /* max width (pixels) */
    UShortT   compiled;  /* Number of characters compiled */
    UShortT   compiledInt; /* Number compiled integer metrics */
    UShortT   compiledFract; /* Number compiled fract metrics */
    ShortT    xBBoxtop,xBBoxleft,xBBoxbottom,xBBoxright;
              /* tight bounding box of all chars compiled so far */
    ShortT    numRequest;
              /* number unfilled requested characters */
    ShortT    filler;          /* unused for now */
    UIntT     cLen;            /* length of SpeedT (data used) */
    UIntT     cSize;           /* Actual size, may be larger than cLen */
    UIntT     prevSize;
              /* size when first read in or 0 if never written */
    UCharT    requestBits[32];
              /* Bits for 256 requested characters */
    UIntT     compEntries[256];    /* The compiled blit entties */
    UCharT    fontName[0];
              /* Space for variable length font name (Pascal String) */
} CFont, *CFontPtr, **CFontHandle;
/*This is the charInfoT structure which defines basic information
 * about a particular character. cStart points to this structure.
 */
typedef struct __charInfoT
    MetricT   fracWidth;       /* scaled width (Fixed point) */
    MetricT   intWidth;        /* scaled width (Integer) */
    Rect      bbox;            /* Mac bounding box (integer) */
    UShortT   offsets[0];      /* up to 16 shift factor offsets */
} speedCharInfoT;
#define CACHE__LIMIT    100000
extern UIntT    cacheSize;
extern UShortT  numFonts;
```

TABLE 11

Cmp124.c
Copyright © 1991 Frame Technology Corporation

```
/*
 * Compile124.c - Text compiler for pixel maps at 1, 2, and 4 bits
 * per pixel.
 */
#include <quickdraw.h>
#include <fonts.h>
#include <memory.h>
#include <StdDef.h>
#include <ToolUtils.h>
#include "turbotypes.h"
#include "CFont.h"
#include "compile.h"
/*
 * This is a table of available index registers in the format
 * appropriate for the extention field of various instructions.
 * (i.e. D/A XXX 0000 0000 0000 0000
 * where D/A is 0 for data and 1 for address registers and XXX
 * is the register number
 */
#define XREGISTERS 5
local UShortT xRegTable[ ] = {
    0x0000,    /* no indexing - unused */
    0XD000,    /* A5 = -RowBytes    */
    0xB000,    /* A3 = -RowBytes * 2   */
    0xA000,    /* A2 = -RowBytes * 3   */
    0x9000,    /* A1 = -RowBytes * 4   */
    0x8000,    /* A0 = -RowBytes * 5   */
};
```

TABLE 11-continued

Cmp124.c
Copyright © 1991 Frame Technology Corporation

```
/*
 * This is the table for ADDA.W (xReg), A4 instructions
 */
local UShortT xRegTable2[ ] = {
    0x0000,     /* no indexing - unused */
    0xD8CD,     /* ADDA.W A5, A4 ; -RowBytes    */
    0xD8CB,     /* ADDA.W A3, A4 ; -RowBytes * 2 */
    0xD8CA,     /* ADDA.W A2, A4 ; -RowBytes * 3 */
    0xD8C9,     /* ADDA.W A1, A4 ; -RowBytes * 4 */
    0xD8C8,     /* ADDA.W A0, A4 ; -RowBytes * 5 */
};
/*
 * This is the table for SUBA.W (xReg), A4 instructions
 */
local UShortT xRegTable3[] = {
    0x0000,     /* no indexing - unused */
    0x98CD,     /* SUBA.W A5, A4 ; -RowBytes    */
    0x98CB,     /* SUBA.W A3, A4 ; -RowBytes * 2 */
    0x98CA,     /* SUBA.W A2, A4 ; -RowBytes * 3 */
    0x98C9,     /* SUBA.W A1, A4 ; -RowBytes * 4 */
    0x98C8,     /* SUBA.W A0, A4 ; -RowBytes * 5 */
};
/*
 * This is a register list mask table for a movem.1 d(pc), reglist
instruction. */
local UShortT   regListMasks[9] = {
    0x0000,     /* nothing (unused) */
    0x0001,     /* D0  (unused) */
    0x0003,     /* D0-D1 (unused) */
    0x0007,     /* D0-D2 (unused) */
    0x000F,     /* D0-D3    */
    0x001F,     /* D0-D4    */
    0x003F,     /* D0-D5    */
    0x007F,     /* D0-D6    */
    0x00FF,     /* D0-D7    */
};
local IntT    cEntries;    /* number of entries in optimization table
*/ local IntT    numStreaks;  /* number of streaks */
local IntT    numDoubles;  /* number of constants used at least twice
*/ local IntT    litPoolSize;   /* size of litteral pool */
/*
 * This is an entry in the variable size optimization table. There is
 * one entry in this table for every constant which is encountered
 * when drawing a character at any given shift factor
 */
typedef struct _optRecT {
    UIntT    bits;     /* a bit image */
    UShortT  count;    /* number of occurrences within character */
    CharT  reg;    /* assigned data register or -1 if not assigned */
    CharT  len;        /* either 2 or 4 bytes */
} optRecT;
#define INITIAL_OPTTABLE_SIZE 20
#define OPTTABLE_SIZE_INC 10
local optRecT   **optTable; /* handle to optimization table */ local
UIntT optTableSize; /* max number entries optTable can hold */
/*
 * This is an entry in the row table which contains information *
pertaining to individual rows. Note that there are two of these: *
one for the current code, and onther for the compared code which *
may be branched to.
 */
typedef struct _rowRecT {
    UIntT       offset;
            /* offset from code handle start to start of this row */
    ShortT    streak;         /* streak information */
    UShortT    numORs;     /* number of OR operations done on this row */
} rowRecT;
local rowRecT    **rowTable;      /* row table handle */
local rowRecT    **oldRowTable;   /* compared row table */ local UIntT
rowTableSize;   /* max number of entries row table can hold */
/*
 * This is the register load table. This is used to remember what *
constants to move into registers. There are 16 entries for up to *
16 shift factors
 */
```

TABLE 11-continued

Cmp124.c
Copyright © 1991 Frame Technology Corporation

```
typedef struct __regEntryT {
    UIntT       bits[8];        /* the values to stuff into 8 registers */
    UIntT       patchOffset;
                /* place to backpatch the code of PC rel offset */
    ShortT   regSize;       /* either 2 or 4 for a movem.w or a movem.l */
    ShortT   regCount;      /* number of registers to load or 0 if none */ }
regEntryT;
regEntryT       *regTable;     /* one entry for up to 16 shift factors */
local ErrorT       GetTables124(VoidT);
local ErrorT       DoCompile124(VoidT);
local ErrorT       LastPass124(VoidT);
local VoidT        CleanUp124(VoidT);
/*
 * This initializes the 1, 2, and 4 bit compiler.
 */
public VoidT InitCompile124(VoidT)
{
    optTable = (optRecT **)NewHandleSys(INITIAL_OPTTABLE_SIZE *
sizeof(optRecT)); optTableSize = INITIAL_OPTTABLE_SIZE;
    rowTable = (rowRecT **)NewHandleSys(0);
    oldRowTable = (rowRecT **)NewHandleSys(0);
    rowTableSize = 0;
    regTable = (regEntryT *)NewPtrSys(16*sizeof(regEntryT));
            /* Since INIT, must fill in the dispatch tables manually
*/
    CD1_68000.initProc = GetTables124;
    CD1_68020.initProc = GetTables124;
    CD2.initProc = GetTables124;
    CD4.initProc = GetTables124;
    CD1_68000.doItProc = DoCompile124;
    CD1_68020.doItProc = DoCompile124;
    CD2.doItProc = DoCompile124;
    CD4.doItProc = DoCompile124;
    CD1_68000.lastPassProc = LastPass124;
    CD1_68020.lastPassProc = LastPass124;
    CD2.lastPassProc = LastPass124;
    CD4.lastPassProc = LastPass124;
    CD1_68000.cleanUpProc = CleanUp124;
    CD1_68020.cleanUpProc = CleanUp124;
    CD2.cleanUpProc = CleanUp124;
    CD4.cleanUpProc = CleanUp124;
}
/*
 * This deallocates everything we allocated above
 */
public VoidT KillCompile124(VoidT)
{
    if (regTable) {
      DisposPtr((Ptr)regTable);
      regTable = NULL;
    }
    if (oldRowTable) {
      DisposHandle((Handle)oldRowTable);
      oldRowTable = NULL;
    }
    if (rowTable) {
      DisposHandle((Handle)rowTable);
      rowTable = NULL;
    }
    if (optTable) {
      DisposHandle((Handle)optTable);
      optTable = NULL;
    }
}
/*
 * This routine sets up tables for compilation
 */
local ErrorT GetTables124(VoidT)
{
    if (*rowTable) {
      HNoPurge((Handle)rowTable);
    }
    if (*oldRowTable) {
      HNoPurge((Handle)oldRowTable);
    }
```

TABLE 11-continued

Cmp124.c
Copyright © 1991 Frame Technology Corporation

```
        if (*optTable) {
            HNoPurge((Handle)optTable);
        }
        litPoolSize = 0;
        return(0);
}
/*
 * This routine releases and/or unlocks any storage allocated by
 * GetTables. It is called regardless of whether or not there was an
 * error during compilation.
 */
local VoidT CleanUp124(VoidT)
{
        if (rowTable) {
            HPurge((Handle)rowTable);
        }
        if (oldRowTable) {
            HPurge((Handle)oldRowTable);
        }
        if (optTable) {
            HPurge((Handle)optTable);
        }
}
#define ThisLong(a)      (*((UIntT *)(a)))
#define ThisShort(a)     (*((UShortT *)(a)))
#define NextLong(a)      (*((UIntT *)(a))++)
#define NextShort(a)     (*((UShortT *)(a))++)
/*
 * This routine fills in the optimization table by creating a list of
 * all the bit images used for this character and a count of the *
 * number of times each image is used. It also fills in the streak *
 * table which counts consecutive rows with the same bits.
 */
local ErrorT FillOptTable(VoidT) {
        optRecT     *op, *op2;
        UIntT       bits;
        UCharT      *a, *b;
        IntT        i;
        IntT        j;
        CharT       flag;
        IntT          streak, streakRow;
        CharT       len;
        IntT          streakSize;
        ErrorT      err;
        cEntries = 0;
        numDoubles = 0;
        numStreaks = 0;
        streakSize = cHeight;
        if (streakSize > rowTableSize || (*rowTable == 0) || (*oldRowTable
== 0)) { if (err =
SoftSetHandleSize((Handle)rowTable, streakSize*sizeof(rowRecT))) {
            #ifdef DEBUG_ERRORS
                dprintf("SetHandleSize(%d) failed for rowTable. MemError = %d",
                  cHeight*sizeof(ShortT), err);
            #endif
            return(-1);
            }
            if (err = SoftSetHandleSize((Handle)oldRowTable,
              streakSize*sizeof(rowRecT))) {
            #ifdef DEBUG_ERRORS
                dprintf("SetHandleSize(%d) failed for rowTable. MemError = %d",
                  cHeight*sizeof(ShortT), err);
            #endif
            return(-1);
            }
            rowTableSize = streakSize;
        }
        bzero(*rowTable, streakSize*sizeof(rowRecT));
        op = *optTable;
/*
 * Scan bits in the same order that they are compiled, from the lowest
 * descender to the highest ascender so that we pick up streaks *
 correctly   */
        streak = 0;
        streakRow = cRect.bottom -1 - cRect.top;
        b = cBaseAddr + (cRect.bottom) * cRowBytes;
```

TABLE 11-continued

Cmp124.c
Copyright © 1991 Frame Technology Corporation

```
    for (i = cHeight − 1; i >= 0; i−−) {
      b −= cRowBytes;
      a = b;
      j = cReadBytes;
      while (j > 0) {
        if (!longAlign) {
          bits = ThisShort(a);
          if (streak && ThisShort(a+cRowBytes) != bits) {
(*rowTable).[streakRow].streak = streak;    if (streak >= 3) {
            numStreaks++;
          }
          streak = 0;
          streakRow = i;
        }
        if (bits == 0) {
          a += 2;
          j −= 2;
          continue;
        }
      }
      if (j > 2) {
        bits = NextLong(a);
        if (streak && ThisLong(a+cRowBytes−4)  != bits) {
(*rowTable)[streakRow].streak = streak;    if (streak >= 3) {
            numStreaks++;
          }
          streak = 0;
          streakRow = i;
        }
        j −= 4;
        if ((bits & 0xFFFF) == 0) {
          bits >>= 16;
          len = 2;
        }
        else if ((bits & 0xFFFF0000) == 0) {
          len = 2;
        }
        else {
          len = 4;
        }
      }
      else {
        bits = NextShort(a);
        if (streak && ThisShort(a+cRowBytes−2) != bits) {
(*rowTable)[streakRow].streak = streak;    if (streak >= 3) {
            numStreaks++;
          }
          streak = 0;
          streakRow = i;
        }
        j −= 2;
        len = 2;
      }
      if (bits 49 = 0) {
        (*rowTable)[i].numORs++;
        flag = false;
        for (op2 = *optTable; op2 <op; op2++) {
          if (op2−>bits == bits && (len <= op2−>len)) {    if
((++op2−>count) == 2) {
            numDoubles++;
          }
          flag = true;
          break;
        }
      }
      if (!flag) {
        /* Create a new entry in the table; */
        cEntries++;
        if (cEntries >= optTableSize || (*optTable == 0)) {
UIntT newSize = cEntries+OPTTABLE_SIZE_INC;
          if (err = SoftSetHandleSize((Handle)optTable,
newSize*sizeof(optRecT)))  {    #ifdef DEBUG_ERRORS
            dprintf("SetHandleSize(%d) failed for optTable. "
          "MemError = %d", newSize, err);    #endif
            return(−1);
          }
```

TABLE 11-continued

Cmp124.c
Copyright © 1991 Frame Technology Corporation

```
            optTableSize = newSize;
            op = (*optTable)+(cEntries-1);
         }
         op->bits = bits;
         op->count = 1;
         op->reg = -1;
         op->len = len;
         op++;
         }
       }
    } /* while j > 0 */
    streak++;
    }
    (*rowTable)[streakRow].streak = streak;
    if (streak >= 3) {
      numStreaks++;
    }
    #ifdef DEBUG
    dprintf("FillOptTable: optTable = $%8X, cEntries =
%d", optTable, cEntries); dprintf("rowTable=$%8X, cHeight=%d,
Streaks=%d, doubles=%d", rowTable, cHeight, numStreaks, numDoubles);
    #endif
    return(0);
}
/*
 * This is the workhorse routine which actually does code generation
 */
local ErrorT DoCompile124(VoidT)
{
    UCharT      *cp;
    UCharT      *mp;
    optRecT     *op;
    UIntT       bits;
    UCharT      *a, *b;
    IntT        i, j, k;
    IntT         offset, nextOffset;
    IntT         length;
    UCharT      registers;
    CharT       flag;
    IntT         reg;
    IntT         streak, streakFlag, streakReg;
    Boolean     streakPreload;
    IntT        streakCp;
    IntT         indexOffset;
    UIntT       oldCLen;
    UIntT       cPos;
    UIntT       oldCPos;
    UIntT       trimPos, branchPos;
    IntT        trimmed;
    IntT         numRegs;
    IntT         numSingles;
    IntT         branchRow;
    IntT         branchOffset;
    regEntryT         *rt;
    ErrorT      err;
/*
 * First, fill in the optTable and regTable
 */
    if (err = FillOptTable( )) {
      #ifdef DEBUG_ERRORS
      dprintf("FillOpTable failed");
      #endif
      return(err);
    }
    HLock((Handle)optTable);
/*
 * Now set up some pointers. (* = static)
 *   cp = physical pointer to new code being generated
 *   mp = physical pointer to comparison code
 *   cLen = length/logical pointer to current new code
 *   oldCLen = logical pointer to current comparison code
 */
    cp = (UCharT *)cFont + cLen;
/* All data registers are available */
    registers = 0xFF;
```

TABLE 11-continued

Cmp124.c
Copyright © 1991 Frame Technology Corporation

```
/*
 *   First, preload as many registers as possible
 *   Load the 8 data registers in the following priority:
 *   All constants which will be used two or more times.
 *     (leave at least one register for streaks if there are any.)
 *     from last to first.
 *     All streak counters. (in order of use)
 *     Any remaining singleton constants (from last to first)
 *   If four or more registers are preloaded, use a litteral pool
 *   and get them all with a single MOVEM.W/MOVEM.L instruction.
 *   Otherwise, load the bit constants individually and skip the
 *   streaks
 */
    numSingles = cEntries – numDoubles;
    #ifdef DEBUG
    dprintf("Before: doubles=%d, streaks=%d, singles=%d",
       numDoubles, numStreaks, numSingles);
    #endif
    if (numStreaks > 0) {
     if (numDoubles > 7) {
      numDoubles = 7;
     }
    }
    else {
     if (numDoubles > 8) {
      numDoubles = 8;
     }
    }
    numRegs = numDoubles;
    if (numStreaks > 0 && numRegs + numStreaks + numSingles > 8) {
    numStreaks = 8 – numRegs – numSingles;
     if (numStreaks < 1) {
      numStreaks = 1;
     }
    }
    else if (numRegs + numStreaks > 8) {
     numStreaks = 8 – numRegs;
    }
    numRegs += numStreaks;
    if (numRegs + numSingles > 8) {
     numSingles = 8 – numRegs;
    }
    numRegs += numSingles;
    rt = ®Table[cShift];
    if (numRegs >= 4) {
/* It is worth it to load the constants using a MOVEM instruction */
     rt->regSize = 2;
     rt->regCount = numRegs;
    }
    else {
     /* It is better to load the registers normally */
     rt->regSize = 0;
     rt->regCount = 0;
    }
    #ifdef DEBUG
    dprintf("After: doubles=%d, streaks=%d, singles=%d, regs=%d",
numDoubles, numStreaks, numSingles, numRegs);
    #endif
    reg = 0;
/*
 * now load up the registers - first, the doubles
 */
    for (op = (*optTable)+cEntries–1; numDoubles > 0; op––) {    if
(op->count >= 2) {
      op->reg = reg;
      registers &= ~(1 << reg);
      bits = op->bits;
      if (numRegs >= 4) {
       /*
        * just remember the bits in the register load table which we
        * dump later.
        */
       if (op->len == 4) {
        rt->regSize = 4;
       }
```

TABLE 11-continued

Cmp124.c
Copyright © 1991 Frame Technology Corporation

```
        rt->bits[reg] = bits;
      }
      else {
        /* Generate code to load the bits into the register */
        if ((bits < 0x80) || (bits >= 0xFFFFFF80)) {
GenShortX(0x7000 + (reg<<9) + (bits & 0xFF));
/* MOVEQ.L bits, reg */
        }
      else if (op->len == 2) {
          GenShortX(0x303C + (reg<<9));     /* MOVE.W bits, reg */
GenShortX(bits);
        }
          else {
            GenShortX(0x203C + (reg<<9));   /* MOVE.L bits, reg */
GenLongX(bits);
          }
        }
        reg++;
        numDoubles--;
      }
    }
    if (numRegs >= 4) {
      /*
       * Now load up the streak counters
       *
       * We mark the next entry in the streak field in the row table
* (which is always 0 because of the streak)
       * with the register we will use. EG: a 4 strak followed by a 5
    streak   * followed by a 3 streak starting with D2 would look like
         * 0 4 3 0 0 0 3 5 0 0 2 4 Remember to read the table backward since
      we   * take the lowet descender first.
       */
      for (i = cHeight - 1; numStreaks > 0 && i >= 0; i--) {    if
((streak = (*rowTable)[i].streak) >= 3) {
            (*rowTable)[i-1].streak = reg;
            rt->bits[reg] = streak-1;
            i -= (streak-1);
            registers &= ~(1 << reg);
            reg++;
            numStreaks--;
          }
        }
      }
      else {
        numRegs -= numStreaks;
      }
      /*
    * Now we get the singletons in the same order that we got the
doubles    * but only if we are using a MOVEM instruction.
      */
      if (numRegs >= 4) {
        for (op = (*optTable)+cEntries-1; numSingles > 0; op--) {
if (op->count >= 1 && op->reg < 0) {
            op->reg = reg;
            registers &= ~(1 << reg);
            bits = op->bits;
            /*
             * just remember the bits in the register load table which we
             * dump later.
             */
            if (op->len == 4) {
              rt->regSize = 4;
            }
            rt->bits[reg] = bits;
            reg++;
            numSingles--;
          }
        }
      }
      else {
        numRegs -= numSingles;
      }
      #ifdef DEBUG_ERRORS
      /*
    * Ensure that our original numRegs calculation matches what we ended
up with    */
```

TABLE 11-continued

Cmp124.c
Copyright © 1991 Frame Technology Corporation

```
        if (reg != numRegs) {
          dprintf("NumRegs=%d != reg=%d", numRegs, reg);
        }
        #endif
        #ifdef DEBUG
          dprintf("reg = %d, pos = $%8X", reg, (UCharT
*)cFont+(*rowTable)[0].offset); dprintf("doubles=%d, streaks=%d,
singles=%d, regs=%d",
          numDoubles, numStreaks, numSingles, numRegs);
      #endif
      /*
* Now we generate the movem.1 which will later be backpatched   */
  if (numRegs >= 4) {
      if (rt->regSize == 2) {
        GenShortX(0x4CBA);       /* MOVEM.W d(PC), reglist */
litPoolSize += (numRegs << 1);   /* add numRegs shorts to lit pool */
      }
      else {
        GenShortX(0x4CFA);       /* MOVEM.L d(PC), reglist */   if
(litPoolSize & 3) {
          litPoolSize += 2;    /* always long align long moves! */
        }
        litPoolSize += (numRegs << 2);     /* add numRegs longs to lit pool
*/     }
      GenShortX(regListMasks[numRegs]);
      rt->patchOffset = cLen;                      /* this is where we will backpatch
*/     GenShortX(0);          /* this will be backpatched */ }
      #ifdef DEBUG
      dprintf("Preload done: rt = $%8X, pos = $%8X",
        rt, (UCharT *)cFont+(*rowTable)[0].offset);
      #endif
      /*
* ---------------------------------------------------------------
-----------   * We have finished preloading registers.
      *
      * Here, we reset the trimming information. None of the code above
should be    * trimmed off. Code below can be replaced by a branch to
a previous routine    * which looks exactly the same from a particular
point on. (This is helped    * by preloading many constants into
registers above.
      */
        (*rowTable)[cHeight-1].offset = cPos = cLen;
        /*
      * We now initialize the previous shift factor comparison pointer
so that we    * can detect where we can merge with previous routine
      */
        if (cShift != 0) {
          oldCLen = oldCPos = (*oldRowTable)[cHeight-1].offset;   mp =
(UCharT *)cFont + oldCLen;
          trimPos = cLen;
          branchPos = oldCLen;
          branchRow = cHeight-1;
        }
        else {
          mp = NULL;
          oldCLen = oldCPos = 0;
          trimPos = 0;
          branchPos = 0;
        }
        /*
      * We begin with the base register pointing to the first line */
        indexOffset = 0;
        /*
      * First, the standard prelude code
      */
        GenShort(0x285F);     /* MOVEA.L (A7)+, A4 */ /*
      * if the word contains descenders, we subtract RowBytes from A4
until we get    * to the first descending row.
      */
        for (i = cRect.bottom; i > 0; i -= XREGISTERS) {
          if (i > XREGISTERS) {
            j = XREGISTERS;
          }
          else {
            j = i;
          }
```

TABLE 11-continued

Cmp124.c
Copyright © 1991 Frame Technology Corporation

```
    GenShort(xRegTable3[j]);    /* SUBA.L   <reg>, A4 */ }
/*
 * Now we begin with the first descender and move up;
 */
    streakFlag = 0;
    b = cBaseAddr + (cRect.bottom) * cRowBytes;
    for (i = cHeight - 1; i >= 0; i--) {
      b -= cRowBytes;
    a = b;
    j = cReadBytes;
    nextOffset = 0;
    if (streakFlag) {
     /*
      * This is the second row of a streak. All constants have been
  * loaded into registers. We are now ready to start the OR-DBRA
loop.       */
      streakFlag++;
    }
    else {
      if (i < cHeight-1) {
       /*
        * Here, we remember the code position for this row in case we
        * get off sync in the next row, and we get back in sync if we
        * are out of sync now.
        */
        (*rowTable)[i].offset = cLen;
        if (cShift != 0) {
          oldCLen = (*oldRowTable)[i].offset;
          mp = (UCharT *)cFont + oldCLen;
          if (!trimPos) {
          trimPos = cLen;
          branchRow = i;
          branchPos = oldCLen;
          }
       }
     }
     }
     if ((streak = (*rowTable)[i].streak) >= 3) {
     /*
      * A streak of three or more identical rows is about to be
imaged. Implement it       * as a DBRA loop. We actually compile the
first three rows, but       * we only load constants into registers
the first time around.       * The second time, we do the ORing in
the loop from the       * registers. The third time around, we
deallocate any       * registers
      */
     if (streakReg = (*rowTable)[i-1].streak) {
     /*
      * Streak register was already preallocated    */
       streakFlag = 1;
       streakPreload = true;
     }
     else if ((streakReg = (7-rightBit[registers])) >= 0) {
/*
       * We have a register. Load up the count    */
       registers &= ~(1 << streakReg); /* mark register allocated */
       streakFlag = 1;
       streakPreload = false;
     }
     else {
      /*
        * We ran out of registers. Skip the streak    */
        streak = 0;
       }
      }
    }
    while (j > 0) {
      offset = nextOffset;
      if (!longAlign) {
        bits = ThisShort(a);
        if (bits == 0) {
          a += 2;
          j -= 2;
          nextOffset = offset + 2;
          continue;
        }
      }
```

TABLE 11-continued

Cmp124.c
Copyright © 1991 Frame Technology Corporation

```
    if (j > 2) {
      bits = NextLong(a);
      j -= 4;
      nextOffset = offset + 4;
      if ((bits & 0x0000FFFF) == 0) {
        bits >>= 16;
        length = 2;
      }
      else if ((bits & 0xFFFF0000) == 0) {
        offset += 2;
        length = 2;
      }
      else {
        length = 4;
      }
    }
    else {
      nextOffset = offset + 2;
      bits = NextShort(a);
      j -= 2;
      length = 2;
    }
    if (bits != 0) {
      /*
       * We only use the index registers if the first row offset we
       * will OR to is non-zero, and we don't use too many of them
in     * one row. This is because indexed addressing in 68000
requires   * an extra extention word which also comes with an
8 byte offset.    * Only use indexing if we need both.
       */
      if ((offset == 0 || (*rowTable)[i].numORs > 2) &&
indexOffset != 0) {
        GenShort(xRegTable2[indexOffset]);  /* ADDA.W  index, A4 */
        indexOffset = 0;
      }
      #ifdef DEBUG_ERRORS
      flag = false;
      #endif
      for (op = *optTable, k = cEntries; k > 0; op++, k--) {
if (op->bits == bits && length <= op->len) {      #ifdef
DEBUG_ERRORS
        flag = true;
      #endif
        break;
      }
    }
    #ifdef DEBUG_ERRORS
    if (!flag) {
      dprintf("No Entry. optTable=$%8X, bits=$%8X, cEntries=%d,"
      " len=%d; dx", optTable, bits, cEntries, length);     err = -1;
      goto quit;
    }
    #endif
    if (op->reg < 0 && streakFlag != 3) {
      /*
       * No register has been assigned yet.
       * Assign one if there are more than two references or if
       * there are two or more references.
       */
      if (op->count >= 2) {
        if ((reg = op->reg = (7-rightBit[registers])) >= 0) {
          /*
           * We have a register. Load up the bits */
          registers &= ~(1 << reg);    /* mark reg allocated */
          if ((bits < 0x80) || (bits >= 0xFFFFFF80)) {
GenShort(0x7000 + (reg<<9) + (bits & 0xFF));  /*
MOVEQ.L bits, reg */
          }
          else if (length == 2) {
            GenShort(0x303C + (reg<<9));  /* MOVE.W bits, reg */
          GenShort(bits);
          }
          else {
            GenShort(0x203C + (reg<<9));  /* MOVE.L bits, reg */
          GenLong(bits);
          }
```

TABLE 11-continued

Cmp124.c
Copyright © 1991 Frame Technology Corporation

```
            }
          }
        }
        reg = op->reg;
        if (!streakFlag || streakFlag == 2) {
          if (reg >= 0) {
            /*
             * The bits have already been loaded into a register.
             * Or them in
             */
              if (indexOffset != 0) {
              if (length == 2) {
                if (bits == 0x00FF) {
                  offset++;
                      GenShort(0x1980 + reg);      /* move.b
reg, offset+1(A4, index) */     }
                    else if (bits == 0xFFFF) {
                      GenShort(0x3980 + reg);    /*
move.w reg,offset(A4, index) */    }
                    else {
                      GenShort(0x8174 + (reg << 9));    /*
OR.W reg, offset(A4, index) */    }
                  }
                  else {
                    if (bits == 0xFFFFFFFF) {
                      GenShort(0x2980 + reg);    /*
move.l reg, offset(A4, index) */    }
                    else {
                      GenShort(0x81B4 + (reg << 9));    /*
OR.L reg, offset(A4, index) */    }
                }
                  GenShort(xRegTable[indexOffset]+offset);    }
                else if (offset == 0 && bits != 0x000000FF) {
          if (length == 2) {
                  if (bits == 0x0000FFFF) {
                    GenShort(0x3880 + reg);    /*
move.w reg, (A4) */    }
                  else {
                    GenShort(0x8154 + (reg << 9));    /*
OR.W    reg, (A4) */    }
                }
                else {
                  if (bits == 0xFFFFFFFF) {
                    GenShort(0x2880 + reg);    /*
move.l reg, (A4) */    }
                  else {
                    GenShort(0x8194 + (reg << 9));    /*
OR.L    reg, (A4) */    }
                }
              }
              else { /* indexOffset == 0 && offset != 0 */
        if (length == 2) {
                    if (bits == 0x00FF) {
                      offset++;
                      GenShort(0x1940 + reg);    /*
move.b reg, offset+1(A4) */    }
                    else if (bits == 0xFFFF) {
                      GenShort(0x3940 + reg);    /*
move.w reg, offset(A4) */    }
                    else {
                      GenShort(0x816C + (reg << 9));    /*
OR.W    reg, offset(A4) */    }
                  }
                  else {
                    if (bits == 0xFFFFFFFF) {
                      GenShort(0x2940 + reg);    /*
move.l reg, offset(A4) */    }
                    else {
                      GenShort(0x81AC + (reg << 9));    /*
OR.L    reg, offset(A4) */    }
                }
                    GenShort(offset);
                }
          } /* if ((reg = op->reg) >= 0) */
          else {
            /*
```

TABLE 11-continued

Cmp124.c
Copyright © 1991 Frame Technology Corporation

```
         * We ORI this value directly instead of using a register.
         */
              if (indexOffset != 0) {
                if (length == 2) {
                  if (bits == 0x00FF) {
                    offset++;
                    GenShort(0x19BC);      /* move.b
#bits, offset+1(A4, index) */       }
                  else if (bits == 0xFFFF) {
                    GenShort(0x39BC);      /* move.w
#bits, offset(A4, index) */       }
                  else {
                    GenShort(0x0074);      /* ORI.W
#bits, offset(A4, index) */       }
                    GenShort(bits);
                  }
                }
                else {
                  if (bits == 0xFFFFFFFF) {
                    GenShort(0x29BC);      /* move.l
#bits, offset(A4, index) */       }
                  else {
                    GenShort(0x00B4);      /* ORI.L
#bits, offset(A4, index) */       }
                    GenLong(bits);
                  }
                  GenShort(xRegTable[indexOffset]+offset);     }
              else if (offset == 0 && bits != 0x000000FF) {
    if (length == 2) {
                  if (bits == 0x0000FFFF) {
                    GenShort(0x38BC);      /* move.w
#bits, (A4) */       }
                  else {
                    GenShort(0x0054);      /* ORI.W
#bits, (A4) */       }
                    GenShort(bits);
                  }
                  else {
                    if (bits == 0xFFFFFFFF) {
                      GenShort(0x28BC);    /* move.l
#bits, (A4) */       }
                    else {
                      GenShort(0x0094);    /* ORI.L
#bits, (A4) */       }
                      GenLong(bits);
                    }
                  }
                  else {
                    if (length == 2) {
                      if (bits == 0x00FF) {
                        offset++;
                        GenShort(0x197C);  /* move.b
#bits, offset+1(A4) */       }
                      else if (bits == 0xFFFF) {
                        GenShort(0x397C);  /* move.w
#bits, offset(A4) */       }
                      else {
                        GenShort (0x006C); /* ORI.W
#bits, offset(A4) */       }
                        GenShort(bits);
                      }
                      else {
                        if (bits == 0xFFFFFFFF) {
                          GenShort(0x297C);/* move.l
#bits, offset(A4) */       }
                        else {
                          GenShort(0x00AC);/* ORI.L
#bits, offset(A4) */       }
                          GenLong(bits);
                        }
                        GenShort(offset);
                      }
                  }
              }
         /*
         * Decrement the reference count and reclaim the register
         * if possible
```

TABLE 11-continued

Cmp124.c
Copyright © 1991 Frame Technology Corporation

```
        */
        op->count -= (streakFlag == 3 ? (streak -2) : 1);    if
(op->count <= 0 && reg >= 0) {
            op->reg = -1;
          registers |= (1 << reg);
        }
      } /* bits != 0 */
    } /* while j > 0 */
    /*
     * Now handle the ending streak loop
     */
    switch (streakFlag) {
      case 0:
        /*
         * No streak
         */
        indexOffset++;
        if (indexOffset >= XREGISTERS && i != 0) {
GenShort(xRegTable2[indexOffset]);       /* ADDA.W
index, A4 */      indexOffset = 0;
        }
        break;
      case 1:
        /*
         * Loop 1 - We have loaded registers. Now set up the count.
         */
        if (indexOffset != 0) {
          GenShort (xRegTable2[indexOffset]);        /*
ADDA.W   index, A4 */   indexOffset = 0;
        }
        if (!streakPreload) {
          if (streak < 0x81) {
            GenShort(0x7000 + (streakReg<<9) + streak-1);
    /* MOVEQ.L streak-1, streakReg*/{
          else {
            /*
             * We should be so lucky as to need more than 128 rows!
             */
            GenShort(0x303C + (streakReg<<9));
/* MOVE.W   streak-1, streakReg*/   GenShort(streak-1);
          }
        }
        streakCp = cp - (UCharT *)cFont;
        break;
      case 2:
        /*
         * Loop 2 - Do the DBRA
         * Don't do GenShort while inside the loop. Otherwise we might
         * branch into the middle of an invalid loop! (highly unlikely,
         * though)
         */
        GenShort(xRegTable2[1]);       /* ADDA.W     index, A4 */
GenShort(0x51C8 + streakReg);          /* DBF streakReg, addr */
branchOffset = streakCp + (UCharT *)cFont - cp;
GenShort(branchOffset);
        break;
      case 3:
        /*
         * Loop 3 - Deallocate registers and skip the rest       */
        i -= (streak - 3);
        b -= (streak - 3) * cRowBytes;
        registers |= (1 << streakReg);
        streakFlag = 0;
      }
    } /* For i */
    /*
     * Finally, add the RTS at the end
     */
      GenShort(0x4E75);   /* RTS */
    /*
     * Now we check to see if the code just generated shares a suffix
with code        * previously generated. If so, we trim the code and
generate a branch into       * the old code. In the comparison below,
we first check that we save      * anything at all. then we make sure
that we save at least 6 bytes, and    * finally, we check that we
save at least as much as we saved last time so   * that we don't
```

TABLE 11-continued

Cmp124.c
Copyright © 1991 Frame Technology Corporation

```
      branch into "transient" shifts from two to four bytes which     * don't
give us optimization in the long run
       */
           if (trimPos > 0) {
             trimmed = cLen - trimPos;
           }
           else {
             trimmed = 0;
           }
           if (trimmed >= 6) {
             UShortT offset;
           #ifdef DEBUG
             dprintf("Trimming %d bytes", trimmed);
           #endif
             cLen = trimPos;
             cp = (UCharT *)cFont + cLen;
             offset = branchPos - trimPos - 2;
             /*
              * Note that we don't use GenCode stuff here because it would
mess up        * trimPos and we know that it fits because we just trimmed
the code       * down!
              */
             if (offset >= 0xFF80) {
               *((UShortT *)cp)++ = 0x6000 + (offset & 0x00FF);
               /* bra.s pc+offset */         cLen += 2;
             }
             else {
               *((UShortT *)cp)++ = 0x6000;
/* bra    pc+offset */          *((UShortT *)cp)++ = offset;
               cLen += 4;
             }
             /*
              * Update the comparison table to contain the new entries which
were not      * trimmed.
              */
             for (i = cHeight-1; i > branchRow; i--) {
               (*oldRowTable)[i].offset = (*rowTable)[i].offset;    }
           }
           else {
             /*
              * We can't trim now but maybe next time
              */
             rowRecT **swapRowTable;
           #ifdef DEBUG
             dprintf("Can\'t trim. trimPos=%d, addr=$%8X, oldaddr=$%8X",
       trimPos, (UCharT *)cFont+cPos, (UCharT *)cFont+oldCPos);        #endif
             /*
              * here we exchange the old row table with the new one. Actually,
we            * only need to preserve the offset fields in rowTable, but this
swap          * is easy.
              */
             swapRowTable = oldRowTable;
             oldRowTable = rowTable;
             rowTable = swapRowTable;
           }
           /*
            * Pad it to a longword so that all code begins at a longword
boundary   */
           if (((IntT)cp) & 0x03) {
           #ifdef DEBUG
             GenShortX(0x4E71);   /* NOP (never executed) */
           #else
             GenShortX(0x0000);   /* padding which won't disassemble correctly
*/         #endif
           }
           #ifdef DEBUG
           dprintf("DoCompile: cFont=$%8X, start=$%8X, cStart=%d, Shift=%d",
             cFont, (UCharT *)cFont+cStart, cPos, cShift);
           #endif
           err = 0;
quit:
           HUnlock((Handle)optTable);
           return(err);
}
/*
 * This is the last pass. It sets up the litteral pool and fixes up
```

TABLE 11-continued

Cmp124.c
Copyright © 1991 Frame Technology Corporation

```
 * data pointers to point to it.
 */
ErrorT LastPass124(VoidT)
}
        UCharT  *cp;
        UIntT   cPos;
        regEntryT   *rt;
        ErrorT  err;
        IntT    j;
        /*
     * Now we must create the litteral pool and backpatch all of the
offsets in      * the movem.l and movem.w instructions at the start of
the shift factors     * that have them.
     */
      cPos = cLen;
      if (cLen & 3) {
      litPoolSize += 2;     /* ensure that we have room to long align
*/    }
      if ((cLen += litPoolSize) > cSize) {
      if(err = ExpandCodeTable( )) {
        return(err);
      }
      }
      cp = (UCharT *)cFont + cPos;
      for (cShift = 0; cShift < numShiftFactors; cShift++) {
      rt = ®Table[cShift];
      if (rt->regCount > 0) {
        if (rt->regSize == 4) {
          if (cPos & 3) {
            cp += 2;     /* IntT align on IntT transfers */    cPos
+= 2;
          }
        }
        *(ShortT *)(((UCharT *)cFont) + rt->patchOffset) =   cPos
- rt->patchOffset; /* backpatch */        #ifdef DEBUG
          dprintf("BackPatch: Addr=$%8X, LitPool=$%8X",
            ((UCharT *)cFont) + rt->patchOffset, ((UCharT *)cFont) + cPos);
        #endif
          for (j = 0; j < rt->regCount; j++) {
            if (rt->regSize == 2) {
              *((UShortT *)cp)++ = (UShortT)(rt->bits[j]);
              cPos += 2;
            }
            else {
              *((UIntT *)cp)++ = (UIntT)(rt->bits[j]);
              cPos += 4;
            }
          }
        #ifdef DEBUG
        dprintf("BackPatch: Done");
        #endif
      }
      }
      return(0);
}
/*
 * Dispatch table for 1 bit/pixel, 68000 machines
 */
CompDispatch CD1_68000 = {
#if 0
      GetTables124,    /* Init procedure */
      DoCompile124,    /* Doit procedure */
      LastPass124,     /* Last Pass procedure */
      CleanUp124,      /* Clean up procedure */
#else
      NULL, NULL, NULL, NULL,    /* These are filled in by the
initialization routine */ #endif
      16,      /* NumShiftFactors */
      16,      /* NumOffsets */
      false,           /* longAlign */
      false,           /* expandBits */
};
/*
 * Dispatch table for 1 bit/pixel, 68020 and better machines */
```

TABLE 11-continued

Cmp124.c
Copyright © 1991 Frame Technology Corporation

```
CompDispatch CD1_68020 = {
#if 0
      GetTables124,      /* Init procedure */
      DoCompile124,      /* Doit procedure */
      LastPass124,       /* Last Pass procedure */
      CleanUp124,        /* Clean up procedure */
#else
      NULL, NULL, NULL, NULL,   /* These are filled in by the
initialization routine */ #endif
      8,         /* NumShiftFactors */
      8,         /* NumOffsets */
      false,     /* longAlign */
      false,     /* expandBits */
};
/*
 * Dispatch table for 2 bits/pixel
 */
CompDispatch CD2 = {
#if 0
      GetTables124,      /* Init procedure */
      DoCompile124,      /* Doit procedure */
      LastPass124,       /* Last Pass procedure */
      CleanUp124,        /* Clean up procedure */
#else
      NULL, NULL, NULL, NULL,   /* These are filled in by the
initialization routine */ #endif
      4,         /* NumShiftFactors */
      4,         /* NumOffsets */
      false,     /* longAlign */
      true,      /* expandBits */
};
/*
 * Dispatch table for 4 bits/pixel
 */
CompDispatch CD4 = {
#if 0
      GetTables124,      /* Init procedure */
      DoCompile124,      /* Doit procedure */
      LastPass124,       /* Last Pass procedure */
      CleanUp124,        /* Clean up procedure */
#else
      NULL, NULL, NULL, NULL,
            /* These are filled in by the initialization routine */
#endif
      2,         /* NumShiftFactors */
      2,         /* NumOffsets */
      false,     /* longAlign */
      true,      /* expandBits */
};
```

TABLE 12 cmp81632.c
Copyright © 1991 Frame Technology Corporation

```
/*
 * Compile81632.c - Text compiler for pixel maps at 8, 16, and 32 bits
per pixel.    * Copyright © 1988, 1989, 1990, 1991 Frame Technology
 * Author: Gustavo A. Fernandez
 *
 * This routine takes a text character and compiles it into 68020
code which will   * place it on the screen at 8, 16, or 32 bits/pixel.
 *
 * Each character entry in a compiled font table begins with a record
giving width  * and bounding box information for that character. This
is   * immediately followed by the compiled code itself.
 *
 * Compiled conventions: When the routine is called, the address of
the first    * byte of the bits just above the baseline is on the
stack. A5, A3, A2, A1, A0   * contains RowBytes * –1, RowBytes * –2,
RowBytes * –3, Rowbytes * –4 and    * RowBytes * –5 respectively. All
data registers except for D0 are set to the     * foreground color. D0
is used as a loop counter. A4 is the screen pointer.    *
```

TABLE 12-continued cmp81632.c
Copyright © 1991 Frame Technology Corporation

```
 * The first instruction is always
 *       MOVEA.L (A7)+, A4
 * If the character contains descenders, then one of the −n * rowbytes
registers  * is subtracted from A4 1 or more times to get the address
of the bottom-most   * row.
 *
 * The description below is for 32 bits/pixel. Similar code is
generated for the  * 8 and 16 bit cases.
 *
 * The compile moves up the character row by row moving the longwords
to be modified  * onto the screen such as
 *       MOVE.L     D1, (A4)
 *       MOVE.L     D1, 8(A4)
 *       ADDA.W     A5, A4
 *       MOVE.L     D1, 4(A4)
 *       ADDA.W     A5, A4
 *       MOVE.L     D1, (A4)
 *       MOVE.L     D1, 8(A4)
 * creates a small "x"
 *
 * If a there is any horizontal line with three or more consecutive
pixels set,  * then a movem.l instruction ins used. For example, the
following code makes  * a small T. (remember that rows are drawn from
bottom to top)  *       MOVE.L     D1, 4(A4)
 *       ADDA.W     A5, A4
 *       MOVE.L     D1, 4(A4)
 *       ADDA.W     A5, A4
 *       MOVEM.L    D1–D3, 0(A4)
 *
 * Streaks of three or more identical rows are handled as a loop by
using D0 as  * a counter register and setting up a DBRA loop. For
example, here is a larger T *
 *       MOVEQ      #3, D0
 * L1    MOVE.L     D1, 8(A4)
 *       DBRA       D0, L1
 *       MOVEM.L    D1–D5, 0(A4)
 * After each row, there is generally a ADDA.W A5, A4 instruction to
move to the   * next row, but if the next row does not have anything
in the first pixel,   * then an indexed addressing mode is used, such
as MOVE.L D1, 4(A4, A5). This can  * be used for A5, A3, A2, and A1 to
index 1, 2, 3, or 4 rows up. A0 is only   * used if it is the last
row, and no ADDA Ax, A4 is needed where x is the   * register
corresponding to the last index + 1. As an example, the following
creates  * a Z
 *
 *       MOVEM.L    D1–D5, 0(A4)
 *       MOVE.L     D1, 4(A5, A4)
 *       MOVE.L     D1, 8(A3, A4)
 *       MOVE.L     D1, 12(A2, A4)
 *       ADDA.L     A1, A4
 *       MOVEM.L    D1–D5, 0(A4)
 *
 * The routine always ends with an RTS instruction.
 */
#include <quickdraw.h>
#include <fonts.h>
#include <memory.h>
#include <StdDef.h>
#include <ToolUtils.h>
#include "turbotypes.h"
#include "CFont.h"
#include "compile.h"
#if 0
#define DEBUG
#endif
/*
 * This is a table of available index registers in the format
appropriate for the * extention field of various instructions. (i.e.
D/A XXX 0000 0000 0000 0000 * where D/A is 0 for data and 1 for
address registers and XXX is is the register   * number.w
 */
#define XREGISTERS   5
local UShortT xRegTable[ ] = {
        0x0000,     /* no indexing - unused */
        0XD000,     /* A5 = -RowBytes      */
        0xB000,     /* A3 = -RowBytes * 2  */
```

TABLE 12-continued cmp81632.c
Copyright © 1991 Frame Technology Corporation

```c
        0xA000,     /* A2 = -RowBytes * 3   */
        0x9000,     /* A1 = -RowBytes * 4   */
        0x8000,     /* A0 = -RowBytes * 5   */
};
/*
 * This is the table for ADDA.W (xReg), A4 instructions
 */
local UShortT xRegTable2[ ] = {
        0x0000,     /* no indexing - unused */
        0xD8CD,     /* ADDA.W A5, A4 ; -RowBytes      */
        0xD8CB,     /* ADDA.W A3, A4 ; -RowBytes * 2 */
        0xD8CA,     /* ADDA.W A2, A4 ; -RowBytes * 3 */
        0xD8C9,     /* ADDA.W A1, A4 ; -RowBytes * 4 */
        0xD8C8,     /* ADDA.W A0, A4 ; -RowBytes * 5 */
};
/*
 * This is the table for SUBA.W (xReg), A4 instructions
 */
local UShortT xRegTable3[ ] = {
        0x0000,     /* no indexing - unused */
        0x98CD,     /* SUBA.W A5, A4 ; -RowBytes      */
        0x98CB,     /* SUBA.W A3, A4 ; -RowBytes * 2 */
        0x98CA,     /* SUBA.W A2, A4 ; -RowBytes * 3 */
        0x98C9,     /* SUBA.W A1, A4 ; -RowBytes * 4 */
        0x98C8,     /* SUBA.W A0, A4 ; -RowBytes * 5 */
/*
 * This is a register list mask table for a movem.1 d(pc), reglist
instruction.   * D0 is reserved as a loop counter and is thus never
used in a movem.1. All of   * the Address registers are also occupied
 */
local UShortT       regListMasks[8] = {
        0x0000,     /* nothing    (unused)    */
        0X0002,     /* D1         (unused)    */
        0x0006,     /* D1-D2      (unused)    */
        0x000E,     /* D1-D3                  */
        0x001E,     /* D1-D4                  */
        0x003E,     /* D1-D5                  */
        0x007E,     /* D1-D6                  */
        0x00FE,     /* D1-D7                  */
/*
 * This is an entry in the row table which contains information
pertaining to   * individual rows.
 */
typedef struct __rowRecT {
     UIntT offset;  /* offset from code handle start to start of
this row */      ShortT streak;      /* streak information */
     UShortT numOps;      /* number of operations done on this row */
} rowRecT;
local rowRecT      **rowTable;       /* row table handle */
local UIntT rowTableSize;        /* max number of entries row table can
hold */
local ErrorT       GetTables81632(VoidT);
local ErrorT       DoCompile81632(VoidT);
local ErrorT       LastPass81632(VoidT);
local VoidT        CleanUp81632(VoidT);
/*
 * This initializes the 8, 16, and 32 bit compiler
 */
public VoidT InitCompile81632(VoidT)
{
    rowTable = (rowRecT **)NewHandleSys(0);
    rowTableSize = 0;
    /*
     * Since we are an INIT, we must fill in the dispatch tables
manually    */
    CD8.initProc = GetTables81632;
    CD8.doItProc = DoCompile81632;
    CD8.lastPassProc = LastPass81632;
    CD8.cleanUpProc = CleanUp81632;
    CD16.initProc = GetTables81632;
    CD16.doItProc = DoCompile81632;
    CD16.lastPassProc = LastPass81632;
    CD16.cleanUpProc = CleanUp81632;
    CD32.initProc = GetTables81632;
    CD32.doItProc = DoCompile81632;
    CD32.lastPassProc = LastPass81632;
```

TABLE 12-continued cmp81632.c
Copyright © 1991 Frame Technology Corporation

```
    CD32.cleanUpProc = CleanUp81632;
}
/*
 * This deallocates everything we allocated above.
 */
public VoidT KillCompile81632(VoidT)
}
    if (rowTable) {
        DisposHandle((Handle)rowTable);
        rowTable = NULL;
    }
}
/*
 * This routine sets up tables for compilation
 */
local ErrorT GetTables81632(VoidT)
}
    if (*rowTable) {
        HNoPurge((Handle)rowTable);
    }
    return(0);
}
/*
 * This routine releases and/or unlocks any storage allocated by
GetTables.   * It is called regardless of whether or not there was an
error during   * compilation.
 */
local VoidT CleanUp81632(VoidT)
}
    if (rowTable) {
        HPurge((Handle)rowTable);
    }
}
#define ThisLong(a)    (*((UIntT *)(a)))
#define ThisShort(a)   (*((UShortT *)(a)))
#define NextLong(a)    (*((UIntT *)(a))++)
#define NextShort(a)   (*((UShortT *)(a))++)
/*
 * This routine fills in the optimization table by creating a list of
all the    * bit images used for this character and a count of the
number of times each    * image is used. It also fills in the streak
table which counts consecutive    * rows with the same bits.
 */
local ErrorT FillOptTable(VoidT) {
    UCharT  *a, *b, *c;
    IntT    i, j;
    IntT    streak, streakRow;
    IntT    streakSize;
    ErrorT  err;
    streakSize = cHeight;
    if (streakSize > rowTableSize || (*rowTable == 0)) {
                            if (err =
SoftSetHandleSize((Handle)rowTable, streakSize*sizeof(rowRecT))) {
            #ifdef DEBUG_ERRORS
            dprintf("SetHandlesize(%d) failed for rowTable. MemError
= %d",                      cHeight*sizeof(ShortT), err);
            #endif
            return(-1);
        }
        rowTableSize = streakSize;
    }
    bzero(*rowTable, streakSize*sizeof(rowRecT));
    /*
        * We scan the bits in the same order that we compile them, from
the lowest    * descender to the highest ascender so that we pick
up streaks correctly    */
    streak = 1;
    streakRow = cHeight - 1;
    b = cBaseAddr + (cRect.bottom - 1) * cRowBytes;
    for (i = cHeight - 2; i >= 0; i--) {
        c = b;
        b -= cRowBytes;
        a = b;
        for (j = ; j < cReadBytes; j += 2) {
            if (NextShort(a) != NextShort(c)) {
                (*rowTable)[streakRow].streak = streak;
```

TABLE 12-continued cmp81632.c
Copyright © 1991 Frame Technology Corporation

```
                streak = 0;
                streakRow = i;
            }
        }
        streak++;
    }
    (*rowTable)[streakRow].streak = streak;
    #ifdef DEBUG
    dprintf("  rowTable=$%8X, cHeight=%d", rowTable, cHeight);
    #endif
    return(0);
}
#define MAX_OPS 256
/*
 * This is the workhorse routine which actually does code generation
 */
local ErrorT DoCompile81632(VoidT)
}
    UCharT      *cp;
    UCharT      *b;
    IntT        i, j;
    IntT        offset;
    IntT        length;
    IntT        streak, streakFlag;
    IntT        StreakCLen;
    IntT        indexOffset;
    IntT        tLen, tMask;
    UIntT       cPos;
    ErrorT      err;
    UCharT      starts[MAX_OPS];
    UCharT      lengths[MAX_OPS];
    IntT        ops;
    UShortT     sizeFlags;
    /*
     * First, fill in the optTable and regTable
     */
    if (err = FillOptTable( )) {
        #ifdef DEBUG_ERRORS
        dprintf("FillOpTable failed");
        #endif
        return(err);
    /*
     * Now set up some pointers. (* = static)
     * cp         = physical pointer to new code being generated
     * *cLen      = length/logical pointer to current new code
     */
    cp = (UCharT *)cFont + cLen;
    cPos = cLen;
    /*
     * We begin with the base register pointing to the first line
     */
    indexOffset = 0;
    /*
     * First, the standard prelude code
     */
    GenShortX(0x285F);              /* MOVEA.L    (A7)+, A4 */ /*
     * if the word contains descenders, we subtract RowBytes from A4
until we get        * to the first descending row.
     */
    for (i = cRect.bottom; i > 0; i -= XREGISTERS) {
        if (i > XREGISTERS) {
            j = XREGISTERS;
        }
        else {
            j = i;
        }
        GenShortX(xRegTable3[j]);  /* SUBA.L     <reg>, A4 */ }
    /*
     * Now we begin with the first descender and move up;
     */
    streakFlag = 0;
    b = cBaseAddr + (cRect.bottom - 1) * cRowBytes;
    ops = MakeRun(b, cReadBytes, starts, lengths, MAX_OPS);
    for (i = cHeight - 1; i >= 0; i--) {
        streak = (*rowTable)[i].streak;
        streakFlag = (streak >= 2);
```

TABLE 12-continued cmp81632.c
Copyright © 1991 Frame Technology Corporation

```
        if (streakFlag) {
            /*
             * Set up for the streak by loading up D0 with the streak
count -1     * for a dbra loop
             */
            if (streak < 0x81) {
                GenShortX(0x7000 + streak-1);
                                /* MOVEQ.L    #streak-1, D0 */
    }
            else {
                /*
                 * We should be so lucky as to need more than 128
rows!           */
                GenShortX(0x303C);    /* MOVE.W    #streak-1, D0 */
            GenShortX(streak-1);
            }
            StreakCLen = cLen;
        }
        /*
         * Get the run-length encoding of the current row
         */
                for (j = 0; j < ops; j++) {
            length = lengths[j];
            offset = starts[j];
            switch(cDepth) {
                case 8:
                    while (length > 0) {
                        switch(length) {
                            case 1:
                                sizeFlags = 0x1000;    /* MOVE.B */
                                tLen = 1;
                                if (j < ops-1 &&
                                    (lengths[j+1]&1) == 1 &&
                                starts[j+1] == offset+2 &&
                            indexOffset == 0) {
                                    /*
                                     * The MOVEP.W skips a byte in
between two bytes.                              * We won't
bother with MOVEP.L as it is too
 * unlikely that it would ever be used, not even
                    * in a w since it writes 4 bytes, not 3. Note also
                                     * that we "steal" a pixel from the
next run, which                         * may send its
length to 0, but this is handled
 * correctly by the while(length > 0) loop above.
                                     */
                                GenShortX(0x038C);    /* MOVEP.W
D1, offset(A4) */
GenShortX(offset);
                                    starts[j+1]++;
                                    lengths[j+1]--;
                                        break;
                                }
                                    goto single;
                            case 2:
                            case 3:
                                sizeFlags = 0x3000;    /* MOVE.W */
                                tLen = 2;
                                goto single;
                            case 4:
                            case 5:
                                sizeFlags = 0x2000,    /* MOVE.L */
                                tLen = 4;
single:
                                if (indexOffset != 0) {
                                    GenShortX(0x0981+sizeFlags);
/* MOVE.x D1, offset(A4, index.w) */
   GenShortX(xRegTable[indexOffset]+offset);
                }
                                else {
                                    if (offset != 0) {
                                        GenShortX(0x0941+sizeFlags);
/* MOVE.x D1, offset(A4) */
GenShortX(offset);
                                    }
```

TABLE 12-continued cmp81632.c
Copyright © 1991 Frame Technology Corporation

```
                                                        else {
                                                            GenShortX(0x0881+sizeFlags);
/* MOVE.x D1, (A4) */                                   }
                                                    }
                                                    break;
                                                default:
                                                    if (tLen & 2) {
                                                        tLen = length & 0xFFFFFFFE;
                                                        tMask = tLen >> 1;
                                                        sizeFlags = 0x0000;
/* MOVEM.W */                                                       if (tMask > 7) {
                                                            goto dolong;
                                                        }
                                                    }
                                                    else {
dolong:
                                                        tLen = length & 0xFFFFFFFC;
                                                        tMask = tLen >> 2;
                                                        sizeFlags = 0x0040;
/* MOVEM.L */                                                       if (tMask > 7) {
                                                            tMask = 7;
                                                            tLen = tMask << 2;
                                                        }
                                                    }
                                                    if (indexOffset != 0) {
                                                        GenShortX(0x48B4+sizeFlags);
/* MOVEM.x regList, offset(A4, index.w) */
        GenShortX(regListMasks[tMask]);
        GenShortX(xRegTable[indexoffset]+(offset));
                                                    }
                                                    else {
                                                        if (offset != 0) {
                                                            GenShortX(0x48AC+sizeFlags);
/* MOVEM.x regList, offset(A4) */
    GenShortX(regListMasks[tMask]);
        GenShortX(offset);
                                                        }
                                                        else {
                                                            GenShortX(0x4894+sizeFlags);
/* MOVEM.x regList, (A4) */
GenShortX(regListMasks[tMask]);
}
                                                        }
                                                    }
                                                    break;
                                            }
                                            offset += tLen;
                                            length -= tLen;
                                        }
                                        break;
                                    case 16:
                                        while (length > 0) {
                                            tLen = length;
                                            if (tLen > 14) {
                                                tLen = 14;
                                            }
                                            if ((tLen & 1) && tLen > 7) {
                                                tLen = 7;
                                            }
                                            if (tLen > 2) {
                                                /*
                                                 * We do a movem.l operation for this run
                                                 */
                                                if (indexOffset != 0) {
                                                    if (tLen & 1) {
                                                        GenShortX(0x48B4);    /* MOVEM.W
regList, offset(A4, index.w) */
GenShortX(regListMasks[tLen]);
GenShortX(xRegTable[indexOffset]+(offset << 1));
                                                    }
                                                    else {
                                                        GenShortX(0x48F4);    /* MOVEM.L
regList, offset(A4, index.w) */
GenShortX(regListMasks[tLen>>1]);
  GenShortX(xRegTable[indexOffset]+(offset << 1));
                                                    }
                                                }
```

TABLE 12-continued cmp81632.c
Copyright © 1991 Frame Technology Corporation

```
                            else {
                                if (offset != 0) {
                                    if (tLen & 1) {
                                        GenShortX(0x48AC);   /* MOVEM.W
regList, offset(A4) */
GenShortX(regListMasks[tLen]);
    GenShortX(offset << 1);                                        }
                                    else {
                                        GenShortX(0x48EC);   /* MOVEM.L
regList, offset(A4) */
GenShortX(regListMasks[tLen << 1]);
        GenShortX(offset << 1);                                    }
                                }
                                else {
                                    if (tLen & 1) {
                                        GenShortX(0x4894);   /* MOVEM.W
regList, (A4) */
GenShortX(regListMasks[tLen]);                                     }
                                    else {
                                        GenShortX(0x48D4);   /* MOVEM.L
regList, (A4) */
GenShortX(regListMasks[tLen>>1]);
 }
                                    }
                                }
                            }
                            else if (tLen == 2) {
                                /*
                                 * We do a single move.l for a run of 2
                                /*
                                if (indexOffset != 0) {
                                    GenShortX(0x2981);    /*    MOVE.L
D1, offset(A4, index.w) */
GenShortX(xRegTable[indexOffset]+(offset << 1));
                                }
                                else {
                                    if (offset != 0) {
                                        GenShortX(0x2941);   /*   MOVE.L
D1, offset(A4) */                          GenShortX(offset
<< 1);                                    }
                                    else {
                                        GenShortX(0x2881);   /*    MOVE.L
D1, (A4) */                                }
                                }
                            }
                            else {
                                /*
                                 * Wedo a series of single pixel move.w's
for this run                             */
                                tLen = 1;
                                if (indexOffset != 0) {
                                    GenShortX(0x3981);         /*   MOVE.W
D1, offset(A4, index.w) */
GenShortX(xRegTable[indexOffset]+(offset << 1));
        }
                                else {
                                    if (offset != 0) {
                                        GenShortX(0x3941);     /*   MOVE.L
D1, offset(A4) */                          GenShortX(offset
<< 1);                                    }
                                    else {
                                        GenShortX(0x3881);     /*   MOVE.L
D1, (A4) */                                }
                                }
                            }
                            offset += tLen;
                            length -= tLen;
                        }
                        break;
                    case 32:
                        while (length > 0) {
                            tLen = length;
                            if (tLen > 7) {
                                tLen = 7;
                            }
                            if (tLen >= 2) {
```

TABLE 12-continued cmp81632.c
Copyright © 1991 Frame Technology Corporation

```
                    /*
                     * We do a movem.l operation for this run
                     */
                    if (indexoffset != 0) {
                            GenShortX(0x48F4);         /*      MOVEM.L
regList, offset(A4, index.w) */
GenShortX(regListMasks[tLen]);
GenShortX(xRegTable[indexOffset]+(offset << 2));
                    }
                            else {
                                if (offset != 0) {
                                    GenShortX(0x48EC);    /*    MOVEM.L
regList, offset(A4) */
GenShortX(regListMasks[tLen]);
GenShortX(offset << 2);                                   }
                                    else {
                                        GenShortX(0x48D4);  /*  MOVEM.L
regList, (A4) */
GenShortX(regListMasks[tLen]);                                      }
                                    }
                                }
                            else {
                                /*
                                 * We do a series of single pixel moves
for this run                          */
                                tLen = 1;
                                if (indexOffset != 0) {
                                    GenShortX(0x2981);    /*     MOVE.L
D1, offset(A4, index.w) */
GenShortX(xRegTable[indexOffset]+(offset << 2));
                                }
                                    else {
                                        if (offset != 0) {
                                            GenShortX(0x2941);;  /* MOVE.L
D1, offset(A4) */                             GenShortX(offset
<< 2);                                    }
                                        else {
                                            GenShortX(0x2881);  /*  MOVE.L
D1, (A4) */                                  }
                                        }
                                    }
                                    offset += tLen;
                                    length -= tLen;
                        }
                        break;
                    default:
                            assert(0);
            }                           /* switch (cDepth) */
        }                       /* for (j...) */
        if (i#== 0 && !streakFlag) {
            break;          /* don't bother updating the base address
on last row */              }
        if (!streakFlag) {
            b -= cRowBytes; /* look ahead to next row to get op count
*/          ops = MakeRun(b, cReadBytes, starts, lengths, MAX_OPS);
        }
            /*
             * Here we decide how to climb up to the next row. We must not
be in           * a streak and the next row cannot be a streak.
             * The number of operations (runs) must be 1 and it cannot
have an offset of 0.              * and we must not be overflowing our
index register count.             */
        if (!streakFlag &&
            (i == 0 || (*rowTable)[i-1].streak < 2) &&
            ops > 0 &&
            starts[0] != 0 &&
            (indexOffset < XREGISTERS-2 ||
              (indexOffset == XREGISTERS-2 && i == 1))) {
            indexOffset++;
        }
            else {
                GenShortX(xRegTable2[indexOffset+1]);   /*     ADDA.W
index, A4 */               indexOffset = 0;
            }
            /*
             * Now handle the ending streak loop
```

TABLE 12-continued cmp81632.c
Copyright © 1991 Frame Technology Corporation

```
            */
        if (streakFlag) {
            GenShortX(0x51C8);              /* DBF D0, addr */
            GenShortX(StreakcLen - cLen + 2);
                i -= (streak-1);
                if (i != 0) {
                    b -= cRowBytes*streak;
                    ops = MakeRun(b, cReadBytes, starts, lengths, MAX_OPS);
                }
                streakFlag = 0;
        }
    } /* For i */
    /*
     * Finally, add the RTS at the end
     */
    GenShortX(0x4E75);                      /* RTS */
    /*
     * Pad it to a longword so thatall code begins at a longword
boundary       */
    if (((IntT)cp) & 0x03) {
        #ifdef DEBUG
            GenShortX(0x4E71);              /* NOP (never executed) */
        #else
            GenShortX(0x0000);              /* padding which won't disassemble
            correctly */    #endif
        }
        #ifdef DEBUG
        dprintf("DoCompile: cFont=$%8X, start=$%8X, cStart=%d",
        cFont, (UCharT *)cFont+cStart, cPos);
        #endif
        err = 0;
quit:
        return(err);
}
/*
 * This is the last pass. It sets up the litteral pool and fixes up
 * data pointers to point to it.
 */
ErrorT LastPass81632(VoidT)
{
    return(0);
}
/*
 * Dispatch table for 8 bits/pixel
 */
CompDispatch CD8 = {
#if 0
    GetTables81632,     /* Init procedure */
    DoCompile81632,     /* Doit procedure */
    LastPass81632,      /* Last Pass procedure */
    CleanUp81632,       /* Clean up procedure */
#else
    NULL, NULL, NULL, NULL,    /* These are filled in by the
initialization routine */ #endif
    1,                  /* NumShiftFactors */
    0,                  /* NumOffsets */
    true,               /* longAlign */
    false,              /* expandBits */
};
/*
 * Dispatch table for 32 bits/pixel
 */
CompDispatch CD16 = {
#if 0
    GetTables81632,     /* Init procedure */
    DoCompile81632,     /* Doit procedure */
    LastPass81632,      /* Last Pass procedure */
    CleanUp81632,       /* Clean up procedure */
#else
    NULL, NULL, NULL, NULL,    /* These are filled, in by the
initialization routine */ #endif
    1,                  /* NumShiftFactors */
    0,                  /* NumOffsets */
    false,              /* longAlign */
    false,              /* expandBits */
};
```

TABLE 12-continued cmp81632.c
Copyright © 1991 Frame Technology Corporation

```
/*
 * Dispatch table for 32 bits/pixel
 */
CompDispatch CD32 = {
#if 0
    GetTables81632,      /* Init procedure */
    DoCompile81632,      /* Doit procedure */
    LastPass81632,       /* Last Pass procedure */
    CleanUp81632,        /* Clean up procedure */
    #else
    NULL, NULL, NULL, NULL,   /* These are filled in by the
initialization routine */ #endif
    1,                   /* NumShiftFactors */
    0,                   /* NumOffsets */
    true,                /* longAlign */
    false,               /* expandBits */
};
```

TABLE 13 cmpcommn.c
Copyright © 1991 Frame Technology Corporation

```
/*
 * CompileCommon.c - Text compiler routines common to 1/2/4 and
8/16/32 algorithms.   * Copyright © 1988, 1989, 1990, 1991 Frame
Technology
 * Author: Gustavo A. Fernandez
 */
#include <guickdraw.h>
#include <fonts.h>
#include <memory.h>
#include <StdDef.h>
#include <ToolUtils.h>
#include "turbotypes.h"
#include "CFont.h"
#include "compile.h"
#define CPUFlag (*(UCharT *)0x12F)    /* 0=68000, 2=68020,
3=68030, etc. */
/*
 * The leftmost bit in a byte numbered 01234567
 * (index 0 is never used)
 */
CharT xleftBit[256] = {
    8, 7, 6, 6, 5, 5, 5, 5, 4, 4, 4, 4, 4, 4, 4, 4,
    3, 3, 3, 3, 3, 3, 3, 3, 3, 3, 3, 3, 3, 3, 3, 3,
    2, 2, 2, 2, 2, 2, 2, 2, 2, 2, 2, 2, 2, 2, 2, 2,
    2, 2, 2, 2, 2, 2, 2, 2, 2, 2, 2, 2, 2, 2, 2, 2,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
    0, 0, 0, 0, 0, 0, 0, 0, 0, 0, 0, 0, 0, 0, 0, 0,
};
CharT *leftBit = xleftBit;
/*
 * The rightmost bit in a byte numbered 01234567
 * (index 0 is never used)
 */
CharT xrightBit[256] = {
    8, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
    2, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
    1, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
    2, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
    0, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
```

TABLE 13-continued cmpcommn.c
Copyright © 1991 Frame Technology Corporation

```
    2, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
    1, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
    2, 7, 6, 7, 5, 7, 6, 7, 4, 7, 6, 7, 5, 7, 6, 7,
    3, 7, 6, 7, 5, 7, 6, 7, 4, 7, 6, 7, 5, 7, 6, 7,
};
CharT *rightBit = xrightBit;
public Handle      CTempBits;    /* Offscreen buffer to draw character
into */ public Handle   CTempBits2;  /* Expanded offscreen buffer
for depths > 1 */ public IntT      CTempBitSize;    /* size of CTempBits
*/
public IntT         CTempBitSize2;    /* size of CTempBits2 */
public IntT         cWidth;              /* fixed point character width */
public ShortT      cKern;         /* bits between pen position and first
bit */ public ShortT     cRowBytes;          /* # of bytes/row in bitMap */
public ShortT           cReadBytes;          /* # of bytes/row which need
processing */ public Rect         cRect;                  /* L, R word aligned,
T, B= -Ascent, descent */ public Rect         kRect;                   /* Absolute
bit bounding box. 0, 0 is origin */ public UIntT          cStart;
        /* offset to offset table */ public UIntT              cLen;          /*
current length of code table */ public UIntT            cSize;
/* size of code table */ public CFontHandle cFonth;                /* The
current font handle */ public CFontPtr cFont;              /* The current
(locked) speed structure */ public GrafPort CPort;
public ShortT      cDepth;        /* bit depth */
public ShortT      numShiftFactors;  /* number of shift factors for this
depth */ public ShortT         numOffsets;       /* same as numShiftfactors
but 1 -> 0 */ public ShortT     cShift;              /* number of 0 bits on
left */ public ShortT   cHeight;            /* number of rows to process
*/ public UCharT    *cBaseAddr;        /* baseline addr of first col with
non-0 bits */ public UCharT    *cTopAddr;         /* top addr of first
column of non-0 bits */ public Boolean   longAlign;           /* False=16
bit aligned, True=32 bit alighed */ public Boolean   expandBits;
/* True if source bitmap should be expanded */ public IntT
compileCount = 0;           /* # of chars we've compiled for SpeedTest
statistics. */ public CompDispatch *CDispatch; /* Current dispatch
table */
/*
 * This initializes the compiled text system
 */
public VoidT InitSpeed(VoidT)
{
    OpenPort(&CPort);
    Setport(&CPort);
    CTempBits = NewHandleSys(0);
    CTempBits2 = NewHandleSys(0);
    CTempBitSize = 0;
    CTempBitSize2 = 0;
    InitCompile124( );
    InitCompile81632( );
}
/*
 * This deallocates everything we allocated above.
 */
public VoidT KillSpeed(VoidT)
{
    KillCompile81632( );
    KillCompile124( );
    if(CTempBits2) {
        DisposHandle((Handle)CTempBits2);
        CTempBits2 = NULL;
    }
    if (CTempBits) {
        DisposHandle((Handle)CTempBits);
        CTempBits = NULL;
    }
    if (CPort.clipRgn) {
        ClosePort(&CPort);
        CPort.clipRgn = NULL;
    }
}
/*
 * This routine does a SetHandleSize. It also works for purged
handles.   */
public ErrorT SoftSetHandleSize(Handle hand, IntT size)
```

TABLE 13-continued cmpcommn.c
Copyright © 1991 Frame Technology Corporation

```
{
    ErrorT err;
tryAgain:
    assert(hand != 0);
    if ((*hand) == 0) {
        ReallocHandle(hand, size);
    }
    else {
        HNoPurge(hand);
        SetHandleSize(hand, size);
    }
    err = MemError( );
    if (err != 0) {
        if (numFonts > 1) {
            DeleteLastCache( );
            goto tryAgain;
        }
    }
    return(err);
}
/*
 * This internal routines draws a character to an offscreen bitmap
which is   * assumed to have at least 16 bits of 0 on the right hand
side. It also    * computes the topmost, bottommost, leftmost, and
rightmost bits which are 1.  * It then shifts the character so that
le leftmost bit set is along the left-   * hand edge of the bitmap.
Finally, if necessary, it expands the bitmap if   * necessary to
multiple depths.
 */
public ErrorT InitChar(UCharT ch)
{
    IntT kernwidth, height;
    IntT size, size2;
    IntT      kernEstimate;
    ShortT ascent, descent;
    Rect tRect;
    IntT i;
    ShortT j;
    UShortT *p;
    UCharT *s, c;
    IntT best;
    IntT current;
    IntT rowWords;
    StdTextT fText;
    ErrorT err;
    if (CPort.txFont != cFont->txFont) {
        TextFont (cFont->txFont);
    }
    if (CPort.txSize != cFont->unscaledSize) {
        TextSize(cFont->unscaledSize);
    }
    if (CPort.txFace != cFont->txFace) {
        TextFace(cFont->txFace);
    }
    if (CPort.device != cFont->device) {
        GrafDevice(cFont->device);
    }
    cWidth = cFont->xWidMax;
    ascent = cFont->xAscent;
    descent = cFont->xDescent;
    height = ascent+descent;
/*
 * Take a very conservative estimate of the absolute bit width
since it is     * very hard to determine exactly how wide it will
be
     */
    kernEstimate = height;
    kernWidth = (cWidth>>16) + 2 * kernEstimate + 15;
    cRowBytes = ((kernWidth + 15) & -16) >> 3;
    size = (height+1) * (cRowBytes+1);
    if ((size >CTempBitSize) || (*CTempBits == 0)) {
    if (err = SoftSetHandleSize(CTempBits, size)) {
#ifdef DEBUG_ERRORS
dprintf("SetHandlesize(%d) failed for CTempBits. MemError =
%d", size, err); #endif
            return(-1);
```

TABLE 13-continued cmpcommn.c
Copyright © 1991 Frame Technology Corporation

```
            }
            CTempBitSize = size;
        }
        if (expandBits) {
            size2 = size * cDepth;
            if ((size2 > CTempBitSize2) || (*CTempBits2 == 0)) {
        if (err = SoftSetHandleSize(CTempBits2, size2))  { #ifdef
DEBUG_ERRORS
dprintf("SetHandleSize(%d) failed for CTempBits2. MemError =
%d", size, err); #endif
                return(-1);
            }
            CTempBitSize2 = size2;
        }
    }
    HLock(CTempBits);
    bzero(*CTempBits, size);
    CPort.portBits.baseAddr = *CTempBits;
    CPort.portBits.rowBytes = cRowBytes;
    CPort.portBits.bounds.bottom = CPort.portRect.bottom = height;
 CPort.portBits.bounds.right = CPort.portRect.right = kernWidth;
  MoveTo(kernEstimate, ascent);
    fText = GetRealStdText( );
    fText(1, &ch, cFont->numer, cFont->denom);
    /*
     * Now carefully crop the 0 rows and columns on all four sides
     */
    tRect = CPort.portRect;
    rowWords = cRowBytes >> 1;
    /*
     * trim the top
     */
    p = (UShortT *)(CPort.portBits.baseAddr);
    for (i = tRect.top; i<tRect.bottom; i++) {
        for (j = 0; j<rowWords; j++) {
            if (*p++ != 0) {
                goto foundTop;
            }
        }
    }
foundTop:
    if (i == tRect.bottom) {
        SetRect(&kRect, 0, 0, 0, 0);
        cRect = kRect;
        cShift = 0;
#ifdef DEBUG
        dprintf("no bits\n");
#endif
        return(0);
    }
    tRect.top = i;
    /*
     * trim the bottom
     */
    p = (UShortT *)(CPort.portBits.baseAddr+tRect.bottom*cRowBytes);
    for (i = tRect.bottom-1; i>=tRect.top; i--) {
        for (j = 0; j<rowWords; j++) {
            if (*--p != 0) {
                goto foundBottom;
            }
        }
    }
foundBottom:
    tRect.bottom = i+1;
    /*
     * trim the left side. Note that we don't have to worry about
clipping       * between portRect.right and cRowBytes, since we made
sure that that was    * cleard above.
     */
    p = (UShortT *)(CPort.portBits.baseAddr + (cRowBytes *
tRect.top));    best = tRect.right;
    for (i = tRect.top; i<tRect.bottom; i++) {
        s = (UCharT *)p;
        for (j = 0; j<cRowBytes; j++) {
            if ((c = *s++) != 0) {
                current = (j << 3) + leftBit[c];
```

TABLE 13-continued cmpcommn.c
Copyright © 1991 Frame Technology Corporation

```
                    if (current < best) {
                            best = current;
                    }
                    break;
                }
            }
            p += rowWords;
        }
        tRect.left = best;
        /*
         * trim the right side.
         */
        p = (UShortT *)(CPort.portBits.baseAddr + (cRowBytes *
(tRect.top+1)));    best = tRect.left;
        for (i = tRect.top; i<tRect.bottom; i++) {
            s = (UCharT *)p;
            for (j = cRowBytes-1; j>=0; j--) {
                if ((c = *--s) != 0) {
                    current = (j << 3) + rightBit[c];
                    if (current > best) {
                        best = current;
                    }
                    break;
                }
            }
            p += rowWords;
        }
        tRect.right = best+1;
        /*
         * tRect now has the bounding rectangle of the desired word.
         */
        cKern = tRect.left - kernEstimate;
        cShift = tRect.left & 15;
        cRect.left = 0;
        cRect.right = ((tRect.right + 15) & -16) - (tRect.left & -16);
  cRect.top = tRect.top - ascent;   /* should always be negative
*/        cRect.bottom = tRect.bottom - ascent;    /* positive if
descender, 0 if not */    /*
         * While cRect's left and right side are word-aligned, kRect has
the true        * bounding box for this character. Left=negative if
left bit is left of        * origin. Right is normally positive.
         */
        kRect.left = cKern;
        kRect.right = tRect.right - kernEstimate;
        kRect.top = cRect.top;
        kRectLbottom = cRect.bottom;
        if (cRect.bottom < 0) {
            /*
             * This character starts above the baseline, such as a " or
a -. Set the        * bottom to the baseline. Note that kRect
always has the true bounding        * box.
             */
            cRect.bottom = 0;
        }
        cHeight = cRect.bottom-cRect.top;
        cReadBytes = (((tRect.right-tRect.left + 15) & -16) >> 3) + 2;
        cBaseAddr = *CTempBits + cRowBytes*ascent + ((tRect.left & -16)>>3);
          cTopAddr = cBaseAddr+(cRect.top)*cRowBytes;
          if (cShift != 0) {
            ShiftLeft(cHeight, cRowBytes, cShift, cTopAddr);
        }
        if (expandBits) {
            /*
             * Here, we expand the bits in the image for multiple depths
             */
            HLock(CTempBits2);
            ExpandBitmap (cRect.bottom-cRect.top, cRowBytes, cDepth,
                        cTopAddr, *CTempBits2);
            HUnlock(CTempBits);
            HPurge(CTempBits);
            cTopAddr = *CTemPBits2;
            cRowBytes *= cDepth;
            cReadBytes *= cDepth;
```

TABLE 13-continued cmpcommn.c
Copyright © 1991 Frame Technology Corporation

```
#ifdef DEBUG
        if (longAlign && ((cReadBytes & 3) != 0)) {
            dprintf("Bad cReadBytes = %d\n", cReadBytes);
        }
#endif
        cBaseAddr = cTopAddr - (cRect.top)*cRowBytes;
        cRect.left *= cDepth;
        cRect.right *= cDepth;
    }
#ifdef DEBUG
    dprintf("InitChar:   Ch=\'%c\', font=%d, fsize=%d, face=%d,
device=%d",         ch, cFont->txFont, cFont->unscaledsize, cFont-
>txFace, cFont->device);      dprintf("      cDepth=%d, cWidth=%m,
ascent=%d, descent=%d", cDepth, cWidth,
ascent, descent);
        dprintf("           kernWidth=%d,          kernEstimate=%d,
size=%d", kernWidth, kernEstimate,                              size);
        dprintf("                     tRect(ltrb) = %d    %d
%d", tRect.left, tRect.top, tRect.right,
tRect.bottom);
        dprintf("     cKern=%d, cShift=%d, cReadBytes=%d, cRowBytes=%d",
                    cKern, cShift, cReadBytes, cRowBytes);
        dprintf("                     cRect(ltrb) = %d    %d    %d
%d", cRect.left, cRect.top, cRect.right,
cRect.bottom);
        dprintf("                        *CTempBits = $%8X,
*CTempBits2=$%8X", *CTempBits, *CTempBits);                dprintf("
cBaseAddr=$%8X, cTopAddr=$%8X", cBaseAddr, cTopAddr);       dprintf("End
InitChar");
#endif
        return(0);
}
#define CODETABLE_SIZE_INC 256
/*
 * This routine is called by the GenCode macros to expand the code
table   */
public ErrorT ExpandcodeTable(VoidT)
}
    ErrorT err;
    UIntT   tSize = CODETABLE_SIZE_INC;
    if (tSize < cLen - cSize) {
        tSize = cLen - cSize;
    }
    while (numFonts >1 && (cacheSize + tSize > CACHE_LIMIT)) {
    DeleteLastCache( );
    }
    cSize += tSize;
    HUnlock((Handle)cFonth);
    err = SoftSetHandleSize((Handle)(cFonth), cSize);
    if (err) {
#ifdef DEBUG_ERRORS
dprintf("cMetrics SetHandleSize(%d) failed.", cSize);
#endif
        cSize -= tSize;
        return (-1);
    }
    cacheSize += tSize;
    HLock((Handle)cFonth);
    cFont = *(cFonth);
    return(0);
}
/*
 * This is the main routine to compile one character in the given
font.   */
public ErrorT BitCompile(CFontHandle fonth, UCharT ch)
{
    UCharT  *cp;
    IntT    err;
    speedCharInfoT  *cInfo;
    if (!fonth) {
        return(-1);
    }
    compileCount++;
    cFonth = fonth;
    HLock((Handle)fonth);
    cFont = *fonth;
```

TABLE 13-continued cmpcommn.c
Copyright © 1991 Frame Technology Corporation

```
    cSize = cFont->cSize,
    cLen = cFont->cLen;
    cStart = cLen;
    cDepth = cFont->depth;
    /*
     * This is the first case-out for the various bit depths to set
general       * parameters Make sure that the number of shift factors
and word/long       * alignment matches the driver's main loop code
     */
    switch(cDepth) {
        case 1:
            if (CPUFlag) {
                CDispatch = &CD1_68020;
            }
            else {
                CDispatch = &CD1_68000;
            }
            break;
        case 2:
            CDispatch = &CD2;
            break;
        case 4:
            CDispatch = &CD4;
            break;
        case 8:
            CDispatch = &CD8;
            break;
        case 16:
            CDispatch = &CD16;
            break;
        case 32:
            CDispatch = &CD32;
            break;
        default:
            err = -1;
            #ifdef DEBUG_ERRORS
            dprintf("bad depth = %d", cDepth);
            #endif
            goto quit;
    }
    numShiftFactors = CDispatch->numShiftFactors;
    numOffsets = CDispatch->numOffsets;
    longAlign = CDispatch->longAlign;
    expandBits = CDispatch->expandBits;
    err = CDispatch->initProc( );
    if (err) {
        goto abort;
    }
    err = InitChar(ch);
    if (err) {
#ifdef DEBUG_ERRORS
dprintf("InitChar failed");
#endif
        goto quit;
    }
    /*
     * Make room for numOffsets shift offsets
     */
    if ((cLen += sizeof(speedCharInfoT)+numOffsets*sizeof(ShortT)) >
cSize) {            if(err = ExpandCodeTable( )) {
            goto quit;
        }
    }
    cInfo = (speedCharInfoT *)(((UCharT *)cFont)+cStart);
    cFont->compiled++;
    /*
     * Here, we calculate the exact advance (in fixed point) for this
character.       * for either fixed or fractional widths. If the user
later wants the other,       * then GetFont will call FillInWidths to
fill in the other side, whichever       * it is.
     */
    if (FractEnable) {
        cInfo->fracWidth = MetricMul( (*widthTabHandle) ->tabData[ch],
            ((*widthTabHandle) -> hOutput)<<8),
```

TABLE 13-continued cmpcommn.c
Copyright © 1991 Frame Technology Corporation

```
        cInfo->intWidth = 0x80000000;
        cFont->compiledFract++;
    }
    else {
        cInfo->intWidth = MetricMul((*widthTabHandle)->tabData[ch],
                ((*widthTabHandle)->hOutput)<<8);
        cInfo->fracWidth = 0x80000000;
        cFont->compiledInt++;
    }
    cInfo->bbox = kRect;
    if (kRect.top == kRect.bottom) {
        /*
         * character is a space or has no bits. All numOffsets shift factors
         * point to the same code which simply pops the stack and goes on to the
         * next character.
         */
        for (cShift = 0; cShift < numOffsets; cShift++) {
            cInfo->offsets[cShift] = cLen - cStart;
        }
        cp = (UCharT *)cFont + cLen;
        GenShortX(0x588F);                  /* ADDQ.L   #4, A7 */
        GenShortX(0x4E75);                  /* RTS             */
        goto done;
    }
    for (cShift = 0; cShift < numShiftFactors; cShift++) {
        /*
         * we need to compute cInfo each time because cFont may move.
         */
        cInfo = (speedCharInfoT *)(((UCharT *)dFont)+cStart);
 if (cLen - cStart > 32700) {
#ifdef DEBUG_ERRORS
dprintf("Compile > 32K!");
#endif
            err = -1;
            goto quit;
        }
        if (numOffsets > 0) {
            cInfo->offsets[cShift] = cLen - cStart;
        }
        if (err = CDispatch->doItProc( )) {
#ifdef DEBUG_ERRORS
dprintf("DoCompile failed");
#endif
            goto quit;
        }
        if (cShift < numShiftFactors-1) {
            if (expandBits) {
                ShiftRight(cHeight, cRowBytes, cDepth, cTopAddr);
    }
            else {
                Shift1(cHeight, cRowBytes, cTopAddr);
            }
        }
    }
    if (err = CDispatch->lastPassProc( )) {
        goto quit;
    }
done:
    /*
     * Everything is OK. Fill in the character entry
     */
    cFont->cLen = cLen;
    cFont->cSize = cSize;
    cFont->compEntries[ch] = cStart-offsetof(CFont, compEntries);
/*
     * Here we compute a maximal character bounding box for all characters
     * compiled so far.
     */
    if (kRect.left < cFont->xBBoxleft) {
        cFont->xBBoxleft = kRect.left;
    }
    if (kRect.right > cFont->xBBoxright) {
        cFont->xBBoxright = kRect.right;
    }
    if (kRect.top < cFont->xBBoxtop) {
```

TABLE 13-continued cmpcommn.c
Copyright © 1991 Frame Technology Corporation

```
            cFont->xBBoxtop = kRect.top;
        }
        if (kRect.bottom > cFont->xBBoxbottom) {
            cFont->xBBoxbottom = kRect.bottom;
        }
        err = 0;
quit:
        CDispatch->cleanupproc( );
abort:
        if (fonth) {
            HUnlock((Handle)fonth);      /* Locked near the beginning
*/      }
        if(CTempBits) {
            HUnlock((Handle)CTempBits);   /* locked in InitCHar */
            HPurge(CTempBits);
        }
        if(CTempBits2) {
            HUnlock((Handle)CTempBits2);  /* locked in InitCHar */
            HPurge(CTempBits2);
        }
        return(err);
}
/*
 * This routine is called by GetFont whenever it thinks that the
character      * widths for already compiled characters need to be
updated. This can happen    * if the application manually fiddles with
the global width table or if the    * program simply switches the sense
of the FractEnable flag.   */
public VoidT FillInWidths(CFontHandle fonth)
}
        FMOutPtr fout;
        CFontPtr font;
        WidthTable *wtab;
        MetricT wScale;
        UIntT i, *ip;
        MetricT *tp;
        speedCharInfoT *cinfo;
        IntT offset;
        HLock((Handle)fonth);
        font = *fonth;
        fout = FMSwapFont((FMInput *)font);
        HLock((Handle)widthTabHandle);
        wtab = *widthTabHandle;
        wScale = ((*widthTabHandle) -> hOutput)<<8;
        if (FractEnable) {
            font->compiledFract = font->compiled;
        }
        else {
            font->compiledInt = font->compiled;
        }
        for (i = 0, ip = font->compEntries, tp = wtab->tabData; i<=255;
i++, tp++) {            if (offset = *ip++) {
                cinfo = (speedcharInfoT *)((UCharT *).fbnt + offset +
                  offsetof(CFont, compEntries));
                if (wScale != 0x00010000) {
                    if (FractEnable) {
                        cinfo->fracWidth = FixMul(*tp, wScale);
                    }
                    else {
                        cinfo->intWidth = FixMul(*tp, wScale);
                    }
                }
                else {
                    if (FractEnable) {
                        cinfo->fracWidth = *tp;
                    }
                    else {
                        cinfo->intwidth = *tp;
                    }
                }
            }
        }
        HUnlock((Handle)widthTabHandle);
        HUnlock((Handle)fonth);
}
```

TABLE 14 compile.h
Copyright 1991 Frame Technology Corporation

```
/*
 * Compile.h - Header definitions for the text compiler.
 * Copyright 1988, 1989, 1990, 1991 Frame Technology
 * Author: Gustavo A. Fernandez
 */
#if 0
#define DEBUG
#endif
#define DEBUG_ERRORS
typedef pascal VoidT (*StdTextT)(ShortT byteCount,UCharT *textBuff,
        IntT numer,IntT denom);
StdTextT GetRealStdText(VoidT);
#define MetricMul(x,y)   (FixMul((x),(y)))
#define FractEnable (*((UCharT *)0xBF4))
#define widthTabHandle (*(WidthTable ***)0xB2A)
/*
 * Shift bitmap right 1 bit
 */
extern VoidT Shift1(ShortT rows,ShortT RowBytes,UCharT *baseAddr);
/*
 * Shift bitmap left n bits
 */
extern VoidT ShiftLeft(ShortT rows,ShortT RowBytes,
           ShortT shift,UCharT *baseAddr);
/*
 * Shift bitmap right n bits
 */
extern VoidT ShiftRightt(ShortT rows,ShortT RowBytes,
           ShortT shift,UCharT *baseAddr);
/*
 * Expand bitmap from 1 bit to 2, 4, 8, 16, or 32 bits
 */
extern VoidT ExpandBitmap (ShortT rows, ShortT oldRowBytes, ShortT
newDepth, UCharT *oldBaseAddr, UCharT
*newBaseAddr);
typedef ErrorT (*Ef)(VoidT);
typedef VoidT (*Vf)(VoidT);
typedef struct __compDispatch {
    Ef initProc; /* the initialization procedure */
    Ef doItproc; /* the procedure called for each shift
factor */ Ef lastPassProc; /* the last pass which does
fixups and litteral pools */ Vf cleanUpProc; /* the
clean-up procedure */ UCharT numShiftFactors; /* the number
of shift factors used */ UCharT numoffsets; /* ==
numShiftfactors if >1, 0 otherwise */ Boolean longAlign;
/* true if bits should be long aligned, else word */ Boolean
expandBits; /* true if bits should be expanded to the chosen
depth */ } CompDispatch;
extern Handle CTempBits; /* Offscreen buffer to draw character
into */ extern Handle CTempBits2; /* Expanded offscreen buffer
for depths >1 */ extern IntT CTempBitSize; /* size of CTempBits
*/
extern IntT CTempBitSize2; /* size of CTempBits2 */
extern IntT cwidth; /* fixed point character width */
extern ShortT cKern; /* bits between pen position and first
bit */ extern ShortT cRowBytes; /* # of bytes/row in bitMap */
extern ShortT cReadBytes; /* #of bytes/row which need
processing */ extern Rect cRect; /* L,R word aligned,
T,B= -Ascent, descent */ extern Rect kRect; /* Absolute
bit bounding box. 0,0 is origin */ extern UIntT cStart;
/* offset to offset table */ extern UIntT cLen;
current length of code table */ extern UIntT cSize;
/* size of code table */ extern CFontHandle cFonth; /* The
current font handle */ extern CFontPtr cFont; /* The current
(locked) speed structure */ extern GrafPort CPort;
extern ShortT. cDepth; /* bit depth */
extern ShortT numShiftFactors; /* number of shift factors for this
depth */ extern ShortT numoffsets; /* same as numShiftfactors
but 1 → 0 */ extern ShortT cShift; /* number of 0 bits on
left */ extern ShortT cHeight; /* number of rows to process
*/ extern UCharT *cBaseAddr; /* baseline addr of first col with
non-0 bits */ extern UCharT *cTopAddr; /* top addr of first
column of non-0 bits */ extern Boolean longAlign; /* False=16
bit aligned, True=32 bit alighed */ extern Boolean expandBits;
/* True if source bitmap should be expanded */ extern IntT
compileCount; /* # of chars we've compiled for SpeedTest statistics.
*/ extern CompDispatch *CDispatch; /* Current dispatch table */ extern
```

TABLE 14-continued compile.h
Copyright 1991 Frame Technology Corporation

```
CompDispatch CD1_680001CD1_68020,CD2,CD4,CD8,CD16,CD32;
            /* the 6 bit depths, 1 bit case is CPU dependent
*/
/*
 * The leftmost bit in a byte numbered 01234567
 * (index 0 is never used)
extern CharT *leftBit;
/*
 * The rightmost bit in a byte numbered 01234567
 * (index 0 is never used)
 */
extern CharT *rightBit;
/*
 * This routine ensures that there is enough room to add N bytes to
the code * table. It automatically updates cp (local in DoCompile)
if the handle moves. * GenCode also handles the comparison pointer
(mp) while GenCodeX does not. * GenShort, GenLong call GenCode for
a specific constant.
 * GenShortX, GenLongx call GenCodeX. If memory fails, then these
macros will * jump to a quit: label and the variable err will be set
to a non-zero error code. */
#define GenCode (n)                                          \
    if ((cLen += (n)) > csize) {                             \
    if(err = ExpandcodeTable()) {                            \
        cLen -= (n);                                         \
    goto quit;                                               \
    }                                                        \
    cp = (UCharT *)cFont + cLen - (n);                       \
    if (oldcLen) {                                           \
    mp = (UCharT *)cFont + oldCLen; \                        \
    }                                                        \
    }                                                        \
#define GenLong(code)                                        \
    GenCode(4);                                              \
    *((UIntT *)cp)++ = (UIntT)(code);                        \
    if (oldCLen) }                                           \
    if (*((UIntT *)mp)++ != (UIntT)(code)) {                 \
        trimPos = 0;                                         \
    }                                                        \
    oldCLen += 4                                             \
    }                                                        \
#define Genshort(code)                                       \
    *GenCode(2);                                             \
    *((UShortT *)cp)++ = (UShortT)(code);                    \
    if (oldCLen)                                             \
    if (*((UShortT *)mp)++ != (UShortT)(code)) {             \
        trimpos = 0;                                         \
    }                                                        \
    oldCLen += 2;                                            \
    }
#define GenCodex(n)                                          \
    if ((cLen += (n)) > cSize) {                             \
    if(err = ExpandCodeTable()) {                            \
        cLen -= (n);                                         \
        goto quit;                                           \
    }                                                        \
    }                                                        \
    cp = (UCharT *)cFont + cLen - (n);                       \
    }
#define GenLongX(code)                                       \
    GenCodex(4);                                             \
    *((UIntT *)cp)++ = (UIntT)(code);                        \
#define GenShortX(code)                                      \
    GencodeX(2);                                             \
    *((UShortT *)cp)++ = (UShortT)(code);
```

TABLE 16 qdtrace.log
Copyright © 1991 Frame Technology Corporation

```
;
; Begin Apple Mancintosh 32 bit QuickDraw
; trace of display of "Frame" at 12 point
```

TABLE 16-continued qdtrace.log
Copyright © 1991 Frame Technology Corporation

```
; Times Roman, 8 bits/pixel to an off-screen
; bitmap, unclipped
;
7AEB44   LINK     A6, #$FFFC
7AEB48   MOVEM.L  D5-D7/A3/A4, -(A7)
7AEB4C   MOVE.W   $0014(A6), D6
7AEB50   BLE      *+$02CA  ; 007AEE1A
7AEB54   CMPI.W   #$00FF, D6
7AEB58   BLE.S    *+$0006  ; 007AEB5E
7AEB5E   JSR      ([$1A3C])
7B8180   MOVEM.L  D6/D7, -(A7)
7B8184   MOVEA.L  (A5), A4
7B8186   MOVEA.L  (A4), A3
7B8188   TST.L    $005C(A3)
7B818C   BEQ      *+$020C  ; 007B8398
7B8398   MOVEM.L  (A7)+, D6/D7
7B839C   RTS
7AEB64   SLE      -(A7)
7AEB66   BLE      *+$0282  ; 007AEDE8
7AEDE8   PEA      *+$00B8  ; 007AEEA0
7AEDEC   PEA      *+$0046  ; 007AEE32
7AEDF0   JSR      ([$1AA0])
7B1B22   LINK     A6, #$FFDA
7B1B26   CLR.L    -$000C(A6)
7B1B2A   MOVEA.L  DeviceList, A0
7B1B2E   MOVEA.L  (A0), A0
7B1B30   TST.L    $001E(A0)
7B1B34   BEQ      *+$0194  ; 007B1CC8
7B1B38   CLR.W    -$000E(A6)
7B1B3C   MOVEA.L  A3, A0
7B1B3E   JSR      ([$1A5C])
81E8FC   ADDQ.W   #$2, A0
81E8FE   TST.W    $0004(A0)
81E902   BPL.S    *+$000E  ; 4081E910
81E904   BTST     #$0E, $0004(A0)
81E90A   BEQ.S    *+$0006  ; 4081E910
81E90C   MOVEA.L  (A0), A0
81E90E   MOVEA.L  (A0), A0
81E910   RTS
7B1B44   MOVE.L   A0, -$0022(A6)
7B1B48   MOVE.L   (A0), D0
7B1B4A   MOVEA.L  MainDevice, A0
7B1B4E   MOVEA.L  (A0), A1
7B1B50   MOVEA.L  $0016(A1), A1
7B1B54   MOVEA.L  (A1), A1
7B1B56   CMP.L    (A1), D0
7B1B58   BNE      *+$0170  ; 007B1CC8
7B1CC8   MOVEA.L  $000C(A6), A0
7B1CCC   MOVE.L   A6, -(A7)
7B1CCE   MOVEA.L  (A6), A6
7B1CD0   JSR      (A0)
7AEEA0   MOVE.W   D6, -(A7)
7AEEA2   MOVE.L   $0010(A6), -(A7)
7AEEA6   MOVE.L   $000C(A6), -(A7)
7AEEAA   MOVE.L   $0008(A6), -(A7)
7AEEAE   JSR      *-$10C4  ; 007ADDEA
7ADDEA   MOVEA.L  D0, A0
7ADDEC   MOVE.L   A7, D0
7ADDEE   ASR.W    #$2, D0
7ADDF0   SCS      D0
7ADDF2   BCC.S    *+$0004  ; 007ADDF6
7ADDF6   LINK     A6, #$FDF4
7ADDFA   ANDI.W   #$0002, D0
7ADDFE   MOVE.W   D0, -$019E(A6)
7ADE02   MOVE.L   A0, D0
7ADE04   MOVEM.L  D0-D7/A1-A4, -(A7)
7ADE08   MOVE.L   A7, -$0004(A6)
7ADE0C   MOVE.L   A5, -$0082(A6)
7ADE10   MOVEA.L  (A5), A4
7ADE12   MOVEA.L  (A4), A3
7ADE14   MOVE.W   -$019E(A6), D0
7ADE18   MOVE.L   $0C(A6, D0.W), -$00C6(A6)
7ADE1E   MOVE.L   $08(A6, D0.W), -$00CA(A6)
7ADE24   CLR.W    -$00CC(A6)
7ADE28   MOVE.L   TheGDevice, LastTxGDevice
7ADE2E   LEA      $0002(A3), A1
7ADE32   LEA      -$0184(A6), A2
7ADE36   JSR      ([$1A08])
7B5566   MOVEQ    #$00, D2
7B5568   MOVE.W   $0004(A1), D0
7B556C   BPL.S    *+$001C  ; 007B5588
7B556E   BTST     #$0E, D0
7B5572   BEQ.S    *+$0006  ; 007B5578
7B5574   MOVEA.L  (A1), A1
7B5576   MOVEA.L  (A1), A1
7B5578   MOVE.L   $0006(A1), D1
7B557C   MOVE.L   GrafVar, D0
7B5580   CMP.L    (A1), D0
7B5582   BNE      *+$00A6  ; 007B5628
7B5628   MOVE.W   $000E(A1), D0
7B562C   BNE.S    *-$0018  ; 007B5614
7B562E   MOVE.L   (A1)+, D0
7B5630   JSR      ([$0644])
7B442A   AND.L    MaskBC, D0
7B442E   BCLR     #$17, D0
7B4432   BNE.S    *+$0004  ; 007B4436
7B4434   RTS
7B5636   MOVE.L   D0, (A2)+
7B5638   MOVE.W   (A1)+, (A2)+
7B563A   MOVE.L   (A1)+, (A2)+
7B563C   MOVE.L   (A1)+, (A2)+
7B563E   MOVE.L   (A1)+, (A2)+
7B5640   MOVE.L   (A1)+, (A2)+
7B5642   MOVE.L   (A1)+, (A2)+
7B5644   MOVE.L   (A1)+, (A2)+
7B5646   MOVE.L   (A1)+, (A2)+
7B5648   MOVE.L   (A1)+, (A2)+
7B564A   MOVE.L   (A1)+, (A2)+
7B564C   MOVE.L   (A1)+, (A2)+
7B564E   MOVE.L   (A1)+, (A2)+
7B5650   RTS
7ADE3C   MOVE.L   D1, -$009A(A6)
7ADE40   MOVE.B   D2, -$01A1(A6)
7ADE44   MOVE.W   -$019E(A6), D0
7ADE48   CLR.W    -(A7)
7ADE4A   MOVE.W   $14(A6, D0.W), D1
7ADE4E   MOVE.W   D1, -(A7)
7ADE50   BLE      *+$0CC4  ; 007AEB14
7ADE54   MOVE.W   D1, -$01A0(A6)
7ADE58   MOVE.L   $10(A6, D0.W), -(A7)
7ADE5C   PEA      $0C(A6, D0.W)
7ADE60   PEA      $08(A6, D0.W)
7ADE64   PEA      -$00C2(A6)
7ADE68   MOVEA.L  $11B4, A0
7ADE6C   JSR      (A0)
7AEFD8   LINK     A6, #$FFEC
7AEFDC   MOVE.L   A4, -(A7)
7AEFDE   MOVEA.L  (A5), A4
7AEFE0   CLR.L    -$0014(A6)
7AEFE4   MOVEA.L  (A4), A0
7AEFE6   LEA      -$0010(A6), A1
7AEFEA   MOVE.W   $0044(A0), (A1)+
7AEFEE   MOVE.W   $004A(A0), (A1)+
7AEFF2   MOVE.B   $0046(A0), (A1)+
7AEFF6   ST       (A1)+
7AEFF8   MOVE.W   (A0), (A1)+
7AEFFA   MOVEA.L  $0010(A6), A0
7AEFFE   MOVE.L   (A0), (A1)+
7AF000   MOVEA.L  $000C(A6), A0
7AF004   MOVE.L   (A0), (A1)+
7AF006   CLR.L    -(A7)
7AF008   PEA      -$0010(A6)
7AF00C   MOVEA.L  JSwapFont, A0
7AF010   JSR      (A0)
7C36A6   LEA      FMgrOutRec, A0
7C36AA   MOVE.L   A0, $0008(A7)
7C36AE   MOVEQ    #$FF, D2
7C36B0   CMP.L    LastSPExtra, D2
7C36B4   BEQ      *+$00C6  ; 007C377A
7C36B8   ADDQ.B   #$1, FontFlag
7C36BC   BEQ.S    *+$0018  ; 007C36D4
7C36D4   MOVEA.L  $0004(A7), A0
```

TABLE 16-continued qdtrace.log
Copyright © 1991 Frame Technology Corporation

| | | |
|---|---|---|
| 7C36D8 | LEA | CurFMFamily, A1 |
| 7C36DC | CMPM.L | (A0)+, (A1)+ |
| 7C36DE | BEQ.S | *+$0020 ; 007C36FE |
| 7C36FE | CMPM.L | (A0)+, (A1)+ |
| 7C3700 | BEQ.S | *+$0012 ; 007C3712 |
| 7C3712 | CMPM.L | (A0)+, (A1)+ |
| 7C3714 | BNE.S | *+$0066 ; 007C377A |
| 7C3716 | CMPM.L | (A0)+, (A1)+ |
| 7C3718 | BNE.S | *+$0062 ; 007C377A |
| 7C371A | TST.B | QDExist |
| 7C371E | BMI.S | *+$0060 ; 007C377E |
| 7C3720 | MOVEA.L | (A5), A0 |
| 7C3722 | MOVE.L | (A0), D0 |
| 7C3724 | BEQ.S | *+$005A ; 007C377E |
| 7C3726 | MOVEA.L | D0, A0 |
| 7C3728 | MOVE.W | $0048(A0), D1 |
| 7C372C | CMP.W | LastMode, D1 |
| 7C3730 | BNE.S | *+$001C ; 007C374C |
| 7C3732 | LEA | $0050(A0), A1 |
| 7C3736 | LEA | LastFore, A0 |
| 7C373A | CMPM.L | (A0)+, (A1)+ |
| 7C373C | BNE.S | *+$0010 ; 007C374C |
| 7C373E | CMPM.L | (A0)+, (A1)+ |
| 7C3740 | BNE.S | *+$000C ; 007C374C |
| 7C3742 | MOVEA.L | D0, A0 |
| 7C3744 | BSR | *+$02F2 ; 007C3A36 |
| 7C3A36 | MOVEA.L | (A5), A1 |
| 7C3A38 | MOVE.L | (A1), D0 |
| 7C3A3A | BEQ.S | *+$002E ; 007C3A68 |
| 7C3A3C | MOVEA.L | D0, A0 |
| 7C3A3E | MOVE.L | -$007A(A1), D0 |
| 7C3A42 | TST.W | $0006(A0) |
| 7C3A46 | BPL.S | *+$000E ; 007C3A54 |
| 7C3A48 | MOVEA.L | ([$0002, A0]), A0 |
| 7C3A4E | CMP.L | (A0), D0 |
| 7C3A50 | BEQ.S | *+$000A ; 007C3A5A |
| 7C3A52 | BRA.S | *+$000E ; 007C3A60 |
| 7C3A60 | MOVEQ | #$00, D0 |
| 7C3A62 | MOVE.W | $0020(A0), D0 |
| 7C3A66 | RTS | |
| 7C3748 | CMP.W | LastDepth, D0 |
| 7C374C | BNE | *+$0320 ; 007C3A6C |
| 7C3750 | MOVEA.L | ([0, A5]), A0 |
| 7C3754 | MOVE.L | LastSPExtra, D0 |
| 7C3758 | CMP.L | $004C(A0), D0 |
| 7C375C | BEQ.S | *+$0022 ; 007C377E |
| 7C377E | SUBQ.B | #$2, FontFlag |
| 7C3782 | MOVEA.L | FOutFontHandle, A0 |
| 7C3786 | TST.L | (A0) |
| 7C3788 | BNE.S | *+$0020 ; 007C37A8 |
| 7C37A8 | MOVEA.L | WidthTabHandle, A0 |
| 7C37AC | MOVE.L | (A0), WidthPtr |
| 7C37B0 | ST | FontFlag |
| 7C37B4 | MOVEA.L | (A7)+, A0 |
| 7C37B6 | ADDQ.W | #$4, A7 |
| 7C37B8 | JMP | (A0) |
| 7AF012 | MOVEA.L | (A7)+, A1 |
| 7AF014 | MOVE.L | A1, -$00B0(A4) |
| 7AF018 | MOVEA.L | (A4), A0 |
| 7AF01A | TST.W | $0006(A0) |
| 7AF01E | BPL.S | *+$0010 ; 007AF02E |
| 7AF020 | MOVE.W | $000C(A0), D0 |
| 7AF024 | BEQ.S | *+$000A ; 007AF02E |
| 7AF02E | MOVEA.L | $0008(A6), A0 |
| 7AF032 | CLR.L | (A0) |
| 7AF034 | CLR.L | $0004(A0) |
| 7AF038 | MOVE.B | $000D(A1), $0001(A0) |
| 7AF03E | MOVE.B | $000E(A1), $0003(A0) |
| 7AF044 | MOVE.B | $000F(A1), $0005(A0) |
| 7AF04A | MOVE.B | $0010(A1), D0 |
| 7AF04E | EXT.W | D0 |
| 7AF050 | MOVE.W | D0, $0006(A0) |
| 7AF054 | MOVEA.L | $0010(A6), A0 |
| 7AF058 | MOVE.L | $0012(A1), (A0) |
| 7AF05C | MOVEA.L | $000C(A6), A0 |
| 7AF060 | MOVE.L | $0016(A1), (A0) |

TABLE 16-continued qdtrace.log
Copyright © 1991 Frame Technology Corporation

| | | |
|---|---|---|
| 7AF064 | MOVEA.L | $0014(A6), A0 |
| 7AF068 | MOVEA.L | WidthTabHandle, A1 |
| 7AF06C | MOVEA.L | (A1), A1 |
| 7AF06E | MOVEQ | *$00, D1 |
| 7AF070 | MOVE.W | $0018(A6), D2 |
| 7AF074 | BRA.S | *+$0016 ; 007AF08A |
| 7AF08A | DBF | D2, *-$0014 ; 007AF076 |

; Begin "Measure Text" loop
; for five characters, Frame
;
; Loop 1 – 'F'
;

| 7AF076 | CLR.W | D0 |
| 7AF078 | MOVE.B | (A0)+, D0 |
| 7AF07A | LSL.W | #$2, D0 |
| 7AF07C | ADD.L | $00(A1, D0.W), D1 |
| 7AF080 | CMPI.W | #$0080, D0 |
| 7AF084 | BEQ.S | *+$0006 ; 007AF08A |
| 7AF086 | ADD.L | -$0014(A6), D1 |
| 7AF08A | DBF | D2, *-$0014 ; 007AF076 |

; Loop 2 – 'r'
;

| 7AF076 | CLR.W | D0 |
| 7AF078 | MOVE.B | (A0)+, D0 |
| 7AF07A | LSL.W | #$2, D0 |
| 7AF07C | ADD.L | $00(A1, D0.W), D1 |
| 7AF080 | CMPI.W | #$0080, D0 |
| 7AF084 | BEQ.S | *+$0006 ; 007AF08A |
| 7AF086 | ADD.L | -$0014(A6), D1 |
| 7AF08A | DBF | D2, *-$0014 ; 007AF076 |

; Loop 3 – 'a'
;

| 7AF076 | CLR.W | D0 |
| 7AF078 | MOVE.B | (A0)+, D0 |
| 7AF07A | LSL.W | #$2, D0 |
| 7AF07C | ADD.L | $00(A1, D0.W), D1 |
| 7AF080 | CMPI.W | #$0080, D0 |
| 7AF084 | BEQ.S | *+$0006 ; 007AF08A |
| 7AF086 | ADD.L | -$0014(A6), D1 |
| 7AF08A | DBF | D2, *-$0014 ; 007AF076 |

Loop 4 – 'm'
;

| 7AF076 | CLR.W | D0 |
| 7AF078 | MOVE.B | (A0)+, D0 |
| 7AF07A | LSL.W | #$2, D0 |
| 7AF07C | ADD.L | $00(A1, D0.W), D1 |
| 7AF080 | CMPI.W | #$0080, D0 |
| 7AF084 | BEQ.S | *+$0006 ; 007AF08A |
| 7AF086 | ADD.L | -$0014(A6), D1 |
| 7AF08A | DBF | D2, *-$0014 ; 007AF076 |

; Loop 5 – 'e'
;

| 7AF076 | CLR.W | D0 |
| 7AF078 | MOVE.B | (A0)+, D0 |
| 7AF07A | LSL.W | #$2, D0 |
| 7AF07C | ADD.L | $00(A1, D0.W), D1 |
| 7AF080 | CMPI.W | #$0080, D0 |
| 7AF084 | BEQ.S | *+$0006 ; 007AF08A |
| 7AF086 | ADD.L | -$0014(A6), D1 |
| 7AF08A | DBF | D2, *-$0014 ; 007AF076 |

; End of Measure Text loop
;

| 7AF08E | MOVE.L | D1, -$00AC(A4) |
| 7AF092 | SWAP | D1 |
| 7AF094 | MOVE.W | D1, $001A(A6) |
| 7AF098 | MOVEA.L | (A7)+, A4 |
| 7AF09A | UNLK | A6 |
| 7AF09C | RTD | #$0012 |
| 7ADE6E | ADDQ.W | #$2, A7 |
| 7ADE70 | MOVE.L | -$00AC(A4), D1 |

TABLE 16-continued qdtrace.log
Copyright © 1991 Frame Technology Corporation

| | | |
|---|---|---|
| 7ADE74 | MOVEA.L | −$00B0(A4), A4 |
| 7ADE78 | SF | −$01AE(A6) |
| 7ADE7C | CLR.L | −$008A(A6) |
| 7ADE80 | CLR.L | −$01DE(A6) |
| 7ADE84 | MOVEA.L | $0002(A4), A2 |
| 7ADE88 | MOVEA.L | (A2), A2 |
| 7ADE8A | MOVE.W | (A2), D0 |
| 7ADE8C | BTST | #$09, D0 |
| 7ADE90 | SNE | −$01AB(A6) |
| 7ADE94 | LSR.W | #$2, D0 |
| 7ADE96 | ANDI.W | #$0007, D0 |
| 7ADE9A | SNE | D2 |
| 7ADE9C | MOVE.W | D0, −$01A6(A6) |
| 7ADEA0 | MOVEQ | #$01, D3 |
| 7ADEA2 | LSL.W | D0, D3 |
| 7ADEA4 | MOVE.W | D3, −$0190(A6) |
| 7ADEA8 | BTST | #$00, $0001(A2) |
| 7ADEAE | SNE | −$0188(A6) |
| 7ADEB2 | MOVE.W | −$019E(A6), D3 |
| 7ADEB6 | MOVE.L | $0C(A6, D3.W), D0 |
| 7ADEBA | CMP.L | $08(A6, D3.W), D0 |
| 7ADEBE | SNE | −$0187(A6) |
| 7ADEC2 | CLR.W | −$01B4(A6) |
| 7ADEC6 | MOVE.W | $0008(A2), −$01B6(A6) |
| 7ADECC | MOVE.W | $0008(A2), −$0196(A6) |
| 7ADED2 | MOVE.W | $0014(A2), −$01B2(A6) |
| 7ADED8 | MOVE.W | $0012(A2), −$01B0(A6) |
| 7ADEDE | MOVE.W | $000E(A2), −$0042(A6) |
| 7ADEE4 | MOVE.W | $000E(A2), −$018A(A6) |
| 7ADEEA | CLR.W | −$01BC(A6) |
| 7ADEEE | TST.B | $0007(A4) |
| 7ADEF2 | BEQ.S | *+$0018 ; 007ADF0A |
| 7ADF0A | MOVE.W | $0048(A3), D0 |
| 7ADF0E | ANDI.W | #$FFF7, D0 |
| 7ADF12 | TST.B | −$01AB(A6) |
| 7ADF16 | BEQ.S | *+$000A ; 007ADF20 |
| 7ADF20 | MOVE.W | D0, −$01A4(A6) |
| 7ADF24 | BTST | #$06, D0 |
| 7ADF28 | SNE | D3 |
| 7ADF2A | BEQ.S | *+$000A ; 007ADF34 |
| 7ADF34 | BTST | #$05, D0 |
| 7ADF38 | BEQ.S | *+$001A ; 007ADF52 |
| 7ADF52 | AND.B | D2, D3 |
| 7ADF54 | BEQ.S | *+$002A ; 007ADF7E |
| 7ADF7E | MOVE.B | D3, −$0186(A6) |
| 7ADF82 | OR.B | −$01AB(A6), D3 |
| 7ADF86 | MOVE.B | D3, −$01A9(A6) |
| 7ADF8A | MOVE.L | $0030(A3), D2 |
| 7ADF8E | MOVE.L | D2, −$006A(A6) |
| 7ADF92 | MOVE.W | D2, −$000A(A6) |
| 7ADF96 | SWAP | D2 |
| 7ADF98 | MOVE.W | #$8000, D2 |
| 7ADF9C | CMPI.W | #$0001, −$01A4(A6) |
| 7ADFA2 | SEQ | −$01AA(A6) |
| 7ADFA6 | BCLR | #$06, −$01A3(A6) |
| 7ADFAC | BEQ.S | *+$000A ; 007ADFB6 |
| 7ADFB6 | CLR.L | −$0086(A6) |
| 7ADFBA | TST.W | $0006(A3) |
| 7ADFBE | BPL.S | *+$0038 ; 007ADFF6 |
| 7ADFC0 | MOVE.W | $000C(A3), D0 |
| 7ADFC4 | BEQ.S | *+$000A ; 007ADFCE |
| 7ADFCE | MOVE.W | $000E(A3), D2 |
| 7ADFD2 | MOVE.W | D2, −$0198(A6) |
| 7ADFD6 | MOVE.L | $0050(A3), D0 |
| 7ADFDA | CMP.L | $0054(A3), D0 |
| 7ADFDE | BEQ.S | *+$000A ; 007ADFE8 |
| 7ADFE0 | ADDQ.L | #$1, D0 |
| 7ADFE2 | MOVE.W | −$0164(A6), D3 |
| 7ADFE6 | LSR.L | D3, D0 |
| 7ADFE8 | SNE | D0 |
| 7ADFEA | TST.B | −$01AB(A6) |
| 7ADFEE | BEQ.S | *+$001E ; 007AE00C |
| 7AE00C | AND.B | D0, −$01AA(A6) |
| 7AE010 | ADD.L | D1, D2 |
| 7AE012 | SWAP | D2 |
| 7AE014 | CLR.W | −$0194(A6) |
| 7AE018 | TST.B | $0011(A4) |
| 7AE01C | BEQ | *+$0032 ; 007AE04E |
| 7AE04E | MOVE.W | −$0196(A6), D0 |
| 7AE052 | ADD.W | D0, −$000A(A6) |
| 7AE056 | ADD.W | $01B4(A6), D2 |
| 7AE05A | MOVE.W | D2, −$0006(A6) |
| 7AE05E | MOVE.W | −$006A(A6), D2 |
| 7AE062 | SUB.W | −$01B0(A6), D2 |
| 7AE066 | MOVE.W | D2, −$000C(A6) |
| 7AE06A | ADD.W | −$0042(A6), D2 |
| 7AE06E | MOVE.W | D2, −$0008(A6) |
| 7AE072 | MOVE.L | −$000C(A6), −$0014(A6) |
| 7AE078 | MOVE.L | −$0008(A6), −$0010(A6) |
| 7AE07E | TST.B | −$0187(A6) |
| 7AE082 | BEQ.S | *+$005C ; 007AE0DE |
| 7AE0DE | ANDI.B | #$0F, CCR |
| 7AE0E2 | TST.W | $0006(A3) |
| 7AE0E6 | BPL.S | *+$0006 ; 007AE0EC |
| 7AE0E8 | ADD.W | D1, $000E(A3) |
| 7AE0EC | SWAP | D1 |
| 7AE0EE | MOVE.W | $0032(A3), D0 |
| 7AE0F2 | ADDX.W | D1, D0 |
| 7AE0F4 | MOVE.W | D0, $0032(A3) |
| 7AE0F8 | TST.W | $0042(A3) |
| 7AE0FC | BLT | *+$0A18 ; 007AEB14 |
| 7AE100 | MOVE.W | −$000E(A6), −(A7) |
| 7AE104 | MOVE.W | #$7D00, −$000E(A6) |
| 7AE10A | PEA | −$0014(A6) |
| 7AE10E | PEA | −$017E(A6) |
| 7AE112 | MOVEA.L | $001C(A3), A0 |
| 7AE116 | MOVEA.L | (A0), A0 |
| 7AE118 | PEA | $0002(A0) |
| 7AE11C | MOVEA.L | $0018(A3), A0 |
| 7AE120 | MOVEA.L | (A0), A0 |
| 7AE122 | PEA | $0002(A0) |
| 7AE126 | MOVE.W | #$0004, −(A7) |
| 7AE12A | PEA | −$002C(A6) |
| 7AE12E | JSR | ([$1A84]) |
| 0163C2 | CMPI.L | #$4081C222, (A7) |
| 0163C8 | BEQ.S | *+$0010 ; 000163D8 |
| 0163CA | CMPI.L | #$4081A238, (A7) |
| 0163D0 | BEQ.S | *+$0014 ; 000163E4 |
| 0163D2 | JMP | _InsetRect+0036 |
| 81D58A | LINK | A6, #$0000 |
| 81D58E | MOVEM.L | D1−D4/A1, −(A7) |
| 81D592 | LEA | $000C(A6), A1 |
| 81D596 | MOVE.W | (A1)+, D0 |
| 81D598 | BLE.S | _InsetRect+0080 ; 4081D5D4 |
| 81D59A | MOVEA.L | (A1)+, A0 |
| 81D59C | MOVEM.W | (A0)+, D1−D4 |
| 81D5A0 | SUBQ.W | #$1, D0 |
| 81D5A2 | BRA.S | _InsetRect+0072 ; 4081D5C6 |
| 81D5C6 | CMP.W | D1, D3 |
| 81D5C8 | BLE.S | _InsetRect+0080 ; 4081D5D4 |
| 81D5CA | CMP.W | D2, D4 |
| 81D5CC | BLE.S | _InsetRect+0080 ; 4081D5D4 |
| 81D5CE | DBF | D0, _InsetRect+0050 ; 4081D5A4 |
| 81D5A4 | MOVEA.L | (A1)+, A0 |
| 81D5A6 | CMP.W | (A0)+, D1 |
| 81D5A8 | BGE.S | _InsetRect+005A ; 4081D5AE |
| 81D5AE | CMP.W | (A0)+, D2 |
| 81D5B0 | BGE.S | _InsetRect+0062 ; 4081D5B6 |
| 81D5B6 | CMP.W | (A0)+, D3 |
| 81D5B8 | BLE.S | _InsetRect+006A ; 4081D5BE |
| 81D5BE | CMP.W | (A0)+, D4 |
| 81D5C0 | BLE.S | _InsetRect+0072 ; 4081D5C6 |
| 81D5C6 | CMP.W | D1, D3 |
| 81D5C8 | BLE.S | _InsetRect+0080 ; 4081D5D4 |
| 81D5CA | CMP.W | D2, D4 |
| 81D5CC | BLE.S | _InsetRect+0080 ; 4081D5D4 |
| 81D5CE | DBF | D0, _InsetRect+0050 ; 4081D5A4 |
| 81D5A4 | MOVEA.L | (A1)+, A0 |
| 81D5A6 | CMP.W | (A0)+, D1 |
| 81D5A8 | BGE.S | _InsetRect+005A ; 4081D5AE |
| 81D5AE | CMP.W | (A0)+, D2 |
| 81D5B0 | BGE.S | _InsetRect+0062 ; 4081D5B6 |

TABLE 16-continued qdtrace.log  
Copyright © 1991 Frame Technology Corporation

| | | |
|---|---|---|
| 81D5B6 | CMP.W | (A0)+, D3 |
| 81D5B8 | BLE.S | _InsetRect+006A ; 4081D5BE |
| 81D5BE | CMP.W | (A0)+, D4 |
| 81D5C0 | BLE.S | _InsetRect+0072 ; 4081D5C6 |
| 81D5C6 | CMP.W | D1, D3 |
| 81D5C8 | BLE.S | _InsetRect+0080 ; 4081D5D4 |
| 81D5CA | CMP.W | D2, D4 |
| 81D5CC | BLE.S | _InsetRect+0080 ; 4081D5D4 |
| 81D5CE | DBF | D0, _InsetRect+0050 ; 4081D5A4 |
| 81D5A4 | MOVEA.L | (A1)+, A0 |
| 81D5A6 | CMP.W | (A0)+, D1 |
| 81D5A8 | BGE.S | _InsetRect+005A ; 4081D5AE |
| 81D5AA | MOVE.W | −$0002(A0), D1 |
| 81D5AE | CMP.W | (A0)+, D2 |
| 81D5B0 | BGE.S | _InsetRect+0062 ; 4081D5B6 |
| 81D5B2 | MOVE.W | −$0002(A0), D2 |
| 81D5B6 | CMP.W | (A0)+, D3 |
| 81D5B8 | BLE.S | _InsetRect+006A ; 4081D5BE |
| 81D5BE | CMP.W | (A0)+, D4 |
| 81D5C0 | BLE.S | _InsetRect+0072 ; 4081D5C6 |
| 81D5C6 | CMP.W | D1, D3 |
| 81D5C8 | BLE.S | _InsetRect+0080 ; 4081D5D4 |
| 81D5CA | CMP.W | D2, D4 |
| 81D5CC | BLE.S | _InsetRect+0080 ; 4081D5D4 |
| 81D5CE | DBF | D0, _InsetRect+0050 ; 4081D5A4 |
| 81D5D2 | BRA.S | _InsetRect+0088 ; 4081D5DC |
| 81D5DC | MOVEA.L | $0008(A6), A0 |
| 81D5E0 | MOVE.W | D1, (A0)+ |
| 81D5E2 | MOVE.W | D2, (A0)+ |
| 81D5E4 | MOVE.W | D3, (A0)+ |
| 81D5E6 | MOVE.W | D4, (A0)+ |
| 81D5E8 | MOVE.W | $000C(A6), D0 |
| 81D5EC | LSL.W | #$2, D0 |
| 81D5EE | ADDQ.W | #$6, D0 |
| 81D5F0 | CMP.W | D1, D3 |
| 81D5F2 | MOVEM.L | (A7)+, D1–D4/A1 |
| 81D5F6 | UNLK | A6 |
| 81D5F8 | MOVEA.L | (A7)+, A0 |
| 81D5FA | ADDA.W | D0, A7 |
| 81D5FC | JMP | (A0) |
| 7AE134 | BEQ | *+$09E0 ; 007AEB14 |
| 7AE138 | MOVE.W | (A7)+, −$000E(A6) |
| 7AE13C | LEA | $001A(A2), A0 |
| 7AE140 | MOVE.L | A0, −$01E6(A6) |
| 7AE144 | MOVEQ | #$00, D1 |
| 7AE146 | MOVE.W | $0018(A2), D1 |
| 7AE14A | MOVE.W | −$01A6(A6), D0 |
| 7AE14E | LSL.L | D0, D1 |
| 7AE150 | ADD.L | D1, D1 |
| 7AE152 | MOVE.L | D1, −$01EA(A6) |
| 7AE156 | TST.B | $0007(A4) |
| 7AE15A | BNE | *+$0132 ; 007AE28C |
| 7AE15E | TST.B | $0006(A4) |
| 7AE162 | BNE | *+$012A ; 007AE28C |
| 7AE166 | TST.B | −$01AA(A6) |
| 7AE16A | BEQ | *+$0122 ; 007AE28C |
| 7AE16E | TST.W | $000A(A4) |
| 7AE172 | BNE | *+$011A ; 007AE28C |
| 7AE176 | TST.B | −$0187(A6) |
| 7AE17A | BNE | *+$0112 ; 007AE28C |
| 7AE17E | MOVEA.L | $001C(A3), A0 |
| 7AE182 | MOVEA.L | (A0), A0 |
| 7AE184 | MOVEQ | #$0A, D0 |
| 7AE186 | CMP.W | (A0), D0 |
| 7AE188 | BNE | *+$0104 ; 007AE28C |
| 7AE18C | MOVEQ | #$01, D0 |
| 7AE18E | MOVE.W | −$01A6(A6), D1 |
| 7AE192 | LSL.W | D1, D0 |
| 7AE194 | CMP.W | −$0164(A6), D0 |
| 7AE198 | BNE | *+$00F4 ; 007AE28C |
| 7AE19C | CMPI.W | #$0010, −$0166(A6) |
| 7AE1A2 | BNE.S | *+$000E ; 007AE1B0 |
| 7AE1B0 | MOVEA.L | $0018(A3), A1 |
| 7AE1B4 | MOVEA.L | (A1), A0 |
| 7AE1B6 | CMPI.W | #$000A, (A0) |
| 7AE1BA | BEQ.S | *+$001A ; 007AE1D4 |
| 7AE1D4 | ST | −$0185(A6) |
| 7AE1D8 | CLR.B | −$0186(A6) |
| 7AE1DC | CLR.L | −$008E(A6) |
| 7AE1E0 | MOVE.W | −$002C(A6), D0 |
| 7AE1E4 | MOVE.W | $0028(A6), D1 |
| 7AE1E8 | SUB.W | $000C(A6), D0 |
| 7AE1EC | BNE.S | *+$0008 ; 007AE1F4 |
| 7AE1EE | CMP.W | −$0008(A6), D1 |
| 7AE1F2 | BEQ.S | *+$0012 ; 007AE204 |
| 7AE204 | MOVE.W | −$000C(A6), D0 |
| 7AE208 | SUB.W | −$017E(A6), D0 |
| 7AE20C | MOVE.W | −$0180(A6), D1 |
| 7AE210 | ANDI.W | #$7FFF, D1 |
| 7AE214 | MULS.W | D1, D0 |
| 7AE216 | ADD.L | −$0184(A6), D0 |
| 7AE21A | MOVE.L | D0, −$01E2(A6) |
| 7AE21E | MOVE.W | D1, −$0036(A6) |
| 7AE222 | MOVE.W | −$017C(A6), −$0040(A6) |
| 7AE228 | TST.B | −$01A1(A6) |
| 7AE22C | BEQ | *+$0216 ; 007AE442 |
| 7AE442 | LEA | $001A(A2), A0 |
| 7AE446 | MOVEQ | #$00, D0 |
| 7AE448 | MOVE.W | −$0042(A6), D0 |
| 7AE44C | MOVE.L | −$01EA(A6), D1 |
| 7AE450 | MULU.W | D1, D0 |
| 7AE452 | ADDA.L | D0, A0 |
| 7AE454 | MOVE.L | A0, −$007E(A6) |
| 7AE458 | MOVE.W | $000A(A2), D0 |
| 7AE45C | SWAP | D0 |
| 7AE45E | BPL.S | *+$0004 ; 007AE462 |
| 7AE462 | MOVE.W | $0010(A2), D0 |
| 7AE466 | ASL.L | #$1, D0 |
| 7AE468 | LEA | $10(A2, D0.L), A1 |
| 7AE46C | MOVE.L | A1, −$007A(A6) |
| 7AE470 | MOVE.W | $0004(A2), D0 |
| 7AE474 | MOVE.W | $0002(A2), D1 |
| 7AE478 | MOVE.W | D1, −$018E(A6) |
| 7AE47C | SUB.W | D1, D0 |
| 7AE47E | MOVE.W | D0, −$018C(A6) |
| 7AE482 | ADDQ.W | #$3, D0 |
| 7AE484 | BTST | #$01, $0001(A2) |
| 7AE48A | BEQ.S | *+$0004 ; 007AE48E |
| 7AE48E | ASL.W | #$1, D0 |
| 7AE490 | LEA | $00(A1, D0.W), A0 |
| 7AE494 | MOVE.L | A0, −$0076(A6) |
| 7AE498 | MOVEA.L | WidthTabHandle, A0 |
| 7AE49C | MOVEA.L | (A0), A0 |
| 7AE49E | MOVE.L | $0080(A0), −$006E(A6) |
| 7AE4A4 | MOVE.W | −$0040(A6), D1 |
| 7AE4A8 | MOVE.W | −$0068(A6), D0 |
| 7AE4AC | ADD.W | −$0196(A6), D0 |
| 7AE4B0 | SUB.W | D1, D0 |
| 7AE4B2 | MOVE.W | D0, −$0072(A6) |
| 7AE4B6 | TST.W | $0006(A3) |
| 7AE4BA | BPL.S | *+$000A ; 007AE4C4 |
| 7AE4BC | MOVE.W | −$0198(A6), −$0070(A6) |
| 7AE4C2 | BRA.S | *+$0008 ; 007AE4CA |
| 7AE4CA | SUB.W | D1, −$002A(A6) |
| 7AE4CE | SUB.W | D1, −$0026(A6) |
| 7AE4D2 | MOVE.W | −$019E(A6), D0 |
| 7AE4D6 | MOVEA.L | $10(A6, D0.W), A1 |
| 7AE4DA | BRA.S | *+$0032 ; 007AE50C |

;  
; Begin main drawing loop for  
; each character.  
; Loop 1 – 'F'  
;

| | | |
|---|---|---|
| 7AE50C | CLR.W | D0 |
| 7AE50E | MOVE.B | (A1)+, D0 |
| 7AE510 | CMPI.B | #$20, D0 ; ' ' |
| 7AE514 | BEQ.S | *−$001C ; 007AE4F8 |
| 7AE516 | MOVEA.L | WidthTabHandle, A0 |
| 7AE51A | MOVEA.L | (A0), A0 |
| 7AE51C | MOVE.W | D0, D4 |
| 7AE51E | ASL.W | #$2, D4 |
| 7AE520 | MOVE.L | $00(A0, D4.W), D4 |

TABLE 16-continued qdtrace.log
Copyright © 1991 Frame Technology Corporation

| | | |
|---|---|---|
| 7AE524 | ADD.L | -$0086(A6), D4 |
| 7AE528 | SUB.W | -$018E(A6), D0 |
| 7AE52C | CMP.W | -$018C(A6), D0 |
| 7AE530 | BHI.S | *-$0054 ; 007AE4DC |
| 7AE532 | MOVEA.L | -$007A(A6), A0 |
| 7AE536 | MOVE.W | D0, D3 |
| 7AE538 | ASL.W | #$1, D3 |
| 7AE53A | MOVE.W | $00(A6, D3.W), D3 |
| 7AE53E | CMPI.W | #$FFFF, D3 |
| 7AE542 | BEQ.S | *-$0066 ; 007AE4DC |
| 7AE544 | LSR.W | #$8, D3 |
| 7AE546 | ADD.W | -$0072(A6), D3 |
| 7AE54A | ADD.L | D4, -$0072(A6) |
| 7AE54E | MOVEA.L | -$007E(A6), A0 |
| 7AE552 | MOVEQ | #$00, D1 |
| 7AE554 | MOVE.W | D0, D5 |
| 7AE556 | ASL.W | #$1, D5 |
| 7AE558 | MOVE.W | $00(A0, D5.W), D1 |
| 7AE55C | MOVE.W | $02(A0, D5.W), D2 |
| 7AE560 | SUB.W | D1, D2 |
| 7AE562 | BLE.S | *-$0062 ; 007AE500 |
| 7AE564 | MOVE.W | D2, -$019C(A6) |
| 7AE568 | ADD.W | D3, D2 |
| 7AE56A | TST.B | -$0188(A6) |
| 7AE56E | BEQ.S | *+$000C ; 007AE57A |
| 7AE570 | MOVEA.L | -$0076(A6), A0 |
| 7AE574 | MOVE.W | $00(A0, D5.W), -$018A(A6) |
| 7AE57A | TST.B | -$0185(A6) |
| 7AE57E | BEQ.S | *+$003C ; 007AE5BA |
| 7AE580 | CMP.W | -$002A(A6), D3 |
| 7AE584 | BGE.S | *+$001C ; 007AE5A0 |
| 7AE5A0 | CMP.W | -$0026(A6), D2 |
| 7AE5A4 | BLE.S | *+$0016 ; 007AE5BA |
| 7AE5BA | MOVEM.W | D1–D3, -$00AC(A6) |
| 7AE5C0 | MOVE.B | -$01A9(A6), -$01A7(A6) |
| 7AE5C6 | ST | -$01A8(A6) |
| 7AE5CA | MOVE.W | -$01A6(A6), D0 |
| 7AE5CE | LSL.W | D0, D1 |
| 7AE5D0 | LSL.W | D0, D2 |
| 7AE5D2 | LSL.W | D0, D3 |
| 7AE5D4 | MOVEA.W | -$0036(A6), A3 |
| 7AE5D8 | MOVEM.L | -$01EA(A6), A2/A4/A5 |
| 7AE5DE | MOVE.W | #$00FF, D7 |
| 7AE5E2 | ADD.B | -$0189(A6), D7 |
| 7AE5E6 | BMI | *-$00E6 ; 007AE500 |
| 7AE5EA | MOVEQ | #$00, D0 |
| 7AE5EC | MOVE.B | -$018A(A6), D0 |
| 7AE5F0 | MOVE.L | A2, D4 |
| 7AE5F2 | MULU.L | D0, D4 |
| 7AE5F6 | ADDA.L | D4, A4 |
| 7AE5F8 | MOVE.W | A3, D4 |
| 7AE5FA | MULU.W | D0, D4 |
| 7AE5FC | ADDA.L | D4, A5 |
| 7AE5FE | MOVEQ | #$1F, D0 |
| 7AE600 | MOVE.L | D1, D5 |
| 7AE602 | MOVE.W | D3, D6 |
| 7AE604 | ASR.W | #$5, D6 |
| 7AE606 | MOVE.W | D6, D4 |
| 7AE608 | LSL.W | #$2, D6 |
| 7AE60A | ADDA.W | D6, A5 |
| 7AE60C | MOVE.W | D2, D6 |
| 7AE60E | ASR.W | #$5, D6 |
| 7AE610 | SUB.W | D4, D6 |
| 7AE612 | BEQ | *+$0160 ; 007AE772 |
| 7AE616 | NEG.W | D3 |
| 7AE618 | AND.W | D0, D3 |
| 7AE61A | BNE.S | *+$0004 ; 007AE61E |
| 7AE61C | MOVEQ | #$20, D3 ; ' ' |
| 7AE61E | MOVE.W | D6, D4 |
| 7AE620 | LSL.W | #$2, D4 |
| 7AE622 | SUBA.W | D4, A2 |
| 7AE624 | SUBA.W | D4, A3 |
| 7AE626 | SUBQ.W | #$1, D6 |
| 7AE628 | ADD.W | D3, D1 |
| 7AE62A | MOVEQ | #$20, D4 ; ' ' |
| 7AE62C | SUB.L | D4, D1 |
| 7AE62E | TST.B | -$01A7(A6) |
| 7AE632 | BNE.S | *+$0040 ; 007AE672 |
| 7AE634 | AND.W | D0, D2 |
| 7AE636 | MOVEQ | #$01, D4 |
| 7AE638 | ROR.L | #$1, D4 |
| 7AE63A | ASR.L | D2, D4 |
| 7AE63C | ASL.L | #$1, D4 |
| 7AE63E | MOVE.W | D6, D2 |
| 7AE640 | MOVEA.W | D6, A0 |
| 7AE642 | MOVE.L | D5, D6 |
| 7AE644 | ADD.W | D3, D6 |
| 7AE646 | MOVEQ | #$20, D0 ; ' ' |
| 7AE648 | SUB.L | D0, D6 |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |

TABLE 16-continued qdtrace.log
Copyright © 1991 Frame Technology Corporation

| | | |
|---|---|---|
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE66E | BRA | *+$01BA ; 007AE828 |
| 7AE828 | SUBQ.W | #$1, -$00CC(A6) |
| 7AE82C | SUBQ.W | #$1, -$01A0(A6) |
| 7AE830 | BGT | *-$0324 ; 007AE50C |
| ; | | |
| ; Loop 2 – 'r' | | |
| ; | | |
| 7AE50C | CLR.W | D0 |
| 7AE50E | MOVE.B | (A1)+, D0 |
| 7AE510 | CMPI.B | #$20, D0 ; ' ' |
| 7AE514 | BEQ.S | *-$001C ; 007AE4F8 |
| 7AE516 | MOVEA.L | WidthTabHandle, A0 |
| 7AE51A | MOVEA.L | (A0), A0 |
| 7AE51C | MOVE.W | D0, D4 |
| 7AE51E | ASL.W | #$2, D4 |
| 7AE520 | MOVE.L | $00(A0, D4.W), D4 |
| 7AE524 | ADD.L | -$0086(A6), D4 |
| 7AE528 | SUB.W | -$018E(A6), D0 |
| 7AE52C | CMP.W | -$018C(A6), D0 |
| 7AE530 | BHI.S | *-$0054 ; 007AE4DC |
| 7AE532 | MOVEA.L | -$007A(A6), A0 |
| 7AE536 | MOVE.W | D0, D3 |
| 7AE538 | ASL.W | #$1, D3 |
| 7AE53A | MOVE.W | $00(A0, D3.W), D3 |
| 7AE53E | CMPI.W | #$FFFF, D3 |
| 7AE542 | BEQ.S | *-$0066 ; 007AE4DC |
| 7AE544 | LSR.W | *$8, D3 |
| 7AE546 | ADD.W | -$0072(A6), D3 |
| 7AE54A | ADD.L | D4, -$0072(A6) |
| 7AE54E | MOVEA.L | -$007E(A6), A0 |
| 7AE552 | MOVEQ | #$00, D1 |
| 7AE554 | MOVE.W | D0, D5 |
| 7AE556 | ASL.W | #$1, D5 |
| 7AE558 | MOVE.W | $00(A0, D5.W), D1 |
| 7AE55C | MOVE.W | $02(A0, D5.W), D2 |
| 7AE560 | SUB.W | D1, D2 |
| 7AE562 | BLE.S | *-$0062 ; 007AE500 |
| 7AE564 | MOVE.W | D2, -$019C(A6) |
| 7AE568 | ADD.W | D3, D2 |
| 7AE56A | TST.B | -$0188(A6) |
| 7AE56E | BEQ.S | *+$000C ; 007AE57A |
| 7AE570 | MOVEA.L | -$0076(A6), A0 |
| 7AE574 | MOVE.W | $00(A0, D5.W), -$018A(A6) |
| 7AE57A | TST.B | -$0185(A6) |
| 7AE57E | BEQ.S | *+$003C ; 007AE5BA |
| 7AE580 | CMP.W | -$002A(A6), D3 |
| 7AE584 | BGE.S | *+$001C ; 007AE5A0 |
| 7AE5A0 | CMP.W | -$0026(A6), D2 |
| 7AE5A4 | BLE.S | *+$0016 ; 007AE5BA |
| 7AE5BA | MOVEM.W | D1–D3, -$00AC(A6) |
| 7AE5C0 | MOVE.B | -$01A9(A6), -$01A7(A6) |
| 7AE5C6 | ST | -$01A8(A6) |
| 7AE5CA | MOVE.W | -$01A6(A6), D0 |
| 7AE5CE | LSL.W | D0, D1 |
| 7AE5D0 | LSL.W | D0, D2 |
| 7AE5D2 | LSL.W | D0, D3 |
| 7AE5D4 | MOVEA.W | -$0036(A6), A3 |
| 7AE5D8 | MOVEM.L | -$01EA(A6), A2/A4/A5 |
| 7AE5DE | MOVE.W | #$00FF, D7 |
| 7AE5E2 | ADD.B | -$0189(A6), D7 |
| 7AE5E6 | BMI | *-$00E6 ; 007AE500 |
| 7AE5EA | MOVEQ | #$00, D0 |
| 7AE5EC | MOVE.B | -$018A(A6), D0 |
| 7AE5F0 | MOVE.L | A2, D4 |
| 7AE5F2 | MULU.L | D0, D4 |
| 7AE5F6 | ADDA.L | D4, A4 |
| 7AE5F8 | MOVE.W | A3, D4 |
| 7AE5FA | MULU.W | D0, D4 |
| 7AE5FC | ADDA.L | D4, A5 |
| 7AE5FE | MOVEQ | #$1F, D0 |
| 7AE600 | MOVE.L | D1, D5 |
| 7AE602 | MOVE.W | D3, D6 |
| 7AE604 | ASR.W | #$5, D6 |
| 7AE606 | MOVE.W | D6, D4 |
| 7AE608 | LSL.W | #$2, D6 |
| 7AE60A | ADDA.W | D6, A5 |
| 7AE60C | MOVE.W | D2, D6 |
| 7AE60E | ASR.W | #$5, D6 |
| 7AE610 | SUB.W | D4, D6 |
| 7AE612 | BEQ | *+$0160 ; 007AE772 |
| 7AE616 | NEG.W | D3 |
| 7AE618 | AND.W | D0, D3 |
| 7AE61A | BNE.S | *+$0004 ; 007AE61E |
| 7AE61E | MOVE.W | D6, D4 |
| 7AE620 | LSL.W | #$2, D4 |
| 7AE622 | SUBA.W | D4, A2 |
| 7AE624 | SUBA.W | D4, A3 |
| 7AE626 | SUBQ.W | #$1, D6 |
| 7AE628 | ADD.W | D3, D1 |
| 7AE62A | MOVEQ | #$20, D4 ; ' ' |
| 7AE62C | SUB.L | D4, D1 |
| 7AE62E | TST.B | -$01A7(A6) |
| 7AE632 | BNE.S | *+$0040 ; 007AE672 |
| 7AE634 | AND.W | D0, D2 |
| 7AE636 | MOVEQ | #$01, D4 |
| 7AE638 | ROR.L | #$1, D4 |
| 7AE63A | ASR.L | D2, D4 |
| 7AE63C | ASL.L | #$1, D4 |
| 7AE63E | MOVE.W | D6, D2 |
| 7AE640 | MOVEA.W | D6, A0 |
| 7AE642 | MOVE.L | D5, D6 |
| 7AE644 | ADD.W | D3, D6 |
| 7AE646 | MOVEQ | #$20, D0 ; ' ' |
| 7AE648 | SUB.L | D0, D6 |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |

TABLE 16-continued qdtrace.log
Copyright © 1991 Frame Technology Corporation

| | | |
|---|---|---|
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D.1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE66E | BRA | *+$01BA ; 007AE828 |
| 7AE828 | SUBQ.W | #$1, -$00CC(A6) |
| 7AE82C | SUBQ.W | #$1, -$01A0(A6) |
| 7AE830 | BGT | *-$0324 ; 007AE50C |
| ; | | |
| ; Loop 3 – 'a' | | |
| ; | | |
| 7AE50C | CLR.W | D0 |
| 7AE50E | MOVE.B | (A1)+, D0 |
| 7AE510 | CMPI.B | #$20, D0 ; ' ' |
| 7AE514 | BEQ.S | *-$001C ; 007AE4F8 |
| 7AE516 | MOVEA.L | WidthTabHandle, A0 |
| 7AE51A | MOVEA.L | (A0), A0 |
| 7AE51C | MOVE.W | D0, D4 |
| 7AE51E | ASL.W | #$2, D4 |
| 7AE520 | MOVE.L | $00(A0, D4.W), D4 |
| 7AE524 | ADD.L | -$0086(A6), D4 |
| 7AE528 | SUB.W | -$018E(A6), D0 |
| 7AE52C | CMP.W | -$018C(A6), D0 |

TABLE 16-continued qdtrace.log
Copyright © 1991 Frame Technology Corporation

| | | |
|---|---|---|
| 7AE530 | BHI.S | *-$0054 ; 007AE4DC |
| 7AE532 | MOVEA.L | -$007A(A6), A0 |
| 7AE536 | MOVE.W | D0, D3 |
| 7AE538 | ASL.W | #$1, D3 |
| 7AE53A | MOVE.W | $00(A0, D3.W), D3 |
| 7AE53E | CMPI.W | #$FFFF, D3 |
| 7AE542 | BEQ.S | *-$0066 ; 007AE4DC |
| 7AE544 | LSR.W | #$8, D3 |
| 7AE546 | ADD.W | -$0072(A6), D3 |
| 7AE54A | ADD.L | D4, -$0072(A6) |
| 7AE54E | MOVEA.L | -$007E(A6), A0 |
| 7AE552 | MOVEQ | #$00, D1 |
| 7AE554 | MOVE.W | D0, D5 |
| 7AE556 | ASL.W | #$1, D5 |
| 7AE558 | MOVE.W | $00(A0, D5.W), D1 |
| 7AE55C | MOVE.W | $02(A0, D5.W), D2 |
| 7AE560 | SUB.W | D1, D2 |
| 7AE562 | BLE.S | *-$0062 ; 007AE500 |
| 7AE564 | MOVE.W | D2, -$019C(A6) |
| 7AE568 | ADD.W | D3, D2 |
| 7AE56A | TST.B | -$0188(A6) |
| 7AE56E | BEQ.S | *+$000C ; 007AE57A |
| 7AE570 | MOVEA.L | -$0076(A6), A0 |
| 7AE574 | MOVE.W | $00(A0, D5.W), -$018A(A6) |
| 7AE57A | TST.B | -$0185(A6) |
| 7AE57E | BEQ.S | *+$003C ; 007AE5BA |
| 7AE580 | CMP.W | -$002A(A6), D3 |
| 7AE584 | BGE.S | *+$001C ; 007AE5A0 |
| 7AE5A0 | CMP.W | *-$0026(A6), D2 |
| 7AE5A4 | BLE.S | *+$0016 ; 007AE5BA |
| 7AE5BA | MOVEM.W | D1–D3, -$00AC(A6) |
| 7AE5C0 | MOVE.B | -$01A9(A6), -$01A7(A6) |
| 7AE5C6 | ST | -$01A8(A6) |
| 7AE5CA | MOVE.W | -$01A6(A6), D0 |
| 7AE5CE | LSL.W | D0, D1 |
| 7AE5D0 | LSL.W | D0, D2 |
| 7AE5D2 | LSL.W | D0, D3 |
| 7AE5D4 | MOVEA.W | -$0036(A6), A3 |
| 7AE5D8 | MOVEM.L | -$01EA(A6), A2/A4/A5 |
| 7AE5DE | MOVE.W | #$00FF, D7 |
| 7AE5E2 | ADD.B | -$0189(A6), D7 |
| 7AE5E6 | BMI | *-$00E6 ; 007AE500 |
| 7AE5EA | MOVEQ | #$00, D0 |
| 7AE5EC | MOVE.B | -$018A(A6), D0 |
| 7AE5F0 | MOVE.L | A2, D4 |
| 7AE5F2 | MULU.L | D0, D4 |
| 7AE5F6 | ADDA.L | D4, A4 |
| 7AE5F8 | MOVE.W | A3, D4 |
| 7AE5FA | MULU.W | D0, D4 |
| 7AE5FC | ADDA.L | D4, A5 |
| 7AE5FE | MOVEQ | #$1F, D0 |
| 7AE600 | MOVE.L | D1, D5 |
| 7AE602 | MOVE.W | D3, D6 |
| 7AE604 | ASR.W | #$5, D6 |
| 7AE606 | MOVE.W | D6, D4 |
| 7AE608 | LSL.W | #$2, D6 |
| 7AE60A | ADDA.W | D6, A5 |
| 7AE60C | MOVE.W | D2, D6 |
| 7AE60E | ASR.W | #$5, D6 |
| 7AE610 | SUB.W | D4, D6 |
| 7AE612 | BEQ | *+$0160 ; 007AE772 |
| 7AE616 | NEG.W | D3 |
| 7AE618 | AND.W | D0, D3 |
| 7AE61A | BNE.S | *+$0004 ; 007AE61E |
| 7AE61E | MOVE.W | D6, D4 |
| 7AE620 | LSL.W | #$2, D4 |
| 7AE622 | SUBA.W | D4, A2 |
| 7AE624 | SUBA.W | D4, A3 |
| 7AE626 | SUBQ.W | #$1, D6 |
| 7AE628 | ADD.W | D3, D1 |
| 7AE62A | MOVEQ | #$20, D4 ; ' ' |
| 7AE62C | SUB.L | D4, D1 |
| 7AE62E | TST.B | -$01A7(A6) |
| 7AE632 | BNE.S | *+$0040 ; 007AE672 |
| 7AE634 | AND.W | D0, D2 |
| 7AE636 | MOVEQ | #$01, D4 |

TABLE 16-continued qdtrace.log
Copyright © 1991 Frame Technology Corporation

| | | |
|---|---|---|
| 7AE638 | ROR.L | #$1, D4 |
| 7AE63A | ASR.L | D2, D4 |
| 7AE63C | ASL.L | #$1, D4 |
| 7AE63E | MOVE.W | D6, D2 |
| 7AE640 | MOVEA.W | D6, A0 |
| 7AE642 | MOVE.L | D5, D6 |
| 7AE644 | ADD.W | D3, D6 |
| 7AE646 | MOVEQ | #$20, D0 ; ' ' |
| 7AE648 | SUB.L | D0, D6 |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE66E | BRA | *+$01BA ; 007AE828 |
| 7AE828 | SUBQ.W | #$1, -$00CC(A6) |
| 7AE82C | SUBQ.W | #$1, -$01A0(A6) |
| 7AE830 | BGT | *-$0324 ; 007AE50C |
| ; | | |
| ; Loop 4 – 'm' | | |
| ; | | |
| 7AE50C | CLR.W | D0 |
| 7AE50E | MOVE.B | (A1)+, D0 |
| 7AE510 | CMPI.B | #$20, D0 ; ' ' |
| 7AE514 | BEQ.S | *-$001C ; 007AE4F8 |
| 7AE516 | MOVEA.L | WidthTabHandle, A0 |
| 7AE51A | MOVEA.L | (A0), A0 |
| 7AE51C | MOVE.W | D0, D4 |
| 7AE51E | ASL.W | #$2, D4 |
| 7AE520 | MOVE.L | $00(A0, D4.W), D4 |
| 7AE524 | ADD.L | -$0086(A6), D4 |
| 7AE528 | SUB.W | -$018E(A6), D0 |
| 7AE52C | CMP.W | -$018C(A6), D0 |
| 7AE530 | BHI.S | *-$0054 ; 007AE4DC |
| 7AE532 | MOVEA.L | -$007A(A6), A0 |
| 7AE536 | MOVE.W | D0, D3 |
| 7AE538 | ASL.W | #$1, D3 |
| 7AE53A | MOVE.W | $00(A0, D3.W), D3 |
| 7AE53E | CMPI.W | #$FFFF, D3 |
| 7AE542 | BEQ.S | *-$0066 ; 007AE4DC |
| 7AE544 | LSR.W | #$8, D3 |
| 7AE546 | ADD.W | -$0072(A6), D3 |
| 7AE54A | ADD.L | D4, -$0072(A6) |
| 7AE54E | MOVEA.L | -$007E(A6), A0 |
| 7AE552 | MOVEQ | #$00, D1 |
| 7AE554 | MOVE.W | D0, D5 |
| 7AE556 | ASL.W | #$1, D5 |
| 7AE558 | MOVE.W | $00(A0, D5.W), D1 |
| 7AE55C | MOVE.W | $02(A0, D5.W), D2 |
| 7AE560 | SUB.W | D1, D2 |
| 7AE562 | BLE.S | *-$0062 ; 007AE500 |
| 7AE564 | MOVE.W | D2, -$019C(A6) |
| 7AE568 | ADD.W | D3, D2 |
| 7AE56A | TST.B | -$0188(A6) |
| 7AE56E | BEQ.S | *+$000C ; 007AE57A |
| 7AE570 | MOVEA.L | -$0076(A6), A0 |
| 7AE574 | MOVE.W | $00(A0, D5.W), -$018A(A6) |
| 7AE57A | TST.B | -$0185(A6) |
| 7AE57E | BEQ.S | *+$003C ; 007AE5BA |
| 7AE580 | CMP.W | -$002A(A6), D3 |
| 7AE584 | BGE.S | *+$001C ; 007AE5A0 |

TABLE 16-continued qdtrace.log
Copyright © 1991 Frame Technology Corporation

| | | |
|---|---|---|
| 7AE5A0 | CMP.W | −$0026(A6), D2 |
| 7AE5A4 | BLE.S | *+$0016 ; 007AE5BA |
| 7AE5BA | MOVEM.W | D1–D3, −$00AC(A6) |
| 7AE5C0 | MOVE.B | −$01A9(A6), −$01A7(A6) |
| 7AE5C6 | ST | −$01A8(A6) |
| 7AE5CA | MOVE.W | −$01A6(A6), D0 |
| 7AE5CE | LSL.W | D0, D1 |
| 7AE5D0 | LSL.W | D0, D2 |
| 7AE5D2 | LSL.W | D0, D3 |
| 7AE5D4 | MOVEA.W | −$0036(A6), A3 |
| 7AE5D8 | MOVEM.L | −$01EA(A6), A2/A4/A5 |
| 7AE5DE | MOVE.W | *$00FF, D7 |
| 7AE5E2 | ADD.B | −$0189(A6), D7 |
| 7AE5E6 | BMI | *−$00E6 ; 007AE500 |
| 7AE5EA | MOVEQ | #$00, D0 |
| 7AE5EC | MOVE.B | −$018A(A6), D0 |
| 7AE5F0 | MOVE.L | A2, D4 |
| 7AE5F2 | MULU.L | D0, D4 |
| 7AE5F6 | ADDA.L | D4, A4 |
| 7AE5F8 | MOVE.W | A3, D4 |
| 7AE5FA | MULU.W | D0, D4 |
| 7AE5FC | ADDA.L | D4, A5 |
| 7AE5FE | MOVEQ | #$1F, D0 |
| 7AE600 | MOVE.L | D1, D5 |
| 7AE602 | MOVE.W | D3, D6 |
| 7AE604 | ASR.W | #$5, D6 |
| 7AE606 | MOVE.W | D6, D4 |
| 7AE608 | LSL.W | #$2, D6 |
| 7AE60A | ADDA.W | D6, A5 |
| 7AE60C | MOVE.W | D2, D6 |
| 7AE60E | ASR.W | #$5, D6 |
| 7AE610 | SUB.W | D4, D6 |
| 7AE612 | BEQ | *+$0160 ; 007AE772 |
| 7AE616 | NEG.W | D3 |
| 7AE618 | AND.W | D0, D3 |
| 7AE61A | BNE.S | *+$0004 ; 007AE61E |
| 7AE61C | MOVEQ | #$20, D3 ; ' ' |
| 7AE61E | MOVE.W | D6, D4 |
| 7AE620 | LSL.W | #$2, D4 |
| 7AE622 | SUBA.W | D4, A2 |
| 7AE624 | SUBA.W | D4, A3 |
| 7AE626 | SUBQ.W | #$1, D6 |
| 7AE628 | ADD.W | D3, D1 |
| 7AE62A | MOVEQ | #$20, D4 ; ' ' |
| 7AE62C | SUB.L | D4, D1 |
| 7AE62E | TST.B | −$01A7(A6) |
| 7AE632 | BNE.S | *+$0040 ; 007AE672 |
| 7AE634 | AND.W | D0, D2 |
| 7AE636 | MOVEQ | #$01, D4 |
| 7AE638 | ROR.L | #$1, D4 |
| 7AE63A | ASR.L | D2, D4 |
| 7AE63C | ASL.L | #$1, D4 |
| 7AE63E | MOVE.W | D6, D2 |
| 7AE640 | MOVEA.W | D6, A0 |
| 7AE642 | MOVE.L | D5, D6 |
| 7AE644 | ADD.W | D3, D6 |
| 7AE646 | MOVEQ | #$20, D0 ; ' ' |
| 7AE648 | SUB.L | D0, D6 |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *−$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *−$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *−$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *−$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *−$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *−$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *−$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *−$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *−$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *−$0008 ; 007AE650 |
| 7AE650 | BFEXTU | (A4){D6:$00}, D0 |
| 7AE654 | OR.L | D0, (A5)+ |
| 7AE656 | ADDQ.W | #$4, A4 |
| 7AE658 | DBF | D2, *−$0008 ; 007AE650 |
| 7AE65C | BFEXTU | (A4){D1:$00}, D0 |
| 7AE660 | AND.L | DA, D0 |
| 7AE662 | OR.L | D0, (A5) |
| 7AE664 | ADDA.L | A2, A4 |
| 7AE666 | ADDA.L | A3, A5 |

TABLE 16-continued qdtrace.log
Copyright © 1991 Frame Technology Corporation

| | | |
|---|---|---|
| 7AE668 | MOVE.W | A0, D2 |
| 7AE66A | DBF | D7, *-$0020 ; 007AE64A |
| 7AE66E | BRA | *+$01BA ; 007AE828 |
| 7AE828 | SUBQ.W | #$1, -$00CC(A6) |
| 7AE82C | SUBQ.W | #$1, -$01A0(A6) |
| 7AE830 | BGT | *-$0324 ; 007AE50C |

;
; Loop 5 – 'e'
;

| | | |
|---|---|---|
| 7AE50C | CLR.W | D0 |
| 7AE50E | MOVE.B | (A1)+, D0 |
| 7AE510 | CMPI.B | #$20, D0 ; ' ' |
| 7AE514 | BEQ.S | *-$001C ; 007AE4F8 |
| 7AE516 | MOVEA.L | WidthTabHandle, A0 |
| 7AE51A | MOVEA.L | (A0), A0 |
| 7AE51C | MOVE.W | D0, D4 |
| 7AE51E | ASL.W | #$2, D4 |
| 7AE520 | MOVE.L | $00(A0, D4.W), D4 |
| 7AE524 | ADD.L | -$0086(A6), D4 |
| 7AE528 | SUB.W | -$018E(A6), D0 |
| 7AE52C | CMP.W | -$018C(A6), D0 |
| 7AE530 | BHI.S | *-$0054 ; 007AE4DC |
| 7AE532 | MOVEA.L | -$007A(A6), A0 |
| 7AE536 | MOVE.W | D0, D3 |
| 7AE538 | ASL.W | #$1, D3 |
| 7AE53A | MOVE.W | $00(A0, D3.W), D3 |
| 7AE53E | CMPI.W | #$FFFF, D3 |
| 7AE542 | BEQ.S | *-$0066 ; 007AE4DC |
| 7AE544 | LSR.W | #$8, D3 |
| 7AE546 | ADD.W | -$0072(A6), D3 |
| 7AE54A | ADD.L | D4, -$0072(A6) |
| 7AE54E | MOVEA.L | -$007E(A6), A0 |
| 7AE552 | MOVEQ | #$00, D1 |
| 7AE554 | MOVE.W | D0, D5 |
| 7AE556 | ASL.W | #$1, D5 |
| 7AE558 | MOVE.W | $00(A0, D5.W), D1 |
| 7AE55C | MOVE.W | $02(A0, D5.W), D2 |
| 7AE560 | SUB.W | D1, D2 |
| 7AE562 | BLE.S | *-$0062 ; 007AE500 |
| 7AE564 | MOVE.W | D2, -$019C(A6) |
| 7AE568 | ADD.W | D3, D2 |
| 7AE56A | TST.B | -$0188(A6) |
| 7AE56E | BEQ.S | *+$000C ; 007AE57A |
| 7AE570 | MOVEA.L | -$0076(A6), A0 |
| 7AE574 | MOVE.W | $00(A0, D5.W), -$018A(A6) |
| 7AE57A | TST.B | -$0185(A6) |
| 7AE57E | BEQ.S | *+$003C ; 007AE5BA |
| 7AE580 | CMP.W | -$002A(A6), D3 |
| 7AE584 | BGE.S | *+$001C ; 007AE5A0 |
| 7AE5A0 | CMP.W | -$0026(A6), D2 |
| 7AE5A4 | BLE.S | *+$0016 ; 007AE5BA |
| 7AE5BA | MOVEM.W | D1–D3, -$00AC(A6) |
| 7AE5C0 | MOVE.B | -$01A9(A6), -$01A7(A6) |
| 7AE5C6 | ST | -$01A8(A6) |
| 7AE5CA | MOVE.W | -$01A6(A6), D0 |
| 7AE5CE | LSL.W | D0, D1 |
| 7AE5D0 | LSL.W | D0, D2 |
| 7AE5D2 | LSL.W | D0, D3 |
| 7AE5D4 | MOVEA.W | -$0036(A6), A3 |
| 7AE5D8 | MOVEM.L | -$01EA(A6), A2/A4/A5 |
| 7AE5DE | MOVE.W | #$00FF, D7 |
| 7AE5E2 | ADD.B | -$0189(A6), D7 |
| 7AE5E6 | BMI | *-$00E6 ; 007AE500 |
| 7AE5EA | MOVEQ | #$00, D0 |
| 7AE5EC | MOVE.B | -$018A(A6), D0 |
| 7AE5F0 | MOVE.L | A2, D4 |
| 7AE5F2 | MULU.L | D0, D4 |
| 7AE5F6 | ADDA.L | D4, A4 |
| 7AE5F8 | MOVE.W | A3, D4 |
| 7AE5FA | MULU.W | D0, D4 |
| 7AE5FC | ADDA.L | D4, A5 |
| 7AE5FE | MOVEQ | #$1F, D0 |
| 7AE600 | MOVE.L | D1, D5 |
| 7AE602 | MOVE.W | D3, D6 |
| 7AE604 | ASR.W | #$5, D6 |
| 7AE606 | MOVE.W | D6, D4 |
| 7AE608 | LSL.W | #$2, D6 |
| 7AE60A | ADDA.W | D6, A5 |
| 7AE60C | MOVE.W | D2, D6 |
| 7AE60E | ASR.W | #$5, D6 |
| 7AE610 | SUB.W | D4, D6 |
| 7AE612 | BEQ | *+$0160 ; 007AE772 |
| 7AE616 | NEG.W | D3 |
| 7AE618 | AND.W | D0, D3 |
| 7AE61A | BNE.S | *+$0004 ; 007AE61E |
| 7AE61E | MOVE.W | D6, D4 |
| 7AE620 | LSL.W | #$2, D4 |
| 7AE622 | SUBA.W | D4, A2 |
| 7AE624 | SUBA.W | D4, A3 |
| 7AE626 | SUBQ.W | #$1, D6 |
| 7AE628 | ADD.W | D3, D1 |
| 7AE62A | MOVEQ | #$20, D4 ; ' ' |
| 7AE62C | SUB.L | D4, D1 |
| 7AE62E | TST.B | -$01A7(A6) |
| 7AE632 | BNE.S | *+$0040 ; 007AE672 |
| 7AE634 | AND.W | D0, D2 |
| 7AE636 | MOVEQ | #$01, D4 |
| 7AE638 | ROR.L | #$1, D4 |
| 7AE63A | ASR.L | D2, D4 |
| 7AE63C | ASL.L | #$1, D4 |
| 7AE63E | MOVE.W | D6, D2 |
| 7AE640 | MOVEA.W | D6, A0 |
| 7AE642 | MOVE.L | D5, D6 |
| 7AE644 | ADD.W | D3, D6 |
| 7AE646 | MOVEQ | #$20, D0 ; ' ' |
| 7AE648 | SUB.L | D0, D6 |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |

TABLE 16-continued qdtrace.log  
Copyright © 1991 Frame Technology Corporation

| | | |
|---|---|---|
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE64A | BFEXTU | (A4){D5:D3}, D0 |
| 7AE64E | BRA.S | *+$0006 ; 007AE654 |
| 7AE654 | OR.L | D0, (A5)+ |
| 7AE656 | ADDQ.W | #$4, A4 |
| 7AE658 | DBF | D2, *-$0008 ; 007AE650 |
| 7AE65C | BFEXTU | (A4){D1:$00}, D0 |
| 7AE660 | AND.L | D4, D0 |
| 7AE662 | OR.L | D0, (A5) |
| 7AE664 | ADDA.L | A2, A4 |
| 7AE666 | ADDA.L | A3, A5 |
| 7AE668 | MOVE.W | A0, D2 |
| 7AE66A | DBF | D7, *-$0020 ; 007AE64A |
| 7AE66E | BRA | *+$01BA ; 007AE828 |
| 7AE828 | SUBQ.W | #$1, -$00CC(A6) |
| 7AE82C | SUBQ.W | #$1, -$01A0(A6) |
| 7AE830 | BGT | *-$0324 ; 007AE50C |

;  
; End of main drawing loop  
;

| | | |
|---|---|---|
| 7AE834 | MOVEA.L | -$0082(A6), A5 |
| 7AE838 | TST.B | -$0185(A6) |
| 7AE83C | BEQ.S | *+$001C ; 007AE858 |
| 7AE83E | TST.B | -$01A1(A6) |
| 7AE842 | BEQ.S | *+$0012 ; 007AE854 |
| 7AE854 | BRA | *+$02C0 ; 007AEB14 |
| 7AEB14 | MOVEA.L | -$0004(A6), A7 |
| 7AEB18 | MOVE.W | -$00CC(A6), D0 |
| 7AEB1C | SUB.W | -$01A0(A6), D0 |
| 7AEB20 | MOVE.W | D0, -$00CC(A6) |
| 7AEB24 | BGT | *-$0784 ; 007AE3A0 |
| 7AEB28 | BSET | #$07, HiliteMode |
| 7AEB2E | TST.W | -$019E(A6) |
| 7AEB32 | MOVEM.L | (A7)+, D0–D7/A1–A4 |
| 7AEB36 | UNLK | A6 |
| 7AEB38 | BEQ.S | *+$0004 ; 007AEB3C |
| 7AEB3C | MOVEA.L | (A7)+, A0 |
| 7AEB3E | ADDA.W | #$000E, A7 |
| 7AEB42 | JMP | (A0) |
| 7AEEB2 | RTS | |
| 7B1CD2 | MOVEA.L | (A7)+, A6 |
| 7B1CD4 | ST | -$000E(A6) |
| 7B1CD8 | MOVE.L | -$000C(A6), D0 |
| 7B1CDC | BEQ.S | *+$0040 ; 007B1D1C |
| 7B1D1C | BSET | #$07, HiliteMode |
| 7B1D22 | UNLK | A6 |
| 7B1D24 | RTD | #$0008 |
| 7AEDF6 | TST.B | (A7)+ |
| 7AEDF8 | BNE.S | *+$000E ; 007AEE06 |
| 7AEE06 | SUB.W | D6, $0014(A6) |
| 7AEE0A | BLE.S | *+$0010 ; 007AEE1A |
| 7AEE1A | BSET | #$07, HiliteMode |
| 7AEE20 | MOVEM.L | (A7)+, D5–D7/A3/A4 |
| 7AEE24 | UNLK | A6 |
| 7AEE26 | RTD | #$000E |

TABLE 17 summary  
Copyright 1991 Frame Technology Corporation

QuickDraw (Draw + Measure)

F = 198 + 8  
r = 173 + 8  
a = 197 + 8  
m = 198 + 8  
e = 173 + 8  
QD Letter Total = 939 + 40 = 979  
QD Overhead = (Pre-measure, Post-measure/pre-draw, post-draw) 232 + 298 + 35 = 565 QD Total = 1544  
TurboText (Draw + Build Display List)

F = 22 + 19  
r = 20 + 17  
a = 20 + 17  
m = 31 + 17  
e = 14 + 17  
TT Letter Total = 107 + 87 = 194  
TT Overhead = (Pre-build, post-build/pre-draw, post-draw) 257 + 151 + 43 = 451 TT Total = 645

TABLE 18 ttttrace. log  
Copyright 1991 Frame Technology Corporation

;  
; Begin Frame Compiled Text for Apple  
; Macintosh trace of display of "Frame"  
; at 12 point Times Roman, 8 bits/pixel  
; to an off-screen bitmap, unclipped  
;

| | | |
|---|---|---|
| 05AA28 | MOVEM.L | D2–D7/A2–A4/A6,–(A7) |
| 05AA2C | LEA | *+$0DCC,A6 ; 0005B7F8 |
| 05AA30 | MOVE.L | A7,$009C(A6) |
| 05AA34 | MOVE.L | A5,$007C(A6) |
| 05AA38 | MOVEA.L | (A5),A2 |
| 05AA3A | MOVEA.L | (A2),A2 |
| 05AA3C | MOVE.B | *-$0015,D0 ; 0005AA27 |
| 05AA40 | BMI | *+$0D7E ; 0005B7BE |
| 05AA44 | BEQ | *+$0D7E ; 0005B7C2 |
| 05AA48 | MOVE.B | $0046(A2),D0 |
| 05AA4C | ANDI.B | #$1C,D0 |
| 05AA50 | BNE | *+$0D72 ; 0005B7C2 |
| 05AA54 | MOVE.L | $005C(A2),D0 |
| 05AA58 | BNE | *+$0D6A ; 0005B7C2 |
| 05AA5C | CMPI.W | #$0031,$0048(A2) |
| 05AA62 | BEQ | *+$0D60 ; 0005B7C2 |
| 05AA66 | MOVE.L | A2,$0074(A6) |
| 05AA6A | TST.W | $0006(A2) |
| 05AA6E | BMI.S | *+$0072 ; 0005AAE0 |
| 05AAE0 | MOVEA.L | $0002(A2),A4 |
| 05AAE4 | MOVEA.L | (A4),A4 |
| 05AAE6 | TST.L | $000E(A4) |
| 05AAEA | BNE | *+$0CD8 ; 0005B7C2 |
| 05AAEE | MOVE.W | $0020(A4),$0068(A6) |
| 05AAF4 | MOVE.W | $001E(A4),D0 |
| 05AAF8 | BEQ.S | *+$000A ; 0005AB02 |
| 05AB02 | MOVEQ | #$00,D7 |
| 05AB04 | MOVE.W | $0008(A4),D7 |
| 05AB08 | SWAP | D7 |
| 05AB0A | MOVE.L | D7,$0084(A6) |
| 05AB0E | MOVE.W | $0032(A2),D3 |
| 05AB12 | SWAP | D3 |
| 05AB14 | MOVE.W | $000E(A2),D3 |
| 05AB18 | SUB.L | D7,D3 |
| 05AB1A | MOVE.L | D3,D6 |
| 05AB1C | SWAP | D6 |
| 05AB1E | MOVE.W | D6,$00AE(A6) |
| 05AB22 | MOVE.W | $0030(A2),D4 |
| 05AB26 | SUB.W | $0006(A4),D4 |
| 05AB2A | MOVE.W | D4,$0064(A6) |
| 05AB2E | MOVE.L | (A4),D0 |

TABLE 18-continued tttrace. log  
Copyright 1991 Frame Technology Corporation

| | | |
|---|---|---|
| 05AB30 | MOVEA.L | MainDevice,A0 |
| 05AB34 | MOVEA.L | (A0),A0 |
| 05AB36 | MOVEA.L | $0016(A0),A0 |
| 05AB3A | MOVEA.L | (A0),A0 |
| 05AB3C | CMP.L | (A0),D0 |
| 05AB3E | BNE | *+$0090 ; 0005ABCE |
| 05ABCE | CLR.L | $0070(A6) |
| 05ABD2 | CLR.L | $0090(A6) |
| 05ABD6 | AND.L | *+$0C16,D0 ; 0005B7EC |
| 05ABDA | LEA | $0032(A6),A3 |
| 05ABDE | MOVE.L | D0,(A3)+ |
| 05ABE0 | ADDQ.L | #$4,A4 |
| 05ABE2 | MOVEQ | #$04,D0 |
| 05ABE4 | MOVE.L | (A4)+,(A3)+ |
| 05ABE6 | MOVE.L | (A4)+,(A3)+ |
| 05ABE8 | DBF | D0,*-$0004 ; 0005ABE4 |
| 05ABE4 | MOVE.L | (A4)+,(A3)+ |
| 05ABE6 | MOVE.L | (A4)+,(A3)+ |
| 05ABE8 | DBF | D0,*-$0004 ; 0005ABE4 |
| 05ABE4 | MOVE.L | (A4)+,(A3)+ |
| 05ABE6 | MOVE.L | (A4)+,(A3)+ |
| 05ABE8 | DBF | D0,*-$0004 ; 0005ABE4 |
| 05ABE4 | MOVE.L | (A4)+,(A3)+ |
| 05ABE6 | MOVE.L | (A4)+,(A3)+ |
| 05ABE8 | DBF | D0,*-$0004 ; 0005ABE4 |
| 05ABEC | MOVE.L | (A4)+,(A3)+ |
| 05ABEE | MOVE.W | (A4)+,(A3)+ |
| 05ABF0 | MOVEQ | #$FF,D0 |
| 05ABF2 | MOVE.W | $0068(A6),D1 |
| 05ABF6 | BEQ | *+$0BCC ; 0005B7C2 |
| 05ABFA | ADDQ.W | #$1,D0 |
| 05ABFC | LSR.W | #$1,D1 |
| 05ABFE | BCC.S | *-$0004 ; 0005ABFA |
| 05ABFA | ADDQ.W | #$1,D0 |
| 05ABFC | LSR.W | #$1,D1 |
| 05ABFE | BCC.S | *-$0004 ; 0005ABFA |
| 05ABFA | ADDQ.W | #$1,D0 |
| 05ABFC | LSR.W | #$1,D1 |
| 05ABFE | BCC.S | *-$0004 ; 0005ABFA |
| 05ABFA | ADDQ.W | #$1,D0 |
| 05ABFC | LSR.W | #$1,D1 |
| 05ABFE | BCC.S | *-$0004 ; 0005ABFA |
| 05AC00 | BNE | *+$0BC2 ; 0005B7C2 |
| 05AC04 | CMPI.W | #$0005,D0 |
| 05AC08 | BGT | *+$0BBA ; 0005B7C2 |
| 05AC0C | ADD.W | D0,D0 |
| 05AC0E | MOVE.W | D0,$006A(A6) |
| 05AC12 | MOVEQ | #$50,D0 ; 'P' |
| 05AC14 | MOVEQ | #$24,D1 ; '$' |
| 05AC16 | JSR | *+$0674 ; 0005B28A |
| 05B28A | MOVEA.L | $0074(A6),A2 |
| 05B28E | TST.W | $0006(A2) |
| 05B292 | BPL | *+$00CC ; 0005B35E |
| 05B296 | LEA | $00(A2,D1.W),A1 |
| 05B29A | TST.L | (A1) |
| 05B29C | BNE.S | *+$0016 ; 0005B2B2 |
| 05B29E | TST.W | $0004(A1) |
| 05B2A2 | BNE.S | *+$0010 ; 0005B2B2 |
| 05B2A4 | MOVE.W | $006A(A6),D0 |
| 05B2A8 | LSL.W | #$1,D0 |
| 05B2AA | MOVE.L | *+$0044(D0.W),D1 ; 0005B2EE |
| 05B2AE | MOVEQ | #$00,D0 |
| 05B2B0 | RTS | |
| 05AC1A | BEQ.S | *+$000C ; 0005AC26 |
| 05AC26 | MOVE.L | D1,$00A0(A6) |
| 05AC2A | SUBQ.W | #$1,D4 |
| 05AC2C | MOVE.L | $0070(A6),D0 |
| 05AC30 | SWAP | D0 |
| 05AC32 | SUB.W | D0,D4 |
| 05AC34 | CLR.W | D0 |
| 05AC36 | SUB.L | D0,D3 |
| 05AC38 | MOVE.W | $0036(A6),D7 |
| 05AC3C | ANDI.W | #$3FFF,D7 |
| 05AC40 | MOVE.W | D7,$0066(A6) |
| 05AC44 | MULU.W | D7,D4 |
| 05AC46 | ADD.L | $0032(A6),D4 |
| 05AC4A | MOVEA.L | D4,A4 |
| 05AC4C | MOVE.L | A4,$0078(A6) |
| 05AC50 | MOVEQ | *$00,D0 |
| 05AC52 | MOVE.W | $0068(A6),D0 |
| 05AC56 | MOVE.L | $0030(A7),$0094(A6) |
| 05AC5C | MOVE.L | $002C(A7),$0098(A6) |
| 05AC62 | MOVE.L | D0,-(A7) |
| 05AC64 | MOVE.L | $0098(A6),-(A7) |
| 05AC68 | MOVE.L | $0094(A6),-(A7) |
| 05AC6C | MOVE.L | A2,-(A7) |
| 05AC6E | MOVEA.L | *+$0B66,A5 ; 0005B7D4 |
| 05AC72 | JSR | GetCFont ; 00060E5C |
| 060E5C | LINK | A6,#$FEC4 |
| 060E60 | MOVEM.L | D4-D7/A3/A4,-(A7) |
| 060E64 | MOVE.L | $0010(A6),D6 |
| 060E68 | MOVE.L | $000C(A6),D7 |
| 060E6C | MOVE.L | $0014(A6),-$00E4(A5) |
| 060E72 | MOVEA.L | $0008(A6),A0 |
| 060E76 | MOVE.W | $004A(A0),-$00E8(A5) |
| 060E7C | MOVE.W | $004A(A0),D0 |
| 060E80 | EXT.L | D0 |
| 060E82 | BNE.S | GetCFont+002E ; 00060E8A |
| 060E8A | MOVEA.L | $0008(A6),A0 |
| 060E8E | MOVE.W | $0044(A0),-$00E6(A5) |
| 060E94 | MOVE.W | $0044(A0),D0 |
| 060E98 | EXT.L | D0 |
| 060E9A | MOVEQ | #$01,D1 |
| 060E9C | CMP.L | D0,D1 |
| 060E9E | BNE.S | GetCFont+004A ; 00060EA6 |
| 060EA6 | CMPI.L | #$00010001,D7 |
| 060EAC | BNE | GetCFont+012C ; 00060F88 |
| 060EB0 | CMPI.L | #$00010001,D6 |
| 060EB6 | BNE | GetCFont+012C ; 00060F88 |
| 060EBA | TST.B | CPUFlag |
| 060EBE | BEQ.S | GetCFont+0068 ; 00060EC4 |
| 060EC0 | MOVEQ | #$18,D0 |
| 060EC2 | BRA.S | GetCFont+006A ; 00060EC6 |
| 060EC6 | MOVE.W | -$00E8(A5),D1 |
| 060ECA | EXT.L | D1 |
| 060ECC | CMP.L | D1,D0 |
| 060ECE | BGE.S | GetCFont+007A ; 00060ED6 |
| 060ED6 | MOVEQ | #$00,D0 |
| 060ED8 | MOVE.L | D0,-$0004(A6) |
| 060EDC | MOVEA.L | -$00DC(A5),A3 |
| 060EE0 | BRA.S | GetCFont+00F4 ; 00060F50 |
| 060F50 | MOVE.L | A3,D0 |
| 060F52 | BNE.S | GetCFont+0086 ; 00060EE2 |
| 060EE2 | MOVEA.L | (A3),A4 |
| 060EE4 | MOVE.L | $0014(A4),D0 |
| 060EE8 | CMP.L | -$0004(A6),D0 |
| 060EEC | BEQ.S | GetCFont+0098 ; 00060EF4 |
| 060EF4 | MOVE.L | A3,-$0004(A6) |
| 060EF8 | MOVEQ | #$00,D0 |
| 060EFA | MOVE.W | (A4),D0 |
| 060EFC | MOVE.W | -$00E6(A5),D1 |
| 060F00 | EXT.L | D1 |
| 060F02 | CMP.L | D1,D0 |
| 060F04 | BNE.S | GetCFont+00EE ; 00060F4A |
| 060F06 | MOVEQ | #$00,D0 |
| 060F08 | MOVE.W | $001A(A4),D0 |
| 060F0C | MOVE.W | -$00E8(A5),D1 |
| 060F10 | EXT.L | D1 |
| 060F12 | CMP.L | D1,D0 |
| 060F14 | BNE.S | GetCFont+00EE ; 00060F4A |
| 060F16 | MOVEA.L | $0008(A6),A0 |
| 060F1A | MOVEQ | #$00,D0 |
| 060F1C | MOVE.B | $0046(A0),D0 |
| 060F20 | MOVEQ | #$00,D1 |
| 060F22 | MOVE.B | $0004(A4),D1 |
| 060F26 | CMP.L | D0,D1 |
| 060F28 | BNE.S | GetCFont+00EE ; 00060F4A |
| 060F2A | MOVEQ | #$00,D0 |
| 060F2C | MOVE.W | $0018(A4),D0 |

TABLE 18-continued tttrace. log  
Copyright 1991 Frame Technology Corporation

```
060F30 CMP.L      -$00E4(A5),D0
060F34 BNE.S      GetCFont+00EE ; 00060F4A
060F36 MOVEA.L    $0008(A6),A0
060F3A MOVE.W     $0006(A4),D0
060F3E EXT.L      D0
060F40 MOVE.W     (A0),D1
060F42 EXT.L      D1
060F44 CMP.L      D1,D0
060F46 BEQ        GetCFont+076C ; 000615C8
0615C8 CMPA.L     -$00DC(A5),A3
0615CC BEQ.S      GetCFont+077A ; 000615D6
0615D6 MOVEA.L    (A3),A4
0615D8 TST.B      FractEnable
0615DC BEQ.S      GetCFont+079C ; 000615F8
0615F8 MOVEQ      #$00,D0
0615FA MOVE.W     $002C(A4),D0
0615FE MOVEQ      #$00,D1
061600 MOVE.W     $002A(A4),D1
061604 CMP.L      D0,D1
061606 BLS.S      GetCFont+07B4 ; 00061610
061610 MOVE.L     A3,D0
061612 MOVEM.L    -$0154(A6),D4–D7/A3/A4
061618 UNLK       A6
06161A RTS
05AC76 LEA        $0010(A7),A7
05AC7A MOVEA.L    $007C(A6),A5
05AC7E TST.L      D0
05AC80 BEQ        *+$0B42 ; 0005B7C2
05AC84 MOVE.L     D0,$008C(A6)
05AC88 MOVEA.L    D0,A0
05AC8A MOVE.L     (A0),D0
05AC8C AND.L      *+$0B60,D0 ; 0005B7EC
05AC90 MOVEA.L    D0,A0
05AC92 ADDA.W     #$0068,A0
05AC96 MOVEQ      #$00,D7
05AC98 TST.W      $0006(A2)
05AC9C BPL.S      *+$000E ; 0005ACAA
05AC9E MOVE.W     $000C(A2),D7
05ACA2 BEQ.S      *+$0008 ; 0005ACAA
05ACAA MOVE.L     $004C(A2),$0080(A6)
05ACB0 MOVEA.L    $0034(A7),A2
05ACB4 MOVEQ      #$00,D5
05ACB6 MOVE.W     $0038(A7),D5
05ACBA BEQ        *+$0AF4 ; 0005B7AE
05ACBE CMPI.W     #$0100,D5
05ACC2 BLT.S      *+$0006 ; 0005ACC8
05ACC8 MOVE.L     D5,D2
05ACCA ADDQ.L     #$1,D2
05ACCC LSL.L      #$3,D2
05ACCE NEG.L      D2
05ACD0 ADD.L      A7,D2
05ACD2 ANDI.L     #$FFFFFFFC,D2
05ACD8 MOVEA.L    D2,A7
05ACDA MOVEA.L    A7,A3
05ACDC SUBQ.W     #$1,D5
05ACDE TST.B      FractEnable
05ACE2 BNE.S      *+$0006 ; 0005ACE8
05ACE4 MOVEQ      #$04,D0
05ACE6 BRA.S      *+$0004 ; 0005ACEA
05ACEA MOVE.W     D0,$006C(A6)
05ACEE MOVEQ      #$00,D1
05ACF0 MOVE.W     $006A(A6),D4
05ACF4 MOVE.W     *+$0008(D4.W),D4 ; 0005ACFC
05ACF8 JMP        *+$0004(D4.W) ; 0005ACFC
;
; Begin "Build Display List" loop
Loop 1 - 'F'
;
05AF42 MOVE.B     (A2)+,D1
05AF44 MOVE.L     $00(A0,D1.W*4),D4
05AF48 BEQ        *+$02F4 ; 0005B23C
05AF4C LEA        $10(A0,D4.L),A1
05AF50 MOVE.L     D3,D4
05AF52 ADD.L      -$10(A1,D0.W),D3
05AF56 CMPI.W     #$0020,D1
05AF5A BEQ.S      *+$0012 ; 0005AF6C
05AF5C ADD.L      D7,D3
05AF5E SWAP       D4
05AF60 MOVE.W     D4,D6
05AF62 ADD.W      -$0006(A1),D4
05AF66 MOVE.W     D4,$00AE(A6)
05AF6A BRA.S      *+$0032 ; 0005AF9C
05AF9C ADD.W      -$0002(A1),D6
05AFA0 MOVE.L     A1,(A3)+
05AFA2 LEA        $00(A4,D4.W),A1
05AFA6 MOVE.L     A1,(A3)+
05AFA8 DBF        D5,*-$0030 ; 0005AF78
;
; Loop 2 - 'r'
;
05AF78 MOVE.B     (A2)+,D1
05AF7A MOVE.L     $00(A0,D1.W*4),D4
05AF7E BEQ        *+$02BE ; 0005B23C
05AF82 LEA        $10(A0,D4.L),A1
05AF86 MOVE.L     D3,D4
05AF88 ADD.L      -$10(A1,D0.W),D3
05AF8C CMPI.W     #$0020,D1
05AF90 BEQ.S      *+$0020 ; 0005AFB0
05AF92 ADD.L      D7,D3
05AF94 SWAP       D4
05AF96 MOVE.W     D4,D6
05AF98 ADD.W      -$0006(A1),D4
05AF9C ADD.W      -$0002(A1),D6
05AFA0 MOVE.L     A1,(A3)+
05AFA2 LEA        $00(A4,D4.W),A1
05AFA6 MOVE.L     A1,(A3)+
05AFA8 DBF        D5,*-$0030 ; 0005AF78
;
Loop 3 - 'a'
;
05AF78 MOVE.B     (A2)+,D1
05AF7A MOVE.L     $00(A0,D1.W*4),D4
05AF7E BEQ        *+$02BE ; 0005B23C
05AF82 LEA        $10(A0,D4.L),A1
05AF86 MOVE.L     D3,D4
05AF88 ADD.L      -$10(A1,D0.W),D3
05AF8C CMPI.W     #$0020,D1
05AF90 BEQ.S      *+$0020 ; 0005AFB0
05AF92 ADD.L      D7,D3
05AF94 SWAP       D4
05AF96 MOVE.W     D4,D6
05AF98 ADD.W      -$0006(A1),D4
05AF9C ADD.W      -$0002(A1),D6
05AFA0 MOVE.L     A1,(A3)+
05AFA2 LEA        $00(A4,D4.W),A1
05AFA6 MOVE.L     A1,(A3)+
05AFA8 DBF        D5,*-$0030 ; 0005AF78
;
Loop 4 - 'm'
;
05AF78 MOVE.B     (A2)+,D1
05AF7A MOVE.L     $00(A0,D1.W*4),D4
05AF7E BEQ        *+$02BE ; 0005B23C
05AF82 LEA        $10(A0,D4.L),A1
05AF86 MOVE.L     D3,D4
05AF88 ADD.L      -$10(A1,D0.W),D3
05AF8C CMPI.W     #$0020,D1
05AF90 BEQ.S      *+$0020 ; 0005AFB0
05AF92 ADD.L      D7,D3
05AF94 SWAP       D4
05AF96 MOVE.W     D4,D6
05AF98 ADD.W      -$0006(A1),D4
05AF9C ADD.W      -$0002(A1),D6
05AFA0 MOVE.L     A1,(A3)+
05AFA2 LEA        $00(A4,D4.W),A1
05AFA6 MOVE.L     A1,(A3)+
05AFA8 DBF        D5,*-$0030 ; 0005AF78
;
; Loop 5 - 'e'
;
05AF78 MOVE.B     (A2)+,D1
05AF7A MOVE.L     $00(A0,D1.W*4),D4
```

TABLE 18-continued tttrace. log
Copyright 1991 Frame Technology Corporation

```
05AF7E BEQ        *+$02BE ; 0005B23C
05AF82 LEA        $10(A0,D4.L),A1
05AF86 MOVE.L     D3,D4
05AF88 ADD.L      -$10(A1,D0.W),D3
05AF8C CMPI.W     #$0020,D1
05AF90 BEQ.S      *+$0020 ; 0005AFB0
05AF92 ADD.L      D7,D3
05AF94 SWAP       D4
05AF96 MOVE.W     D4,D6
05AF98 ADD.W      -$0006(A1),D4
05AF9C ADD.W      -$0002(A1),D6
05AFA0 MOVE.L     A1,(A3)+
05AFA2 LEA        $00(A4,D4.W),A1
05AFA6 MOVE.L     A1,(A3)+
05AFA8 DBF        D5,*-$0030 ; 0005AF78
;
; End Build Display List loop
;
05AFAC BRA        *+$00F8 ; 0005B0A4
05B0A4 SWAP       D3
05B0A6 ADD.W      $0072(A6),D3
05B0AA SWAP       D3
05B0AC MOVE.L     D3,$0088(A6)
05B0B0 ADD.W      $0072(A6),D6
05B0B4 MOVE.W     D6,$00B2(A6)
05B0B8 MOVE.W     $0072(A6),D6
05B0BC ADD.W      D6,$00AE(A6)
05B0C0 MOVE.W     $0064(A6),D6
05B0C4 MOVE.W     D6,D5
05B0C6 ADD.W      -$0038(A0),D6
05B0CA MOVE.W     D6,$00AC(A6)
05B0CE ADD.W      -$0034(A0),D5
05B0D2 MOVE.W     D5,$00B0(A6)
05B0D6 MOVEA.L    $0074(A6),A2
05B0DA LEA        $0032(A6),A4
05B0DE MOVE.W     $0042(A2),D0
05B0E2 BMI        *+$06B0 ; 0005B792
05B0E6 CMPI.W     #$0001,$0048(A2)
05B0EC BEQ.S      *+$003A ; 0005B126
05B126 MOVEA.L    $0018(A2),A0
05B12A MOVEA.L    (A0),A0
05B12C CMPI.W     #$000A,(A0)+
05B130 BNE        *+$03C2 ; 0005B4F2
05B134 MOVE.L     (A0)+,$00A4(A6)
05B138 MOVE.L     (A0)+,$00A8(A6)
05B13C MOVEA.L    $001C(A2),A0
05B140 MOVEA.L    (A0),A0
05B142 CMPI.W     #$000A,(A0)+
05B146 BNE        *+$03AC ; 0005B4F2
05B14A LEA        $00A4(A6),A1
05B14E CMPM.W     (A1)+,(A0)+
05B150 BLE.S      *+$0008 ; 0005B158
05B158 CMPM.W     (A1)+,(A0)+
05B15A BLE.S      *+$0008 ; 0005B162
05B162 CMPM.W     (A1)+,(A0)+
05B164 BGE.S      *+$0008 ; 0005B16C
05B16C CMPM.W     (A1)+,(A0)+
05B16E BGE.S      *+$0008 ; 0005B176
05B176 MOVE.W     $0008(A4),D1
05B17A MOVE.W     $0006(A4),D0
05B17E SUB.W      D1,-(A1)
05B180 SUB.W      D0,-(A1)
05B182 SUB.W      D1,-(A1)
05B184 SUB.W      D0,-(A1)
05B186 BSR        *+$02EE ; 0005B474
05B474 LEA        $00AC(A6),A2
05B478 CMPM.W     (A2)+,(A1)+
05B47A BGT.S      *+$0012 ; 0005B48C
05B47C CMPM.W     (A2)+,(A1)+
05B47E BGT.S      *+$000E ; 0005B48C
05B480 CMPM.W     (A2)+,(A1)+
05B482 BLT.S      *+$000A ; 0005B48C
05B484 CMPM.W     (A2)+,(A1)+
05B486 BLT.S      *+$0006 ; 0005B48C
05B488 MOVEQ      #$01,D0
05B48A RTS
05B18A BEQ        *+$0416 ; 0005B5A0
05B18E BTST       #$06,ROM85
05B194 BNE.S      *+$0036 ; 0005B1CA
05B196 MOVE.L     $0090(A6),D0
05B19A BEQ.S      *+$0012 ; 0005B1AC
05B1AC LEA        $00A4(A6),A1
05B1B0 CLR.L      (A1)
05B1B2 MOVE.W     $000C(A4),D0
05B1B6 SUB.W      $0008(A4),D0
05B1BA MOVE.W     D0,$0006(A1)
05B1BE MOVE.W     $000A(A4),D0
05B1C2 SUB.W      $0006(A4),D0
05B1C6 MOVE.W     D0,$0004(A1)
05B1CA BSR        *+$02AA ; 0005B474
05B474 LEA        $00AC(A6),A2
05B478 CMPM.W     (A2)+,(A1)+
05B47A BGT.S      *+$0012 ; 0005B48C
05B47C CMPM.W     (A2)+,(A1)+
05B47E BGT.S      *+$000E ; 0005B48C
05B480 CMPM.W     (A2)+,(A1)+
05B482 BLT.S      *+$000A ; 0005B48C
05B484 CMPM.W     (A2)+,(A1)+
05B486 BLT.S      *+$0006 ; 0005B48C
05B488 MOVEQ      #$01,D0
05B48A RTS
05B1CE BEQ        *+$03D2 ; 0005B5A0
05B1D2 LEA        *+$05A0,A1 ; 0005B772
05B1D6 MOVE.L     A1,(A3)+
05B1D8 MOVE.W     $00AE(A6),-(A7)
05B1DC MOVE.W     $00AC(A6),-(A7)
05B1E0 MOVE.W     $00B2(A6),-(A7)
05B1E4 MOVE.W     $00B0(A6),-(A7)
05B1E8 MOVEA.L    JShieldCursor,A0
05B1EC JSR        (A0)
7B3846 TST.W      $0D4C
7B384A BEQ.S      *+$0034 ; 007B387E
7B387E MOVE.L     $0004(A7),$0D48
7B3884 MOVE.L     $0008(A7),$0D44
7B388A ADDQ.W     #$1,$0D4C
7B388E MOVE.B     #$01,CrsrBusy
7B3894 BSR        *-$011E ; 007B3776
7B3776 MOVEM.L    D0/A0/A1,-(A7)
7B377A TST.W      $0D4C
7B377E BEQ.S      *+$0040 ; 007B37BE
7B3780 LEA        CrsrRect,A0
7B3784 MOVEA.L    CrsrDevice,A1
7B3788 MOVEA.L    (A1),A1
7B378A ADDA.W     #$0022,A1
7B378E MOVE.W     $0D48,D0
7B3792 SUB.W      (A1),D0
7B3794 CMP.W      (A0)+,D0
7B3796 BLT.S      *+$0028 ; 007B37BE
7B37BE CLR.W      D0
7B37C0 MOVEM.L    (A7)+,D0/A0/A1
7B37C4 RTS
7B3898 BEQ.S      *+$0006 ; 007B389E
7B389E CLR.B      CrsrBusy
7B38A2 MOVE.L     (A7)+,(A7)
7B38A4 MOVE.L     (A7)+,(A7)
7B38A6 RTS
05B1EE BTST       #$06,ROM85
05B1F4 BNE.S      *+$000E ; 0005B202
05B1F6 MOVEQ      #$01,D0
05B1F8 MOVEA.L    *+$05F0,A0 ; 0005B7E8
05B1FC JSR        (A0)
0233CE MOVE.B     D0,D1
0233D0 BNE.S      *+$001A ; 000233EA
0233D2 MOVEQ      #$00,D0
0233D4 MOVE.B     MMU32bit,D0
0233D8 BEQ.S      *+$004E ; 00023426
023426 RTS
05B1FE MOVE.W     D0,$006E(A6)
05B202 MOVE.W     $0066(A6),D7
05B206 NEG.W      D7
05B208 MOVEA.W    D7,A5
05B20A MOVEA.W    A5,A3
```

TABLE 18-continued tttrace. log
Copyright 1991 Frame Technology Corporation

```
05B20C ADDA.W      A5,A3
05B20E MOVEA.W     A3,A2
05B210 ADDA.W      A5,A2
05B212 MOVEA.W     A2,A1
05B214 ADDA.W      A5,A1
05B216 MOVEA.W     A1,A0
05B218 ADDA.W      A5,A0
05B21A CMPI.W      #$0004,$0068(A6)
05B220 BLE.S       *+$0012 ; 0005B232
05B222 MOVE.L      $00A0(A6),D1
05B226 MOVE.L      D1,D2
05B228 MOVE.L      D1,D3
05B22A MOVE.L      D1,D4
05B22C MOVE.L      D1,D5
05B22E MOVE.L      D1,D6
05B230 MOVE.L      D1,D7
05B232 RTS
;
; Begin execution of compiled code
; 'F'
;
0D4988 MOVEA.L     (A7)+,A4
0D498A MOVE.W      D1,(A4)
0D498C MOVE.B      D1,$0002(A4)
0D4990 ADDA.W      A5,A4
0D4992 MOVEQ       #$01,D0
0D4994 MOVE.B      D1,$0001(A4)
0D4998 ADDA.W      A5,A4
0D499A DBF         D0,*-$0006 ; 000D4994
0D4994 MOVE.B      D1,$0001(A4)
0D4998 ADDA.W      A5,A4
0D499A DBF         D0,*-$0006 ; 000D4994
0D499E MOVE.B      D1,$0001(A4)
0D49A2 MOVE.B      D1,$0004(A4)
0D49A6 MOVE.L      D1,$01(A4,A5.W)
0D49AA MOVE.B      D1,$01(A4,A3.W)
0D49AE MOVE.B      D1,$04(A4,A3.W)
0D49B2 MOVE.B      D1,$01(A4,A2.W)
0D49B6 MOVE.B      D1,$05(A4,A2.W)
0D49BA ADDA.W      A1,A4
0D49BC MOVEM.L     D1,(A4)
0D49C0 MOVE.W      D1,$0004(A4)
0D49C4 RTS
;
; 'r'
;
0D4F44 MOVEA.L     (A7)+,A4
0D4F46 MOVE.W      D1,(A4)
0D4F48 MOVE.B      D1,$0002(A4)
0D4F4C ADDA.W      A5,A4
0D4F4E MOVEQ       #$03,D0
0D4F50 MOVE.B      D1,$0001(A4)
0D4F54 ADDA.W      A5,A4
0D4F56 DBF         D0,*-$0006 ; 000D4F50
0D4F50 MOVE.B      D1,$0001(A4)
0D4F54 ADDA.W      A5,A4
0D4F56 DBF         D0,*-$0006 ; 000D4F50
0D4F50 MOVE.B      D1,$0001(A4)
0D4F54 ADDA.W      A5,A4
0D4F56 DBF         D0,*-$0006 ; 000D4F50
0D4F50 MOVE.B      D1,$0001(A4)
0D4F54 ADDA.W      A5,A4
0D4F56 DBF         D0,*-$0006 ; 000D4F50
0D4F5A MOVE.B      D1,(A4)
0D4F5C MOVE.W      D1,$0002(A4)
0D4F60 RTS
;
; 'a'
;
0D4C94 MOVEA.L     (A7)+,A4
0D4C96 MOVE.W      D1,$0001(A4)
0D4C9A MOVE.B      D1,$0004(A4)
0D4C9E ADDA.W      A5,A4
0D4CA0 MOVEQ       #$01,D0
0D4CA2 MOVE.B      D1,(A4)
0D4CA4 MOVE.B      D1,$0003(A4)
0D4CA8 ADDA.W      A5,A4
0D4CAA DBF         D0,*-$0008 ; 000D4CA2
0D4CA2 MOVE.B      D1,(A4)
0D4CA4 MOVE.B      D1,$0003(A4)
0D4CA8 ADDA.W      A5,A4
0D4CAA DBF         D0,*-$0008 ; 000D4CA2
0D4CAE MOVE.W      D1,$0001(A4)
0D4CB2 MOVE.B      D1,$0003(A4)
0D4CB6 ADDA.W      A5,A4
0D4CB8 MOVE.B      D1,(A4)
0D4CBA MOVE.B      D1,$0003(A4)
0D4CBE MOVE.W      D1,$01(A4,A5.W)
0D4CC2 RTS
;
; 'm'
;
0D4E48 MOVEA.L     (A7)+,A4
0D4E4A MOVE.W      D1,(A4)
0D4E4C MOVE.W      D1,$0003(A4)
0D4E50 MOVE.W      D1,$0006(A4)
0D4E54 MOVE.B      D1,$0008(A4)
0D4E58 ADDA.W      A5,A4
0D4E5A MOVEQ       #$03,D0
0D4E5C MOVE.B      D1,$0001(A4)
0D4E60 MOVE.B      D1,$0004(A4)
0D4E64 MOVE.B      D1,$0007(A4)
0D4E68 ADDA.W      A5,A4
0D4E6A DBF         D0,*-$000E ; 000D4E5C
0D4E5C MOVE.B      D1,$0001(A4)
0D4E60 MOVE.B      D1,$0004(A4)
0D4E64 MOVE.B      D1,$0007(A4)
0D4E68 ADDA.W      A5,A4
0D4E6A DBF         D0,*-$000E ; 000D4E5C
0D4E5C MOVE.B      D1,$0001(A4)
0D4E60 MOVE.B      D1,$0004(A4)
0D4E64 MOVE.B      D1,$0007(A4)
0D4E68 ADDA.W      A5,A4
0D4E6A DBF         D0,*-$000E ; 000D4E5C
0D4E5C MOVE.B      D1,$0001(A4)
0D4E60 MOVE.B      D1,$0004(A4)
0D4E64 MOVE.B      D1,$0007(A4)
0D4E68 ADDA.W      A5,A4
0D4E6A DBF         D0,*-$000E ; 000D4E5C
0D4E6E MOVE.B      D1,(A4)
0D4E70 MOVE.W      D1,$0002(A4)
0D4E74 MOVE.W      D1,$0005(A4)
0D4E78 RTS
;
; 'e'
;
0D4D4C MOVEA.L     (A7)+,A4
0D4D4E MOVE.W      D1,$0001(A4)
0D4D52 ADDA.W      A5,A4
0D4D54 MOVE.B      D1,(A4)
0D4D56 MOVE.B      D1,$0003(A4)
0D4D5A ADDA.W      A5,A4
0D4D5C MOVE.B      D1,(A4)
0D4D5E ADDA.W      A5,A4
0D4D60 MOVE.L      D1,(A4)
0D4D62 ADDA.W      A5,A4
0D4D64 MOVE.B      D1,(A4)
0D4D66 MOVE.B      D1,$0003(A4)
0D4D6A MOVE.W      D1,$01(A4,A5.W)
0D4D6E RTS
;
; End compiled code execution
;
05B772 MOVEA.L     $007C(A6),A5
05B776 MOVEA.L     $009C(A6),A7
05B77A BTST        #$06,ROM85
05B780 BNE.S       *+$000C ; 0005B78C
05B782 MOVE.W      $006E(A6),D0
05B786 MOVEA.L     *+$0062,A0 ; 0005B7E8
05B78A JSR         (A0)
0233CE MOVE.B      D0,D1
0233D0 BNE.S       *+$001A ; 000233EA
```

TABLE 18-continued tttrace. log
Copyright 1991 Frame Technology Corporation

| | | |
|---|---|---|
| 0233D2 | MOVEQ | #$00,D0 |
| 0233D4 | MOVE.B | MMU32bit,D0 |
| 0233D8 | BEQ.S | *+$004E ; 00023426 |
| 023426 | RTS | |
| 05B78C | MOVEA.L | JShowCursor,A0 |
| 05B790 | JSR | (A0) |
| 7B3806 | MOVE.B | #$01,CrsrBusy |
| 7B380C | TST.W | $0D4C |
| 7B3810 | BEQ.S | *+$0008 ; 007B3818 |
| 7B3812 | SUBQ.W | #$1,$0D4C |
| 7B3816 | BRA.S | *+$000A ; 007B3820 |
| 7B3820 | MOVE.B | #$01,CrsrBusy |
| 7B3826 | TST.W | CrsrState |
| 7B382A | BMI.S | *+$0016 ; 007B3840 |
| 7B382C | CLR.W | CrsrState |
| 7B3830 | TST.B | CrsrVis |
| 7B3834 | BNE.S | *+$000C ; 007B3840 |
| 7B3836 | TST.B | CrsrObscure |
| 7B383A | BNE.S | *+$0006 ; 007B3840 |
| 7B3840 | CLR.B | CrsrBusy |
| 7B3844 | RTS | |
| 05B792 | MOVE.L | $0088(A6),D3 |
| 05B796 | ADD.L | $0084(A6),D3 |
| 05B79A | MOVEA.L | $0074(A6),A2 |
| 05B79E | TST.W | $0006(A2) |
| 05B7A2 | BPL.S | *+$0006 ; 0005B7A8 |
| 05B7A4 | MOVE.W | D3,$000E(A2) |
| 05B7A8 | SWAP | D3 |
| 05B7AA | MOVE.W | D3,$0032(A2) |
| 05B7AE | MOVEA.L | $009C(A6),A7 |
| 05B7B2 | MOVEM.L | (A7)+,D2–D7/A2–A4/A6 |
| 05B7B6 | MOVEA.L | (A7),A0 |
| 05B7B8 | LEA | $0012(A7),A7 |
| 05B7BC | JMP | (A0) |

What is claimed is:

1. A method for imaging glyphs in a computer system, the computer system operating to execute sequences of instructions, each instruction being selected from an instruction set for the computer system, the method for imaging glyphs comprising:
providing glyph data which specifies the glyphs to be imaged;
processing the glyph data with a glyph compiler to create compiled glyph code, the glyph code comprising a sequence of instructions from the same instruction set for the computer system;
executing the sequence of glyph code for the glyph data to create images of the glyphs specified by the glyph data.

2. The method of claim 1 wherein the glyph data comprises a plurality of input data bits and wherein the processing step includes the step of compiling the input data bits into instructions for execution by the computer system.

3. The method of claim 2 wherein the glyph data contains patterns of pixels, and wherein the step of processing includes,
detecting the patterns of pixels in the glyph data; and
compiling the patterns detected to provide instructions, which instructions are determined by the patterns detected.

4. The method of claim 2 wherein the glyph data comprises pixel locations from an input pixel map, and the step of executing the sequence of instructions creates an output pixel map for use in imaging the glyph.

5. The method of claim 4 wherein the input pixel map comprises a plurality of segments, each segment including a plurality of pixels.

6. The method of claim 5 wherein the input pixel map comprises a rectangular array of pixels arranged in rows and columns, and a segment comprises a row of pixels.

7. The method of claim 5 wherein the input pixel map comprises a rectangular array of pixels arranged in rows and columns and a segment comprise a column of pixels.

8. The method of claim 4 wherein the input pixel map comprises a plurality of sets of pixels and the step of processing compiles the glyph data into a corresponding plurality of sets of pixels.

9. The method of claim 4 wherein the glyph data comprises at least one data bit for each output pixel, and the output pixel map comprises a bitmap.

10. The method of claim 4 wherein the glyph data comprises at least one data bit for each input pixel, and the input pixel map comprises a bitmap.

11. The method of claim 1 wherein the images of the glyphs are displayed to a user of the computer system.

12. The method of claim 1 wherein the glyph data represents pixels of an input pixel map, and the step of executing images the glyphs to an output pixel map of corresponding size to the input pixel map.

13. The method of claim 1 wherein the glyph data included groups of input data bits, each group representing an input pixel.

14. A method for imaging glyphs in a computer system which executes sequences of instructions, each instruction being selected from an instruction set, the method comprising:
receiving glyph data specifying glyphs from a computer program;
compiling the glyph data into sequences of glyph display instructions, the glyph display instructions also being selected from the instruction set; and
executing the sequences of glyph display instructions to display the glyph data to a user of the computer system.

15. The method of claim 14 wherein the step of executing the Sequences of glyph display instructions uses at lease one control value provided by the computer system.

16. The method of claim 15 wherein the glyph display instructions comprise a plurality of executable sequences, and wherein said computer system selects one of the sequences to execute for each glyph in response to said control value.

17. The method of claim 16 wherein the glyph display instructions comprise a plurality of executable sequences, one of the sequences for imaging at a first set of locations in an output pixel map and another of the sequences for imaging data a second set of locations in the output pixel map.

18. The method of claim 16 wherein the glyph display instructions comprise a plurality of executable sequences, one of the sequences for imaging with a first number of bits per pixel in the output pixel map and another of the sequences for imaging with a second number of bits per pixel in the output pixel map.

19. The method of claim 16 wherein the glyph display instruction include at least two executable sequences, one of the sequences having a branch instruction for branching to an instruction within the other of the sequences.

20. The method of claim 15 wherein the step of executing the sequence of instructions images pixels in an output pixel map corresponding to the glyph data received, and the output pixel map has a size determined by a control value.

21. The method of claim 20 wherein the glyph display instructions comprises at least two executable sequences, one of the sequences for imaging with a first glyph physical property in the output pixel map and the other of the sequences for imaging with a second glyph physical property in the output pixel map.

22. The method of claim 15 wherein the step of executing the sequence of instructions images pixels in an output pixel map corresponding to the glyph data received, and the imaged glyph is located within the output pixel map at a location determined by a control value.

23. The method of claim 15 wherein the glyph display instructions include at least two executable sequences, one of the sequences having a branch instruction for branching to a point within another of the sequences, and the step of executing the glyph display instructions select one of the sequences in response to the control value.

24. The method of claim 23 wherein the computer system includes first and second literal data values, and
 a first one of the executable sequences includes first instructions for obtaining the first literal data values, and a point on one of the first instructions as a starting instruction, and
 a second one of the executable sequences includes a second instruction for obtaining second literal data values, and a branch instruction for branching to the first entry point, and
 wherein the step of executing branches to one of the first sequence and executes that sequence with the first literal data values or to the depend sequence to obtain said second literal values and thereafter branches to the point and executes the first group of instructions with the second literal data values.

25. The method of claim 14 wherein the computer system includes a data register for storing a control value and the step of executing is controlled by a control value.

26. The method of claim 25 wherein the output pixel map is partitioned into a plurality of segments, each segment having a number of pixels determined by a control value.

27. The method of claim 25 wherein the output pixel map is partitioned into a number of segments, each including a plurality of pixels, the number of segments determined by a control value.

28. The method of claim 25 wherein the output pixel map comprises a two-dimensional array of pixels, each pixel having an array address.

29. The method of claim 25 wherein the glyph display instructions include at least two executable sequences, one of the sequences for imaging with a first number of bits per pixel in the output pixel map and the other of the sequences of imaging with a second number of bits per pixel in the output pixel map, and wherein a control value determines which of the executable sequences is selected.

30. The method of claim 25 wherein the glyph display instructions includes at least two executable sequences, one of the sequences for imaging with a first physical property and another of the sequences for imaging with a second physical property under control of a control value.

31. The method of claim 25 wherein the glyph data includes a plurality of sets of pixels, and the step of executing includes a loop for translating said particular ones of the sets of pixels, the loop being executed at least twice to execute the imaging instructions to image pixels in at least two different locations.

32. The method of claim 25 wherein the glyph data comprises an input pixel map and the step of executing the sequence of instructions for the glyph code images the glyph data into an output pixel map wherein the input pixels have physical properties, wherein particular ones of said sets of pixels occur a number of times, and wherein:
 the step of compiling compiles instructions for a loop count equal to the number of times, and compiles instructions in a loop for imaging the particular ones of the set of pixels for one execution of said loop, and
 the step of executing causes execution of the loop a number of times equal to the loop count.

33. The method of claim 25 wherein said instruction set includes data transfer instructions for obtaining data values and the step of compiling compiles data transfer instructions into said glyph code to store data values.

34. The method of claim 33 wherein the instruction set includes data transfer instructions to obtain data values as literal values, and the step of executing glyph display instructions causes the literal values to be imaged as pixel data in an output pixel map.

35. The method of claim 33 wherein the data value provides control value, and wherein the step of executing glyph display instructions uses the control value.

36. The method of claim 35 wherein the glyph display instructions include at least two executable sequences, one of the sequences having a branch instruction for branching to a point within another of said sequences, and the step of executing the glyph display instructions selects one of said sequences in response to the control value.

37. The method of claim 25 wherein the computer system includes index registers to control the execution of the glyph display instructions and wherein the step of executing the glyph display instructions accesses said index registers.

38. The method of claim 37 wherein one of the sequences of instructions images segments, and an instruction is provided for moving to a new segment.

39. The method of claim 37 wherein one of the sequences of instructions uses index registers for moving to a new segment.

* * * * *

UNITED STATES PATENT AND TRADEMARK OFFICE
CERTIFICATE OF CORRECTION

PATENT NO.   : 6,377,261 B1
DATED         : April 23, 2002
INVENTOR(S)  : Gustavo A. Fernandez and David R. Fuchs It is certified that error appears in the above-identified patent and that said Letters Patent is hereby corrected as shown below:

<u>Title page,</u>
Item [56], References Cited, U.S. PATENT DOCUMENTS, please delete "Kaaila" and insert -- Kaasila -- therefor.

<u>Column 138,</u>
Line 6, please delete "comprise" and insert -- comprises -- therefor,
Line 24, please delete "included" and insert -- includes -- therefor.
Line 38, please delete "Sequences" and insert -- sequences -- therefor.
Line 38, please delete "at lease" and insert -- at least -- therefor.
Line 49, please delete "data a second" and insert -- at a second -- therefor.
Line 58, please delete "instruction" and insert -- instructions -- therefor.

<u>Column 139,</u>
Line 27, please delete "depend" and insert -- second -- therefor.
Line 52, please delete "includes" and insert -- include -- therefor.

Signed and Sealed this

Twenty-fifth Day of June, 2002

Attest:

JAMES E. ROGAN
Attesting Officer          Director of the United States Patent and Trademark Office